(12) United States Patent
Wilkins

(10) Patent No.: US 9,080,597 B2
(45) Date of Patent: Jul. 14, 2015

(54) CRANKPIN INCLUDING CAMS, CONNECTING ROD INCLUDING FOLLOWERS, AND INTERNAL COMBUSTION ENGINE INCLUDING CRANKPIN AND CONNECTING ROD

(71) Applicant: Larry C. Wilkins, Ft. Lauderdale, FL (US)

(72) Inventor: Larry C. Wilkins, Ft. Lauderdale, FL (US)

(73) Assignee: WILKINS IP, LLC, New Albany, IN (US)

( * ) Notice: Subject to any disclaimer, the term of this patent is extended or adjusted under 35 U.S.C. 154(b) by 0 days.

(21) Appl. No.: 14/597,630

(22) Filed: Jan. 15, 2015

(65) Prior Publication Data
US 2015/0122213 A1      May 7, 2015

Related U.S. Application Data

(62) Division of application No. 13/471,946, filed on May 15, 2012.

(60) Provisional application No. 61/540,715, filed on Sep. 29, 2011, provisional application No. 61/488,067, filed on May 19, 2011.

(51) Int. Cl.
| | | |
|---|---|---|
| *F02B 75/32* | (2006.01) | |
| *F16C 7/02* | (2006.01) | |
| *F16C 11/02* | (2006.01) | |

(52) U.S. Cl.
CPC .............. *F16C 7/023* (2013.01); *F02B 75/32* (2013.01); *F16C 11/02* (2013.01)

(58) Field of Classification Search
CPC ............ F16H 21/28; F16C 7/023; F16C 7/06; F16C 9/04; F02B 75/32

USPC ............... 123/197.4, 197.3, 78 F, 78 E, 48 B; 74/44, 567, 589, 590, 591
See application file for complete search history.

(56) References Cited

U.S. PATENT DOCUMENTS

| | | | |
|---|---|---|---|
| 1,309,917 A | 7/1919 | Tanaka | |
| 1,574,573 A * | 2/1926 | Tipton | .............................. 74/36 |

(Continued)

FOREIGN PATENT DOCUMENTS

FR          814 249          6/1937

OTHER PUBLICATIONS

International Search Report and Written Opinion Issued Jul. 27, 2012, in corresponding PCT/US2012/038117, filed May 16, 2012.

(Continued)

*Primary Examiner* — Hung Q Nguyen
(74) *Attorney, Agent, or Firm* — Finnegan, Henderson, Farabow, Garrett & Dunner, L.L.P.

(57) ABSTRACT

A crankshaft may include first and second journals having circular cross-sections, and a crankpin, the crankpin extending between first and second crankpin journals. The crankpin may include first, second, and third cams including respective first, second, and third cam profiles, wherein the first, second, and third cam profiles differ from one another. At least one of the first, second, and third cam profiles may be configured to affect the stroke of a connecting rod coupled to the crankpin. A connecting rod may include first, second, and third followers including respective first, second, and third follower surfaces, wherein the first and second follower surfaces differ from one another. An internal combustion engine may include a crankshaft and a connecting rod configured to provide relative linear movement between a crankpin axis and a proximal end of the connecting rod.

25 Claims, 60 Drawing Sheets

(56) References Cited

U.S. PATENT DOCUMENTS

| | | | | |
|---|---|---|---|---|
| 1,979,987 A | * | 11/1934 | Mullin | 74/36 |
| 2,217,721 A | | 10/1940 | Anthony | |
| 2,287,673 A | | 6/1942 | Farrell | |
| 2,353,285 A | | 7/1944 | Bell | |
| 2,408,546 A | | 10/1946 | Bell | |
| 2,528,386 A | * | 10/1950 | Napper | 74/55 |
| 2,625,048 A | | 1/1953 | Vissat | |
| 3,087,342 A | * | 4/1963 | Caddell | 74/36 |
| 5,259,256 A | * | 11/1993 | Brackett | 74/49 |
| 5,890,465 A | * | 4/1999 | Williams | 123/197.4 |
| 6,202,622 B1 | | 3/2001 | Raquiza, Jr. | |
| 6,223,703 B1 | | 5/2001 | Galvin | |

OTHER PUBLICATIONS

Machine Generated Translation of FR 814 249.

\* cited by examiner

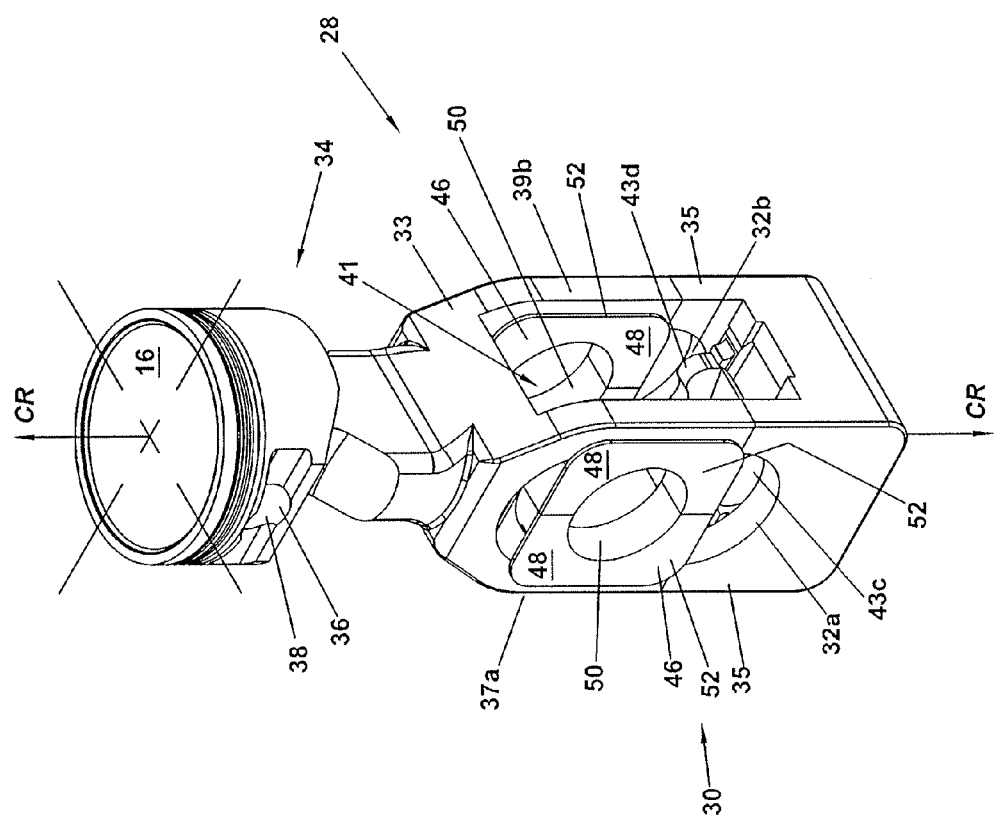

crankshaft zero degrees crankshaft zero degrees crankshaft zero degrees crankshaft zero degrees

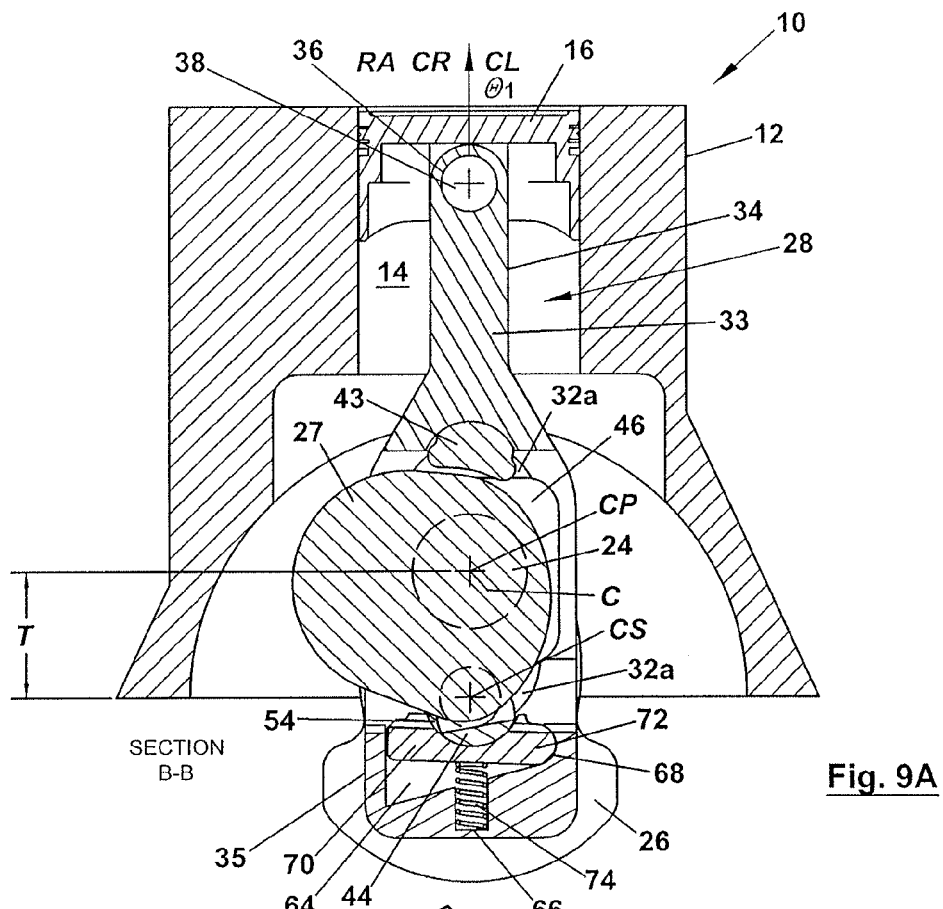
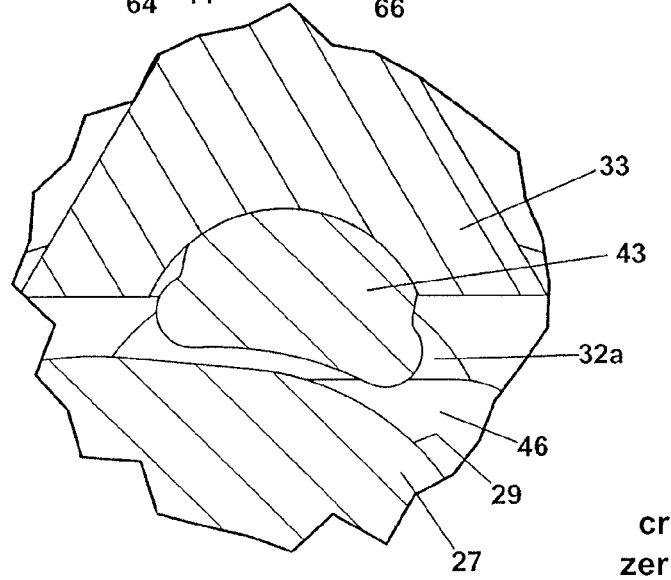
Fig. 9B
crankshaft zero degrees crankshaft zero degrees crankshaft zero degrees crankshaft 15 degrees crankshaft zero degrees crankshaft 15 degrees crankshaft 35 degrees

SECTION C-C crankshaft
35 degrees crankshaft 35 degrees crankshaft 90 degrees crankshaft 90 degrees crankshaft 90 degrees crankshaft
120 degrees crankshaft
120 degrees

SECTION D-D crankshaft 120 degrees crankshaft
150 degrees

SECTION C-C crankshaft 150 degrees

SECTION D-D crankshaft 150 degrees

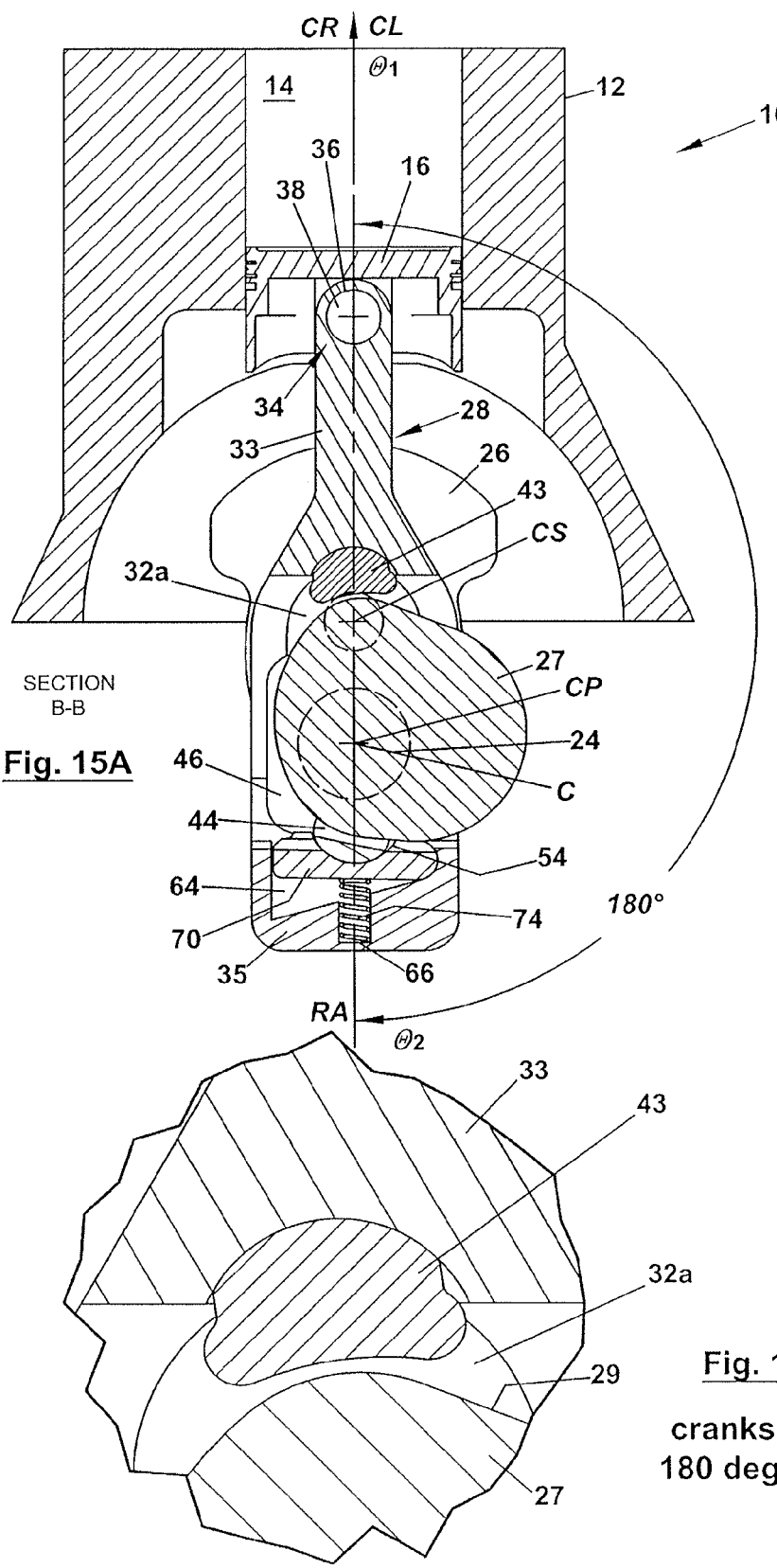

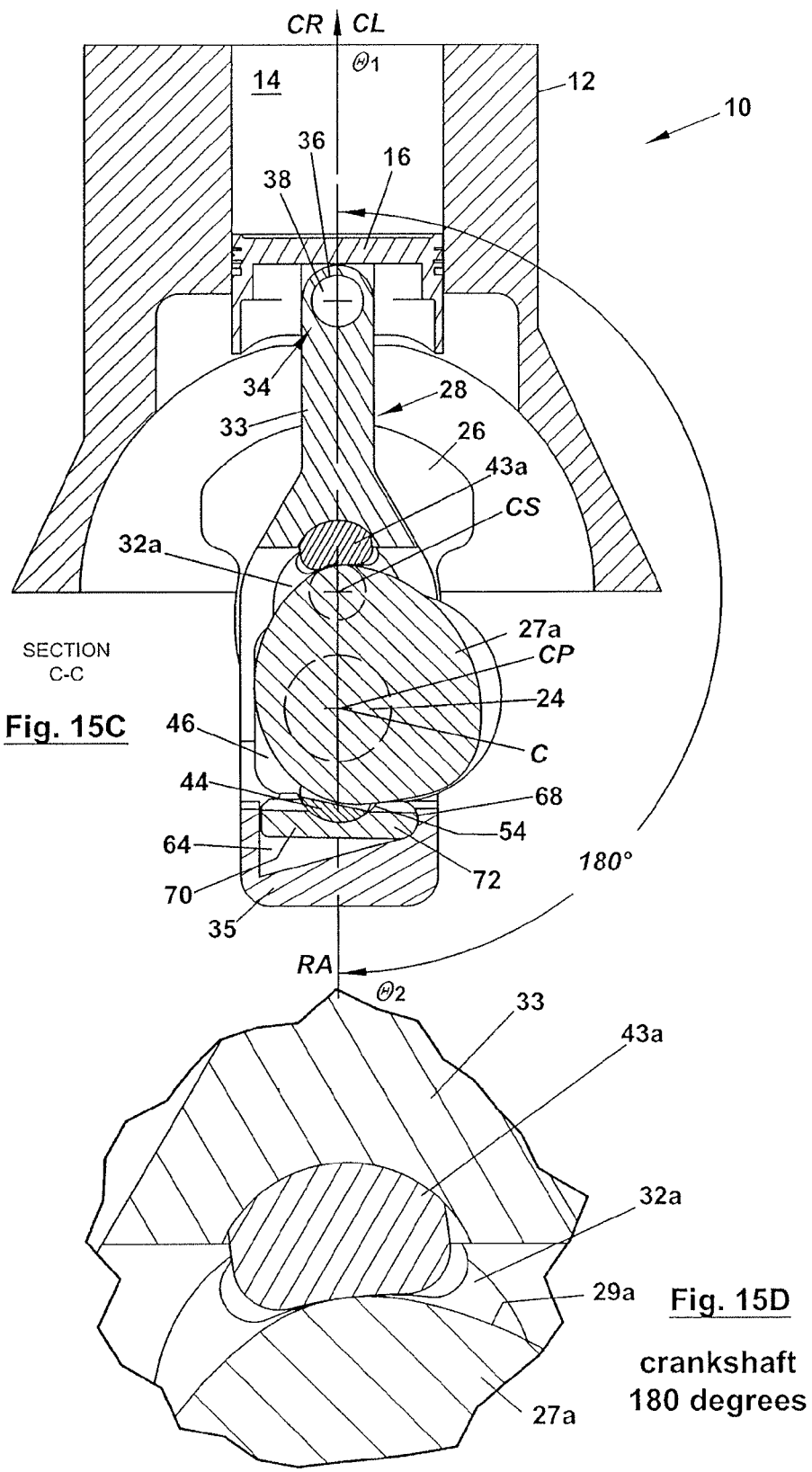
Fig. 15C SECTION C-C
Fig. 15D crankshaft 180 degrees

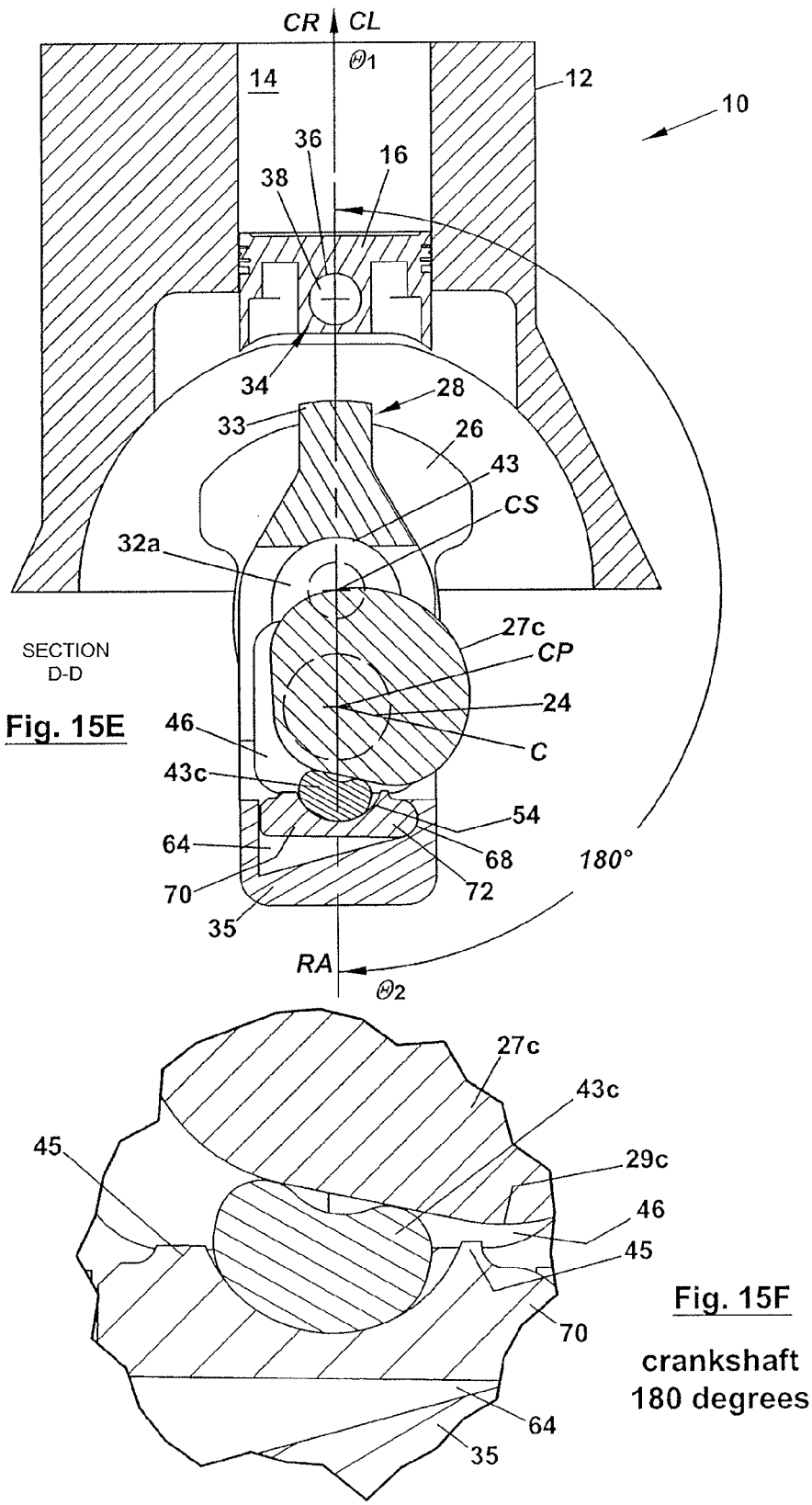

crankshaft 270 degrees crankshaft
270 degrees crankshaft
270 degrees crankshaft zero degrees crankshaft zero degrees crankshaft zero degrees crankshaft zero degrees crankshaft 15 degrees crankshaft 15 degrees crankshaft 15 degrees

SECTION I-I crankshaft 35 degrees crankshaft 35 degrees crankshaft
35 degrees

SECTION I-I crankshaft 90 degrees crankshaft 90 degrees crankshaft 90 degrees crankshaft
120 degrees

SECTION H-H crankshaft
120 degrees

SECTION J-J crankshaft 120 degrees crankshaft
150 degrees crankshaft 150 degrees

SECTION J-J crankshaft 150 degrees

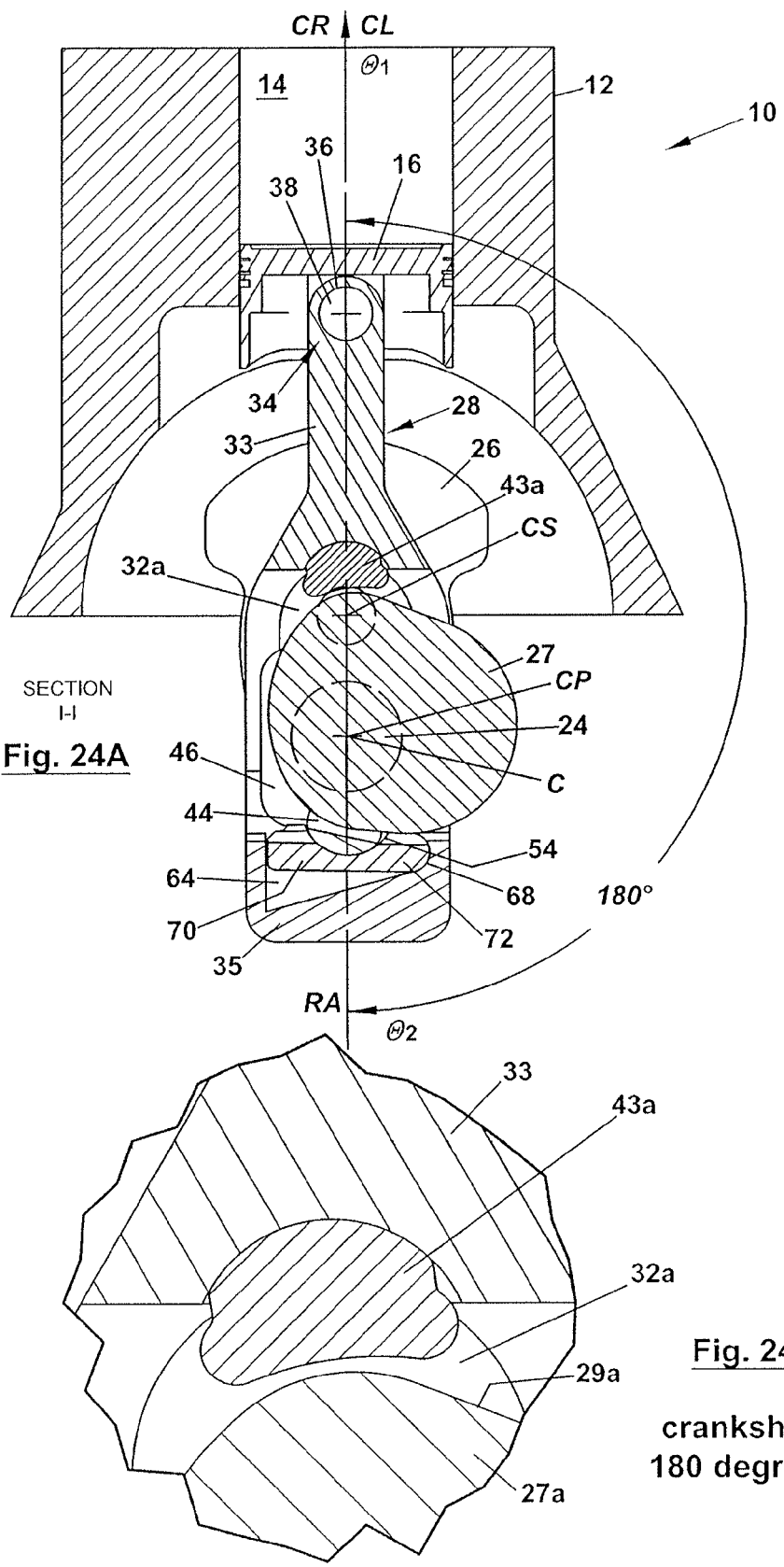

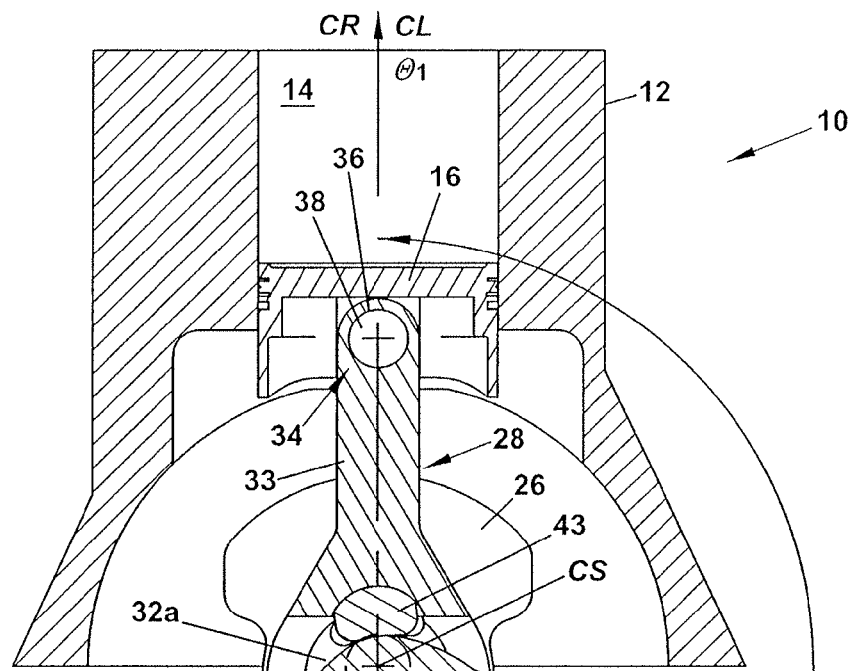
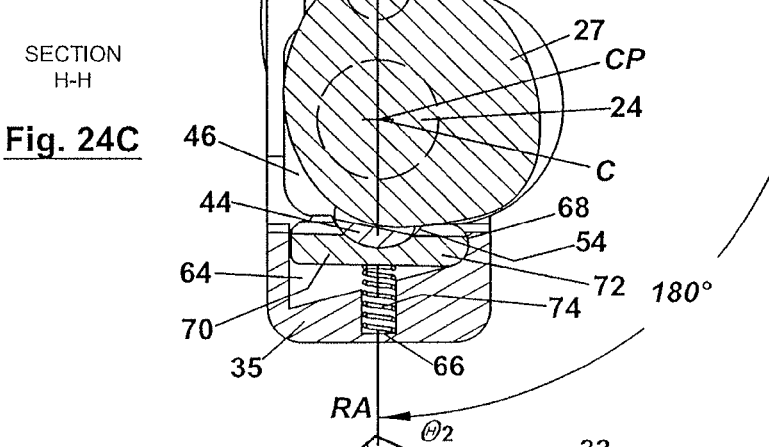
SECTION H-H
Fig. 24C
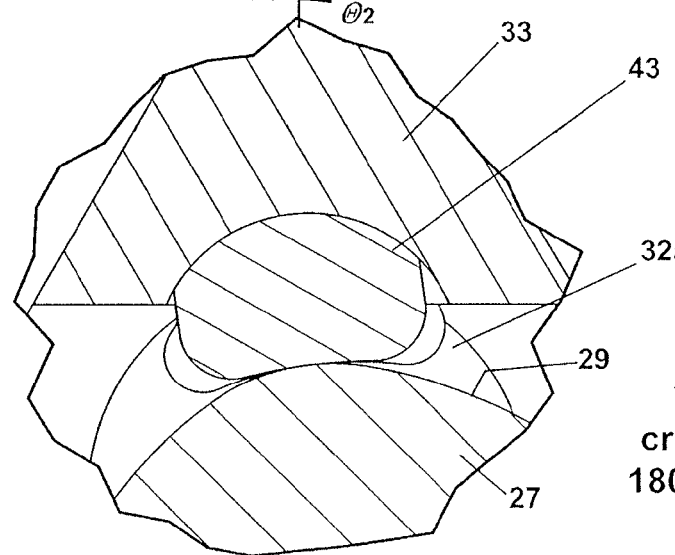
Fig. 24D
crankshaft 180 degrees

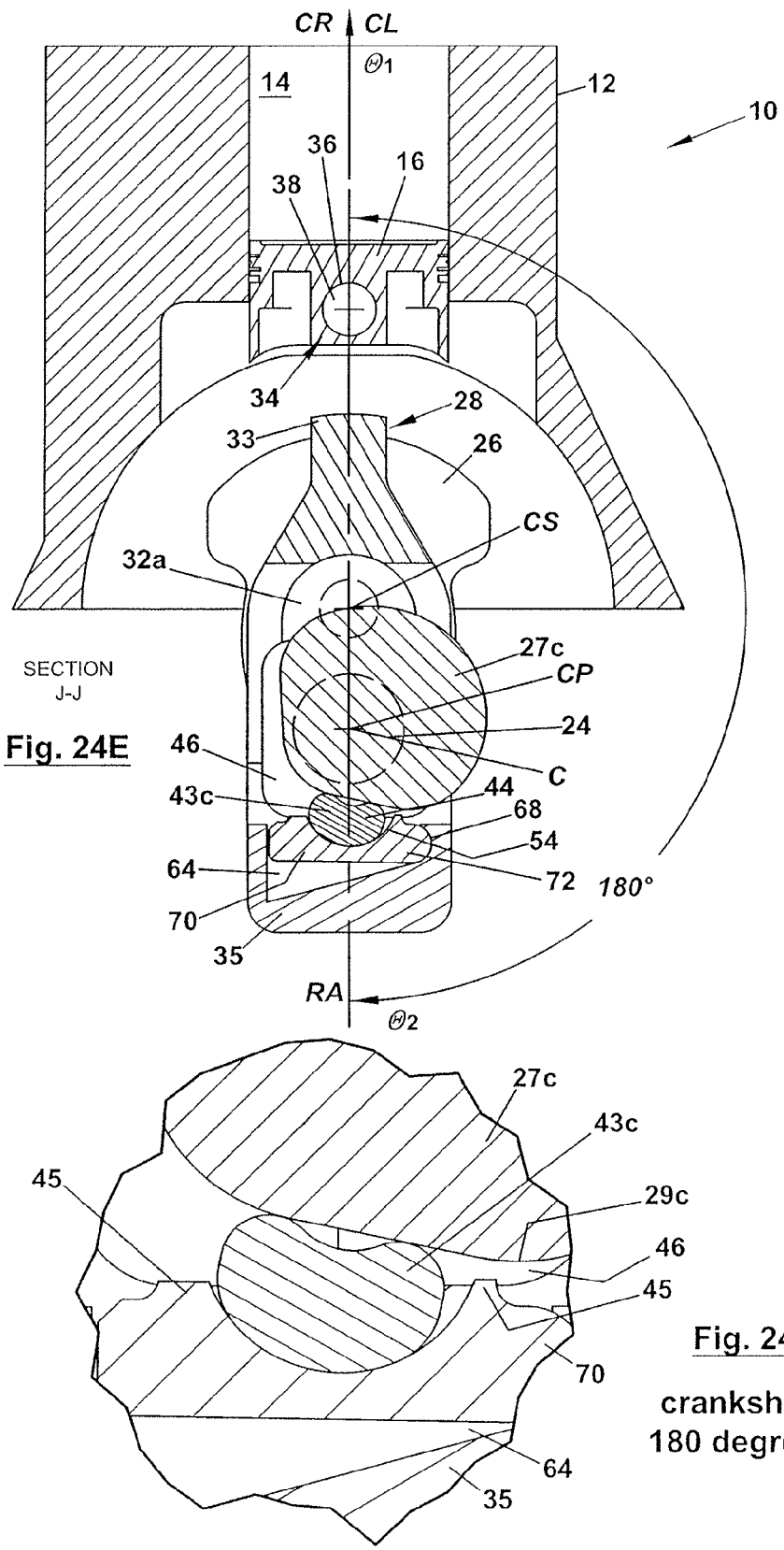

crankshaft
270 degrees crankshaft
270 degrees crankshaft
270 degrees

US 9,080,597 B2

CRANKPIN INCLUDING CAMS, CONNECTING ROD INCLUDING FOLLOWERS, AND INTERNAL COMBUSTION ENGINE INCLUDING CRANKPIN AND CONNECTING ROD

RELATED APPLICATIONS

This application is a divisional and claims the benefit of U.S. patent application Ser. No. 13/471,946, filed May 15, 2012, which claims the benefit of priority under 35 U.S.C. §119(e) of U.S. Provisional Application No. 61/540,715, filed Sep. 29, 2011, and U.S. Provisional Application No. 61/488,067, filed May 19, 2011, the disclosures of both of which are incorporated herein by reference.

FIELD OF THE DISCLOSURE

The present disclosure relates to crankshafts, connecting rods, and internal combustion engines. In particular, the present disclosure relates to internal combustion engines with improved fuel efficiency and/or power output.

BACKGROUND

High fuel costs and a desire to reduce undesirable emissions associated with operation of internal combustion engines has renewed interest in improving fuel efficiency during operation. Thus, it may be desirable to improve the efficiency of conventional internal combustion engines.

A conventional internal combustion engine includes a cylinder block defining journals for receiving a crankshaft and one or more cylinders housing a piston that is operably coupled to the crankshaft at a crankpin via a connecting rod. During conventional operation, the piston reciprocates within the cylinder, such that during a power stroke of the internal combustion engine, combustion of an air/fuel mixture within a combustion chamber defined by the piston, the cylinder, and a cylinder head forces the piston toward the crankshaft. As the piston travels toward the crankshaft, the crankshaft is rotated via the connecting rod and crankpin, thereby converting the energy associated with combustion of the air/fuel mixture into mechanical work.

Due to the architecture of a conventional internal combustion engine, when the piston is at a position within the cylinder that coincides with the maximum compression (i.e., the combustion chamber is at its lowest volume when the piston is farthest from the crankshaft), the radial axis extending between the center of the crankshaft and the center of the crankpin tends to be nearly co-linear, if not co-linear, with the axis of the connecting rod. At these relative positions, as the piston first begins its movement toward the crankshaft during the power stroke, there is only a very short moment arm (if any) created between the axis of the connecting rod and the radial axis. As a result, the force initially created by the air/fuel mixture at the moment of combustion does not transfer as much torque to the crankshaft as it would if the length of the moment arm were greater. This situation may be particularly undesirable because during combustion and very shortly thereafter, the force on the piston due to the combustion event approaches its maximum magnitude. Further, as the piston travels down the cylinder toward the crankshaft and the length of the moment arm increases, the magnitude of the force from the combustion event acting on the piston dissipates rapidly. Thus, because there is a very short moment arm created between the axis of the connecting rod and the radial axis during the time of maximum force on the piston, efficiency of the work generated from the combustion process may be less than desired.

Thus, it may be desirable to provide an internal combustion engine with a configuration that improves the efficiency of the internal combustion engine during operation. Further, it may be desirable to provide an internal combustion engine with a configuration that permits tailoring of desired performance characteristics.

SUMMARY

In the following description, certain aspects and embodiments will become evident. It should be understood that the aspects and embodiments, in their broadest sense, could be practiced without having one or more features of these aspects and embodiments. It should be understood that these aspects and embodiments are merely exemplary.

One aspect of the disclosure relates to a crankshaft for an internal combustion engine. The crankshaft may include a first journal having a circular cross-section defining a first journal center, the first journal being configured to be rotatably coupled to a cylinder block of an internal combustion engine. The crankshaft may further include a second journal having a circular cross-section defining a second journal center, the second journal being configured to be rotatably coupled to a cylinder block of the internal combustion engine, wherein the first and second journal centers define a longitudinal crankshaft axis. The crankshaft may also include a crankpin defining a longitudinal crankpin axis and being configured to be coupled to a connecting rod, the longitudinal crankpin axis being parallel to and spaced from the longitudinal crankshaft axis. The crankpin may include at least one crankpin journal, a first cam including a first cam profile, a second cam including a second cam profile, and a third cam including a third cam profile. The first, second, and third cam profiles may differ from one another, and at least one of the first, second, and third cam profiles may be configured to affect the stroke of a connecting rod coupled to the crankpin.

According to another aspect, a connecting rod for an internal combustion engine may include a rod portion and a cap portion, wherein the rod portion and the cap portion define an oblong opening configured to receive a crankpin of an internal combustion engine. A first end of the oblong opening may be associated with the rod portion, and a second end of the oblong opening may be associated with the cap portion. The connecting rod may further include a first follower associated with the first end of the oblong opening, a second follower associated with the first end of the oblong opening, and a third follower associated with the second end of the oblong opening. The first follower may include a first follower surface, and the second follower may include a second follower surface, and the first and second follower surfaces may differ from one another.

According to still a further aspect, an internal combustion engine may include a cylinder block defining a cylinder, and a crankshaft including a crankpin. wherein the crankshaft may be rotatably coupled to the cylinder block and may rotate along a longitudinal crankshaft axis. The crankpin may define a longitudinal crankpin axis parallel to and spaced from the longitudinal crankshaft axis. The engine may further include a piston configured to reciprocate within the cylinder, and a connecting rod including a proximal end and a distal end, wherein the proximal end is operably coupled to the crankpin, and the distal end is operably coupled to the piston. The crankpin may include at least one crankpin journal about which the connecting rod revolves, a first cam including a first cam profile, a second cam including a second cam profile, and a third cam including a third cam profile. The first, second, and third cam profiles may differ from one another, and at least one of the first, second, and third cam profiles may be configured to provide relative linear movement between the longitudinal crankpin axis and the proximal end of the connecting rod.

According to yet another aspect, an internal combustion engine may include a cylinder block defining a cylinder, and a crankshaft including a crankpin, wherein the crankshaft is rotatably coupled to the cylinder block and rotates along a longitudinal crankshaft axis. The crankpin may define a longitudinal crankpin axis parallel to and spaced from the longitudinal crankshaft axis. The engine may further include a piston configured to reciprocate within the cylinder, and a connecting rod including a proximal end and a distal end, wherein the proximal end is operably coupled to the crankpin, and the distal end is operably coupled to the piston. The crankpin may include at least one crankpin journal about which the connecting rod revolves, a first cam including a first cam profile, a second cam including a second cam profile, and a third cam including a third cam profile. The first, second, and third cam profiles differ from one another, and at least one of the first, second, and third cam profiles may be configured to provide relative linear motion between the crankpin and the proximal end of the connecting rod, resulting in a distance between the longitudinal crankpin axis and an upper surface of the piston varying as the crankshaft rotates.

According to still a further aspect, an internal combustion engine may include a cylinder block defining a cylinder, and a crankshaft including a crankpin, wherein the crankshaft is rotatably coupled to the cylinder block and rotates along a longitudinal crankshaft axis. The crankpin may define a longitudinal crankpin axis parallel to and offset by a distance with respect to the longitudinal crankshaft axis. The engine may further include a piston configured to reciprocate within the cylinder between spaced stroke termination points defining a stroke of the piston. The engine may further include a connecting rod including a proximal end and a distal end, wherein the proximal end is operably coupled to the crankpin, and the distal end is operably coupled to the piston. The crankpin may include at least one crankpin journal about which the connecting rod revolves, a first cam including a first cam profile, a second cam including a second cam profile, and a third cam including a third cam profile. The first, second, and third cam profiles may differ from one another. A line extending between the longitudinal crankshaft axis and the longitudinal crankpin axis may define a radial axis of the crankshaft. At least one of the first, second, and third cam profiles is configured to vary a distance between the longitudinal crankpin axis and the distal end of the connecting rod. The engine may be configured such that as the crankshaft rotates, reversal of the direction of travel of the piston within the cylinder is delayed via relative motion between the longitudinal crankpin axis and the proximal end of the connecting rod after the piston reaches at least one of the stroke termination points.

According to yet a further aspect, an internal combustion engine may include a cylinder block defining a cylinder, and a crankshaft including a crankpin, wherein the crankshaft is rotatably received by the cylinder block and rotates along a longitudinal crankshaft axis. The crankpin may define a longitudinal crankpin axis parallel to and offset by a distance with respect to the longitudinal crankshaft axis. The engine may further include a piston configured to reciprocate within the cylinder, and a connecting rod including a proximal end and a distal end, wherein the proximal end is operably coupled to the crankpin, and the distal end is operably coupled to the piston. The crankpin may include at least one crankpin journal about which the connecting rod revolves, a first cam including a first cam profile, a second cam including a second cam profile, and a third cam including a third cam profile. The first, second, and third cam profiles differ from one another. A line extending between the longitudinal crankshaft axis and the longitudinal crankpin axis may define a radial axis of the crankshaft, wherein at least one of the first, second, and third cam profiles is configured to vary a distance between the longitudinal crankpin axis and the distal end of the connecting rod. The engine may be configured to selectively operate in two modes, including a first mode, wherein the distance between the longitudinal crankpin axis and the distal end of the connecting rod varies according to a first strategy based on the angular position of the radial axis of the crankshaft, and a second mode, wherein the distance between the longitudinal crankpin axis and the distal end of the connecting rod varies according to a second strategy based on the angular position of the radial axis of the crankshaft. The first strategy may differ from the second strategy.

According to yet another aspect, a power train may include an internal combustion engine according to any of the above aspects, a transmission operably coupled to the engine, and a drive member configured to perform work. The drive member may be operably coupled to the transmission.

According to still a further aspect, a vehicle may include an internal combustion engine according to any of the above aspects, a transmission operably coupled to the engine, and a drive member configured to perform work. The drive member may be operably coupled to the transmission.

Additional objects and advantages of the disclosure will be set forth in part in the description which follows, or may be learned by practice of the disclosed embodiments.

Aside from the structural and procedural arrangements set forth above, the embodiments could include a number of other arrangements, such as those explained hereinafter. It is to be understood that both the foregoing description and the following description are exemplary only.

BRIEF DESCRIPTION OF THE DRAWINGS

The accompanying drawings, which are incorporated in and constitute a part of this description, illustrate exemplary embodiments and together with the description, serve to explain the principles of the embodiments. In the drawings.

FIG. 4 is a schematic perspective view of an exemplary embodiment of a connecting rod for the exemplary embodiment shown in FIG. 1;

FIG. 9A is a schematic partial end section view taken along line B-B of FIG. 7 with a radial axis angle of the crankshaft shown at 0 degrees;

FIG. 9B is a schematic detail view of FIG. 9A;

FIG. 15A is a schematic partial end section view taken along line B-B of FIG. 7 with a radial axis angle of the crankshaft shown at 180 degrees;

FIG. 15B is a schematic detail view of FIG. 15A;

FIG. 15C is a schematic partial end section view taken along line C-C of FIG. 7 with a radial axis angle of the crankshaft shown at 180 degrees;

FIG. 15D is a schematic detail view of FIG. 15C;

FIG. 15E is a schematic partial end section view taken along line D-D of FIG. 7 with a radial axis angle of the crankshaft shown at 180 degrees;

FIG. 15F is a schematic detail view of FIG. 15E;

FIG. 24A is a schematic partial end section view taken along line I-I of FIG. 17 with a radial axis angle of the crankshaft shown at 180 degrees;

FIG. 24B is a schematic detail view of FIG. 24A;

FIG. 24C is a schematic partial end section view taken along line H-H of FIG. 17 with a radial axis angle of the crankshaft shown at 180 degrees;

FIG. 24D is a schematic detail view of FIG. 24C;

FIG. 24E is a schematic partial end section view taken along line J-J of FIG. 17 with a radial axis angle of the crankshaft shown at 180 degrees;

FIG. 24F is a schematic detail view of FIG. 24E;

DESCRIPTION OF EXEMPLARY EMBODIMENTS

Figure 1:
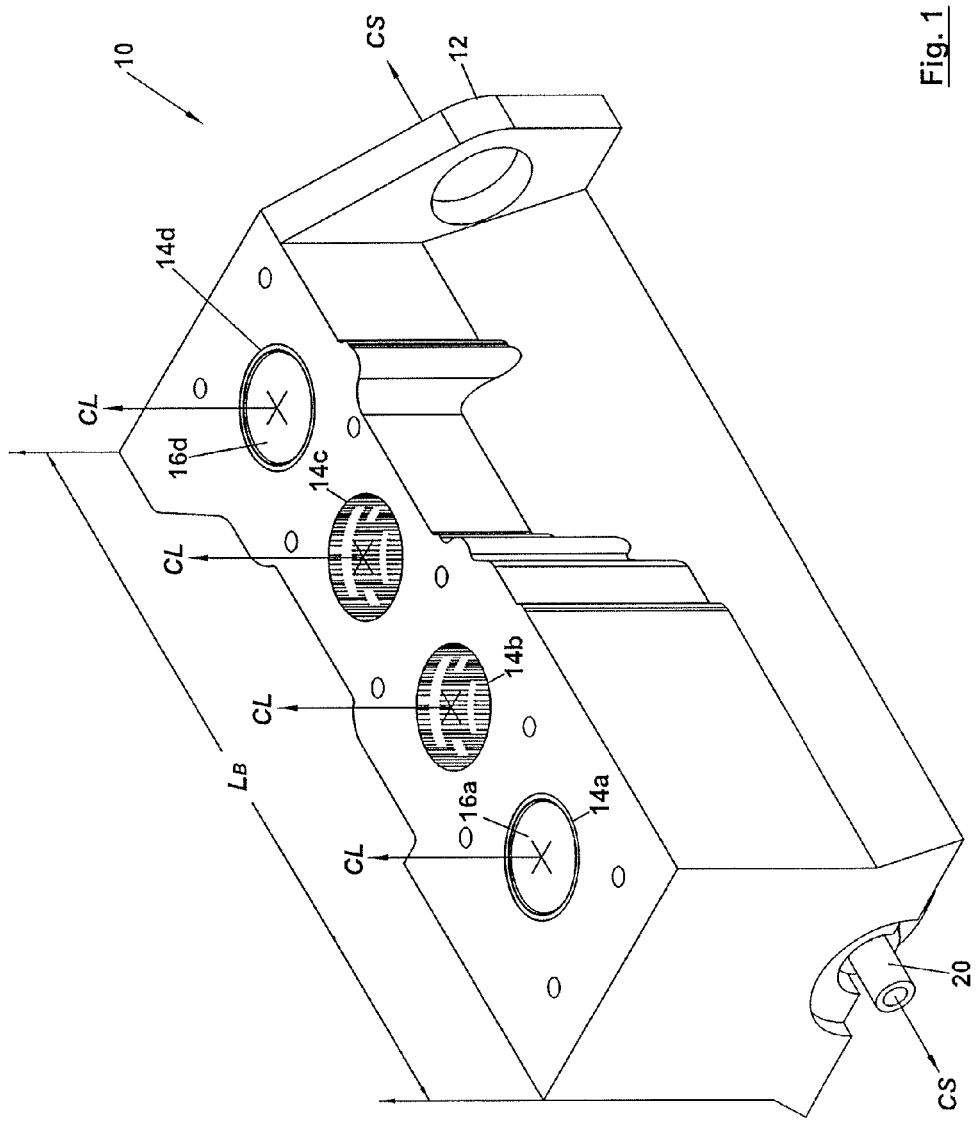
FIG. 1 is a schematic partial perspective view of an exemplary embodiment of an internal combustion engine.

Reference will now be made in detail to exemplary embodiments. Wherever possible, the same reference numbers are used in the drawings and the description to refer to the same or like parts.

Exemplary engine 10 shown in FIGS. 1-16F is a reciprocating-piston, internal combustion engine. As shown in FIG. 1, engine 10 includes a cylinder block 12. Exemplary cylinder block 12 defines a number of cylinders 14, each defining a longitudinal cylinder axis CL. As explained in more detail herein, some embodiments of exemplary cylinder block 12 may have a length $L_B$ that is relatively longer than a conventional cylinder block to accommodate a crankshaft having crankpins that are relatively longer than some conventional crankpins.

In the exemplary embodiment shown, engine 10 has an in-line configuration and four cylinders 14a, 14b, 14c, and 14d. Although exemplary engine 10 has a configuration commonly referred to as an "in-line four" configuration, engine 10 may have other configurations known to those skilled in the art, such as, for example, configurations commonly referred to as "V," "W," "H," "flat," "horizontally-opposed," and "radial." Further, although exemplary engine 10 has four cylinders, engine 10 may have other numbers of cylinders known to those skilled in the art, such as, for example, one, two, three, five, six, eight, twelve, sixteen, twenty, and twenty-four. Thus, engine 10 may have, for example, any one of configurations commonly referred to as "flat-four," "flat-six," "in-line six," "V-6," "straight-eight," "V-8," "V-10," "V-12," "W-12," and "H-16." Further, although exemplary engine 10 is described herein in relation to four-stroke operation, other operations known to those skilled in the art are contemplated, such as, for example, two-stroke, three-stroke, five-stroke, and six-stroke operation. Exemplary engine 10 may be a spark-ignition engine, compression-ignition engine, or combinations and/or modifications thereof known to those skilled in the art.

Figure 2:
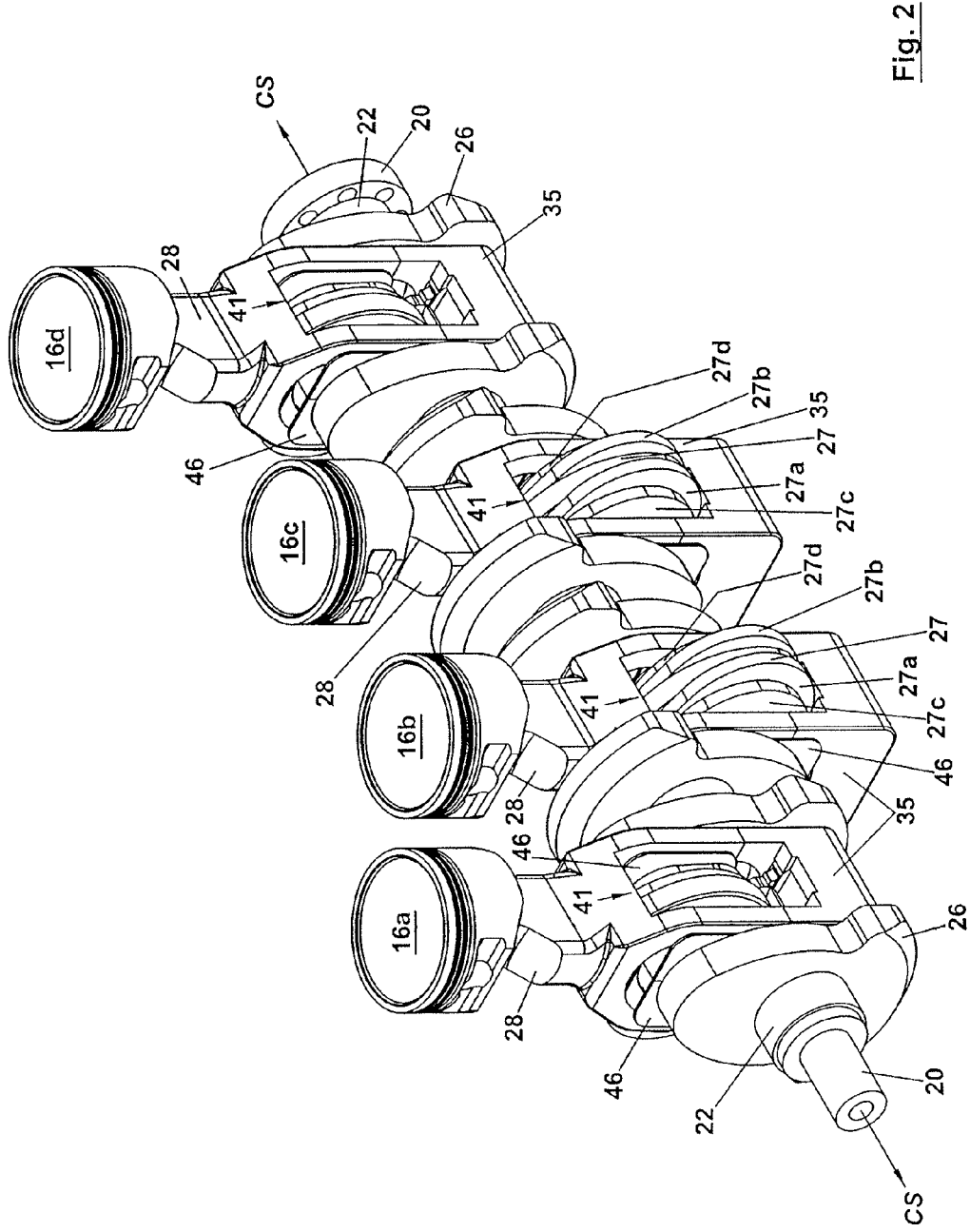
FIG. 2 is a schematic partial perspective view of a portion of the exemplary embodiment shown in FIG. 1.

As shown in FIGS. 1 and 2, exemplary engine 10 includes pistons 16 corresponding to cylinders 14, for example, four pistons 16a, 16b, 16c, and 16d. As shown in FIG. 1, pistons 16a and 16d are positioned in the upper end (i.e., "upper" being relative to the orientation of engine 10 shown in FIG. 1) of cylinders 14a and 14d, respectively, while pistons 16b and 16c are not visible in FIG. 1 due to being positioned lower in the cylinders 14b and 14c, respectively. To the extent that the relative positions of the pistons 16 in the cylinders 14 tend to indicate a relative firing order of engine 10 (i.e., the sequential order of combustion events as identified by cylinders), exemplary engine 10 may be configured to have a different firing order, as is known to those skilled in the art.

Figure 3:
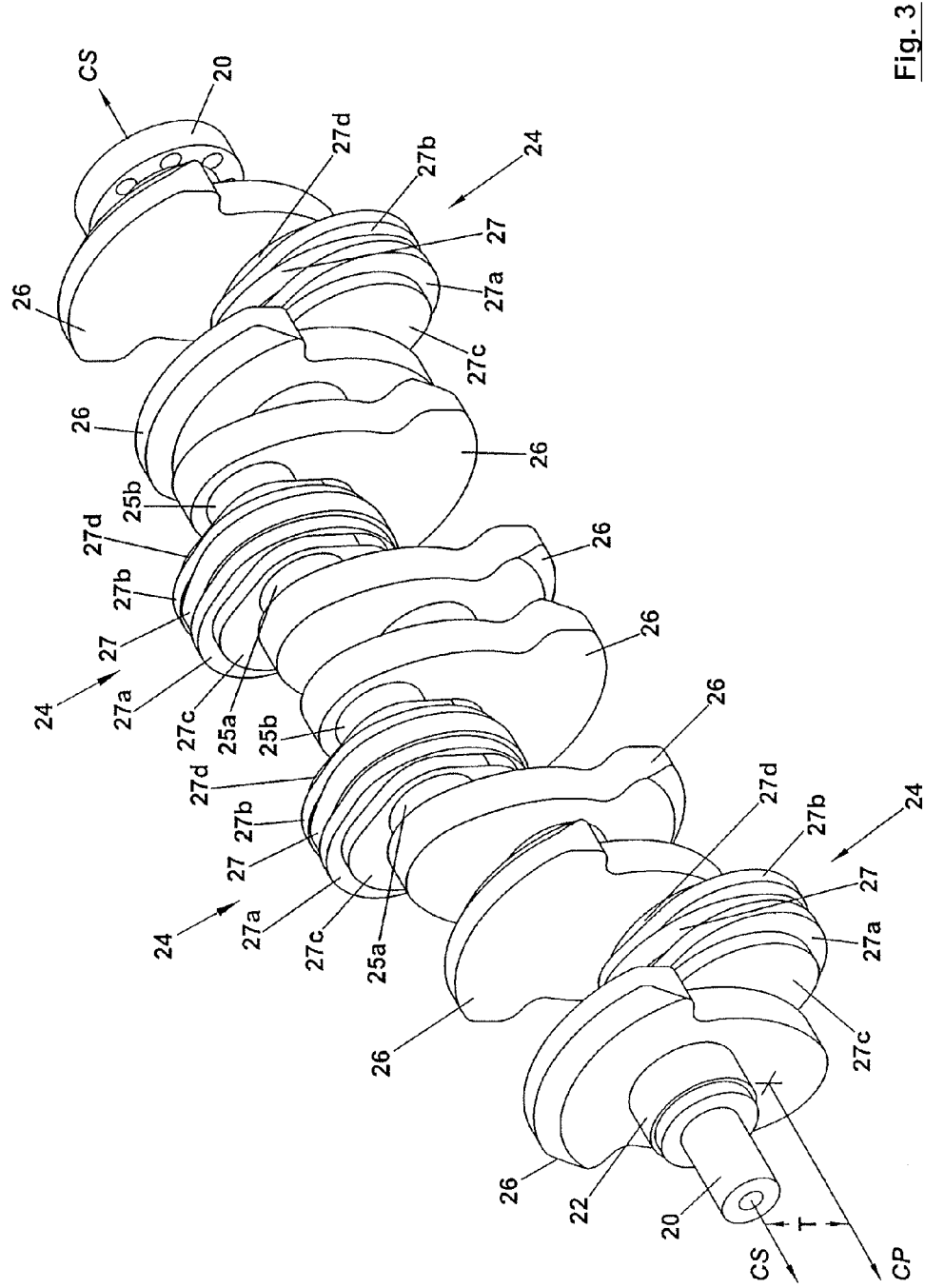
FIG. 3 is a schematic perspective view of an exemplary embodiment of a crankshaft for the exemplary embodiment shown in FIG. 1.

Cylinder block 12 of exemplary engine 10 defines a number of bearings (not shown) for receiving a crankshaft 20, such that crankshaft 20 may rotate relative to cylinder block 12 along a longitudinal crankshaft axis CS defined by crankshaft 20. For example, as shown in FIG. 3, crankshaft 20 defines a number of crankshaft journals 22 having a circular cross-section with a cross-section center. The number of crankshaft journals 22 corresponds to the number of bearings defined by cylinder block 12, and crankshaft journals 22 are received by bearings, such that crankshaft 20 may rotate along longitudinal crankshaft axis CS.

Exemplary crankshaft 20 shown in FIGS. 2 and 3 also defines a number of crankpins 24 corresponding to the number of pistons 16, although the number of crankpins 24 does not necessarily equal the number of pistons 16. As shown in FIG. 3, each of exemplary crankpins 24 includes a pair of crankpin journals 25a and 25b separated by a crankpin cam 27, a pair of secondary crankpin cams 27a and 27b, and a pair of tertiary crankpin cams 27c and 27d. In the example shown, secondary crankpin cams 27a and 27b are located on either side of crankpin cam 27, and tertiary crankpin cams 27c and 27d are located on opposite sides of secondary crankpin cams 27a and 27b. According to some embodiments (not shown), crankshaft 20 may include only a single secondary crankpin cam 27a and only a single tertiary crankpin cam 27c. In such embodiments, secondary crankpin cam 27a may be located on one side of crankpin cam 27, with tertiary crankpin cam 27c being located on the opposite side of secondary crankpin cam 27a from crankpin cam 27, such that the crankpin cams are arranged sequentially as crankpin cam 27, secondary crankpin cam 27a, and tertiary crankpin cam 27c. Alternatively, secondary crankpin cam 27a may be located to one side of crankpin cam 27, with tertiary crankpin cam 27c being located on the opposite side of crankpin cam 27 from secondary crankpin cam 27a, such that the crankpin cams are arranged sequentially as tertiary crankpin cam 27c, crankpin cam 27, and secondary crankpin cam 27a. (As used herein, the terms "secondary" and "tertiary" do not indicate relative importance. Rather, these terms are used to distinguish similar types of structures from one another.)

Exemplary crankpin journals 25a and 25b are circular in cross section, and the respective circular cross-sections may define a center C (see, e.g., FIGS. 8A-8C), which, in turn, defines a longitudinal crankpin axis CP extending in a perpendicular manner through center C of the cross-section of the respective crankpin journals 25a and 25b, such that crankpin axis CP is parallel and offset with respect to crankshaft axis CS. For example, crankpin axis CP is spaced a distance T (see FIGS. 3 and 9A) from the longitudinal axis CS of crankshaft 20. Crankshaft 20 may also include a number of counterbalance weights 26 for providing (or improving) rotational balance of crankshaft 20 when assembled with pistons 16 and connecting rods. A line extending between the longitudinal crankshaft axis CS and the longitudinal crankpin axis CP defines a radial axis RA of crankshaft 20 (see FIGS. 9A-16F and 18A-25F).

Figure 8A:
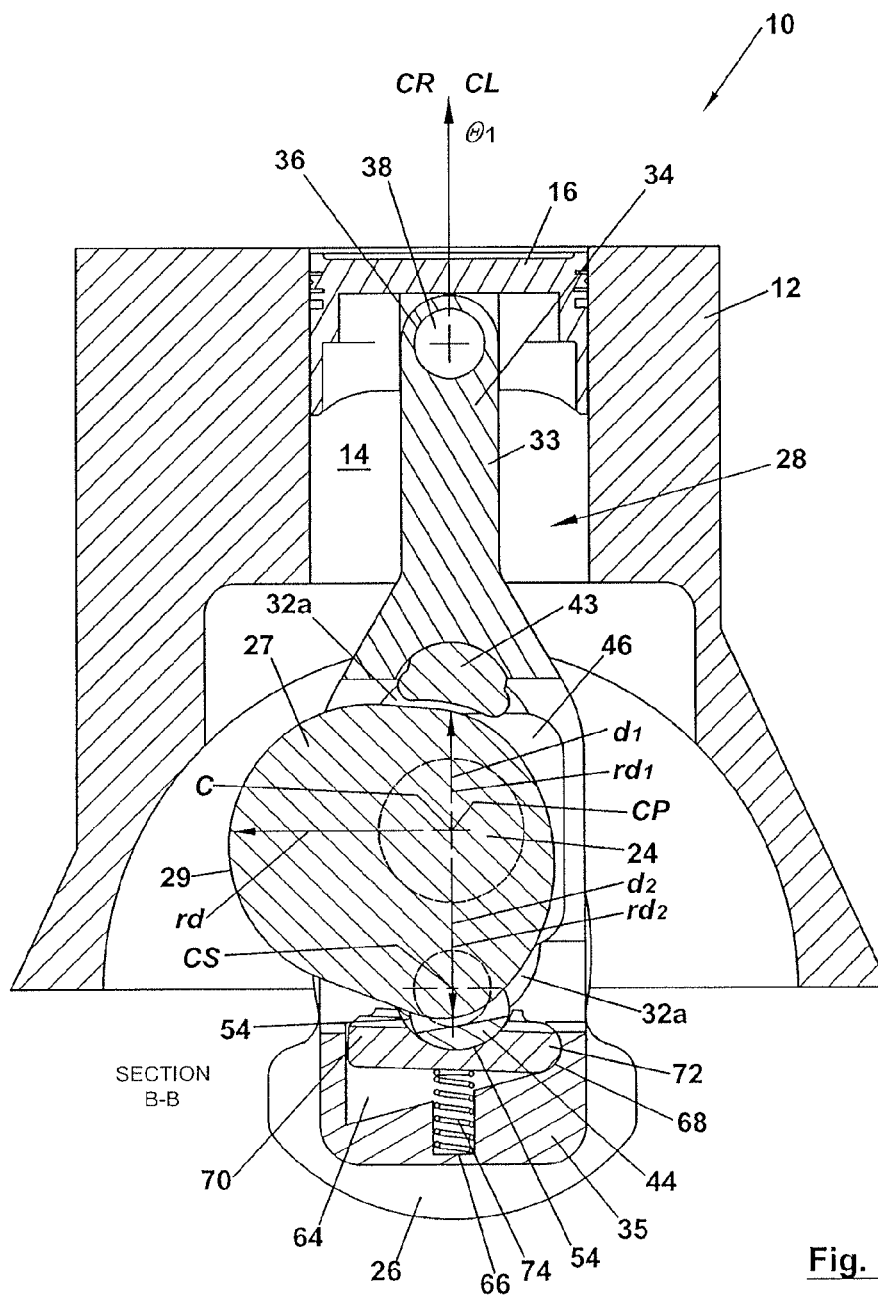
FIG. 8A is a schematic partial section view taken along line B-B of FIG. 7.

Regarding exemplary crankpin cam 27, as shown in, for example, FIG. 8A, crankpin cam 27 defines a cam profile 29 corresponding to a radial distance $r_d$ from crankpin axis CP to an edge face 31 of crankpin cam 27. Radial distance $r_d$ varies from a minimum radial distance to a maximum radial distance to define cam profile 29. According to the exemplary embodiment shown in FIG. 8A, cam profile 29 of crankpin cam 27 defines a generally convex radius, with a portion of cam profile 29 having a substantially constant radius for at least about 70 degrees of cam profile 29 (e.g., for at least about 80 degrees, at least about 90 degrees, at least about 100 degrees, at least about 110 degrees, at least about 120 degrees, at least about 130 degrees, at least about 140 degrees, or at least about 150 degrees). According to some embodiments cam profile 29 may have a portion defining a substantially constant radial distance $r_d$ for at least about 70 degrees of cam profile (e.g., at least about 80 degrees, at least about 90 degrees, at least about 100 degrees, at least about 110 degrees, at least about 120 degrees, at least about 130 degrees, at least about 140 degrees, or at least about 150 degrees).

In the exemplary embodiment shown in FIG. 8A, in a first direction $d_1$ extending along a line from the longitudinal crankshaft axis CS toward the longitudinal crankpin axis CP, the radial distance $r_{d1}$ associated with the first direction $d_1$ is less than the maximum radial distance. Also, in a second direction $d_2$ extending along a line from the longitudinal crankpin axis CP toward the longitudinal crankshaft axis CS, the radial distance $r_{d2}$ associated with the second direction $d_2$ is greater than the radial distance $r_{d1}$ associated with the first direction $d_1$.

Figure 8B:
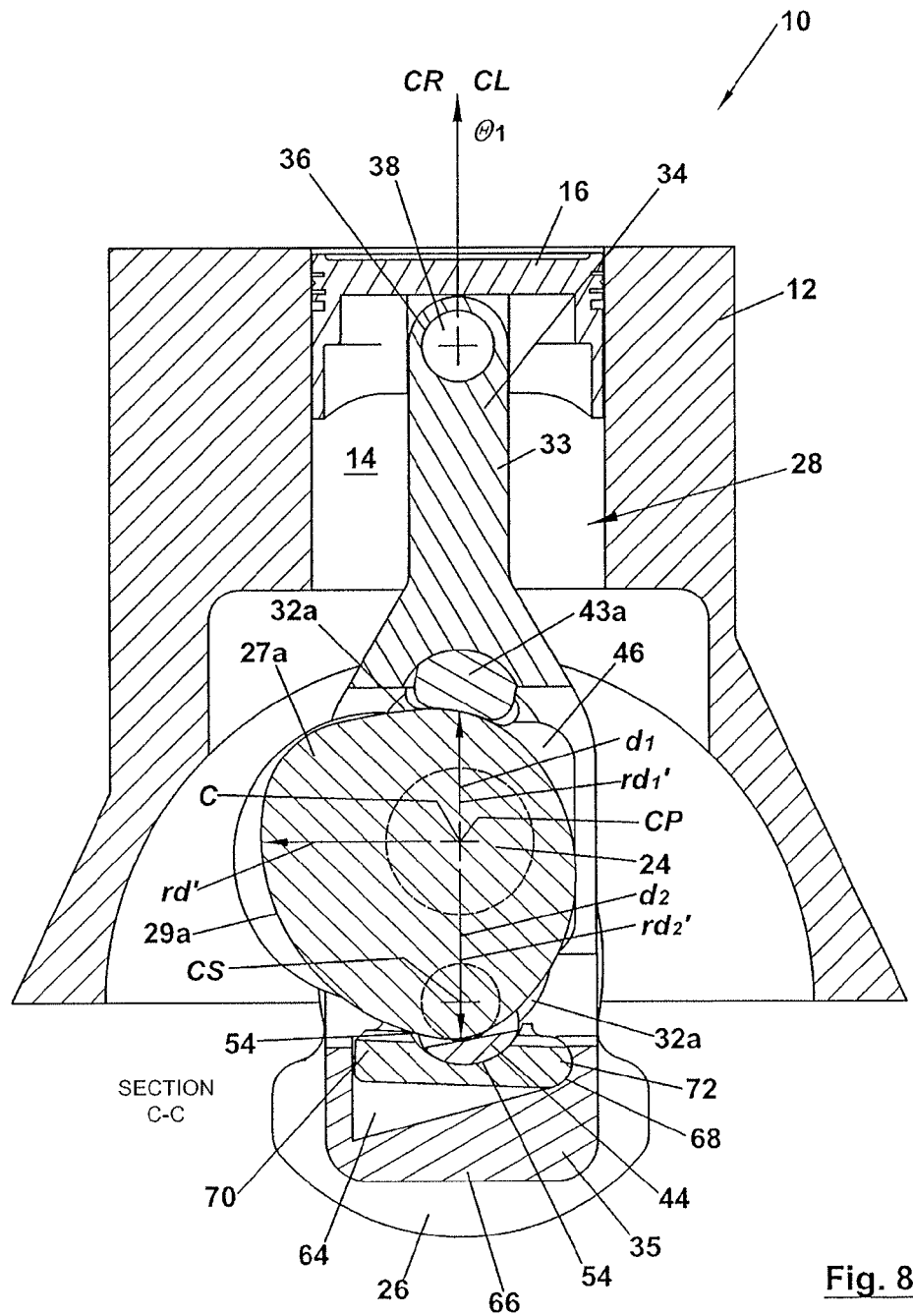
FIG. 8B is a schematic partial section view taken along line C-C of FIG. 7.

Similar to crankpin cam 27, secondary crankpin cams 27a and 27b define secondary cam profiles 29a and 29b corresponding to radial distances $r_d'$ from crankpin axis CP to edge faces 31a and 31b of secondary crankpin cams 27a and 27b, respectively, as shown in FIG. 8B. Radial distances $r_d'$ vary from a minimum radial distance to a maximum radial distance to define secondary cam profiles 29a and 29b. As shown in FIG. 8B, in a first direction $d_1$ extending along a line from the longitudinal crankshaft axis CS toward the longitudinal crankpin axis CP, the radial distance $r_{d'1}$ associated with the first direction $d_1$ is less than the maximum radial distance. Also, in a second direction $d_2$ extending along a line from the longitudinal crankpin axis CP toward the longitudinal crankshaft axis CS, the radial distance $r_{d'2}$ associated with the second direction $d_2$ is greater than the radial distance $r_{d'1}$ associated with the first direction $d_1$. According to some embodiments, secondary cam profiles 29a and 29b may be substantially the same as cam profile 29 of crankpin cam 27. According to some embodiments, secondary cam profiles 29a and 29b may differ substantially from cam profile 29 of crankpin cam 27.

Figure 8C:
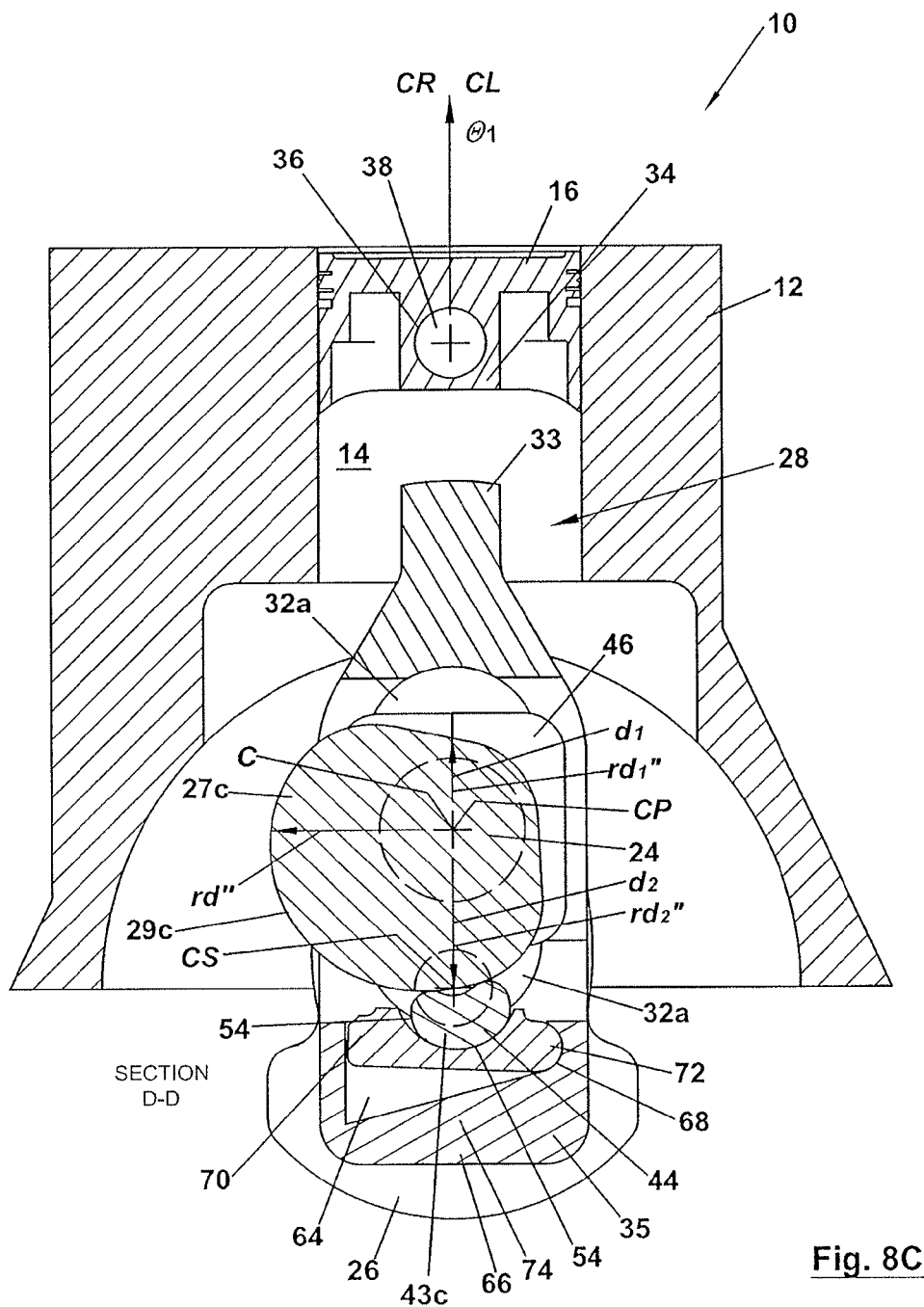
FIG. 8C is a schematic partial section view taken along line D-D of FIG. 7.

Tertiary crankpin cams 27c and 27d define tertiary cam profiles 29c and 29d corresponding to radial distances $r_d''$ from crankpin axis CP to edge faces 31c and 31d of tertiary crankpin cams 27c and 27d, respectively, as shown in FIG. 8C. Radial distances $r_d''$ vary from a minimum radial distance to a maximum radial distance to define tertiary cam profiles 29c and 29d. As shown in FIG. 8C, in a first direction $d_1$ extending along a line from the longitudinal crankshaft axis CS toward the longitudinal crankpin axis CP, the radial distance $r_{d''1}$ associated with the first direction $d_1$ is less than the maximum radial distance. Also, in a second direction $d_2$ extending along a line from the longitudinal crankpin axis CP toward the longitudinal crankshaft axis CS, the radial distance $r_{d''2}$ associated with the second direction $d_2$ is greater than the radial distance $r_{d''1}$ associated with the first direction $d_1$.

According to some embodiments, cam profile 29, secondary cam profiles 29a and 29b, and tertiary cam profiles 29c and 29d may all differ from one another. According to some embodiments, one or more of cam profile 29, secondary cam profiles 29a and 29d, and tertiary cam profiles 29c and 29d may be substantially the same. For example, one or more of cam profile 29, secondary cam profiles 29a and 29d, and tertiary cam profiles 29c and 29d may be substantially the same, but revolved about crankpin axis CP relative to one another.

Referring to FIG. 2, pistons 16 are operably coupled to crankpins 24 via a number of respective connecting rods 28 corresponding to the number of pistons 16. For example, exemplary connecting rods 28 (see, e.g., FIG. 4) include a proximal end 30 having an oblong openings 32a and 32b, and a distal end 34 having a second aperture 36. Proximal end 30 of exemplary connecting rod 28 is operably coupled to crankpin 24 of crankshaft 20 via oblong openings 32a and 32b, and distal end 34 of connecting rod 28 is operably coupled to piston 16 via a pin 38.

Figure 5A:
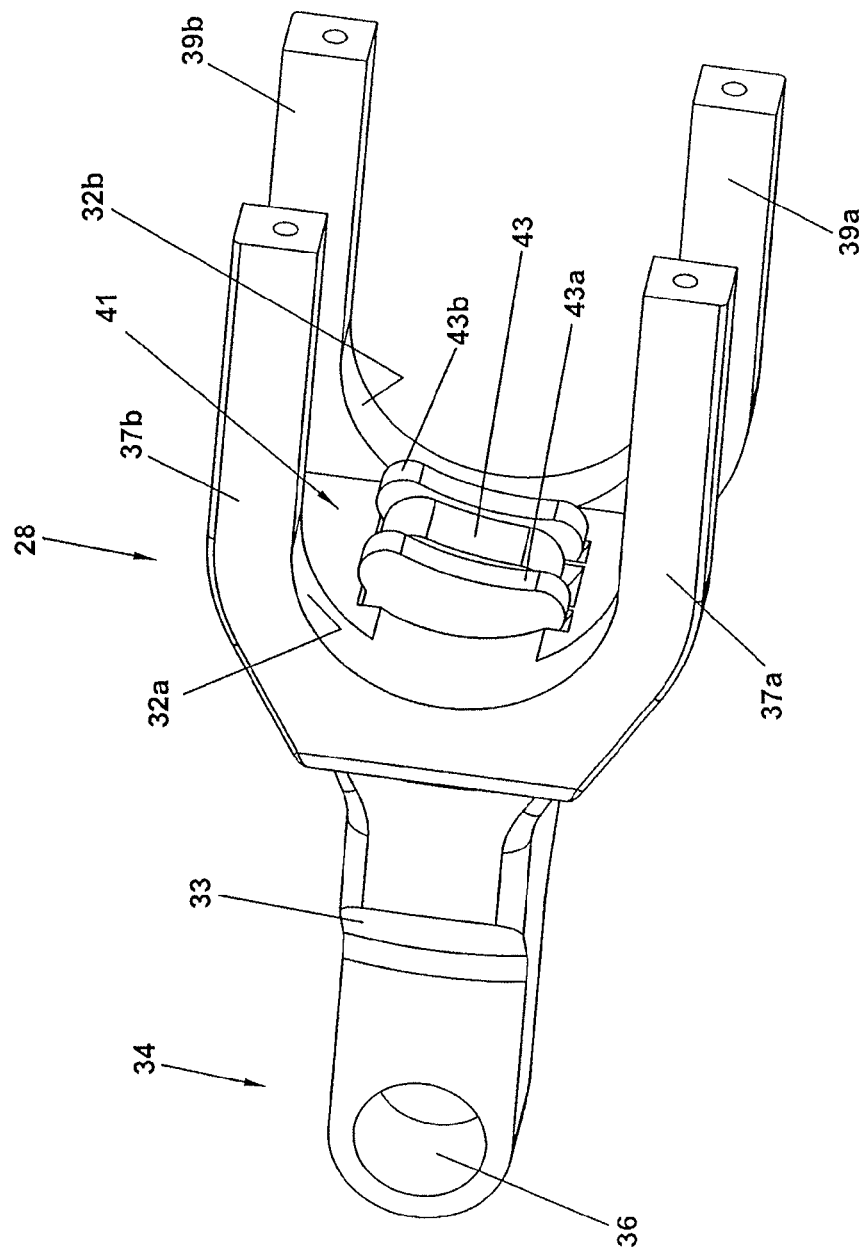
FIG. 5A is a schematic perspective view of a portion of the exemplary connecting rod shown in FIG. 4.
Figure 5B:
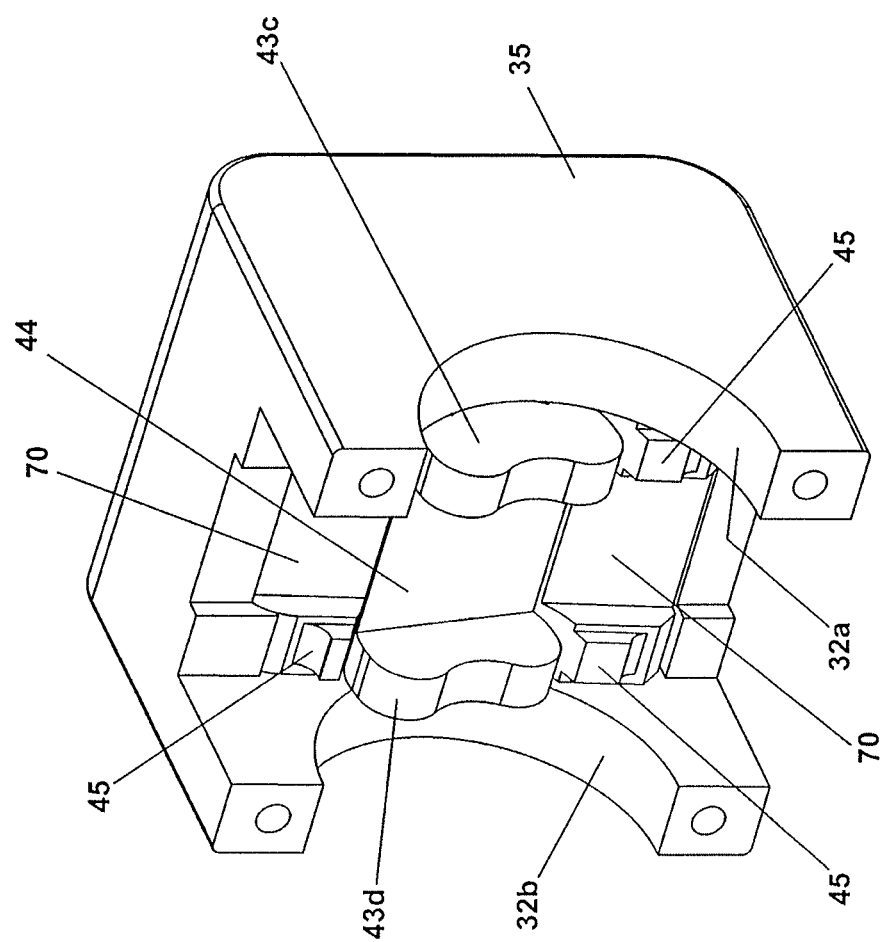
FIG. 5B is a schematic perspective view of another portion of the exemplary connecting rod shown in FIG. 4.
Figure 6:
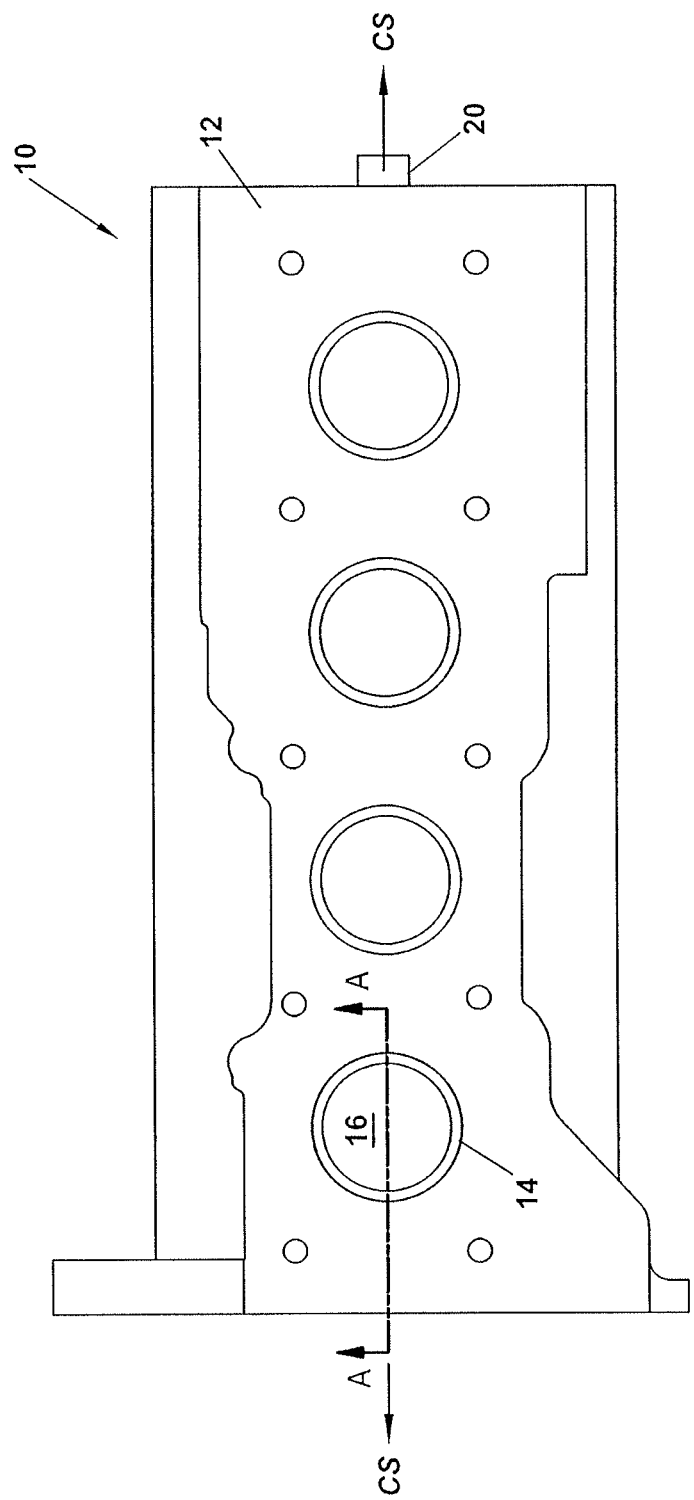
FIG. 6 is a schematic top view of the exemplary embodiment shown in FIG. 1.
Figure 7:
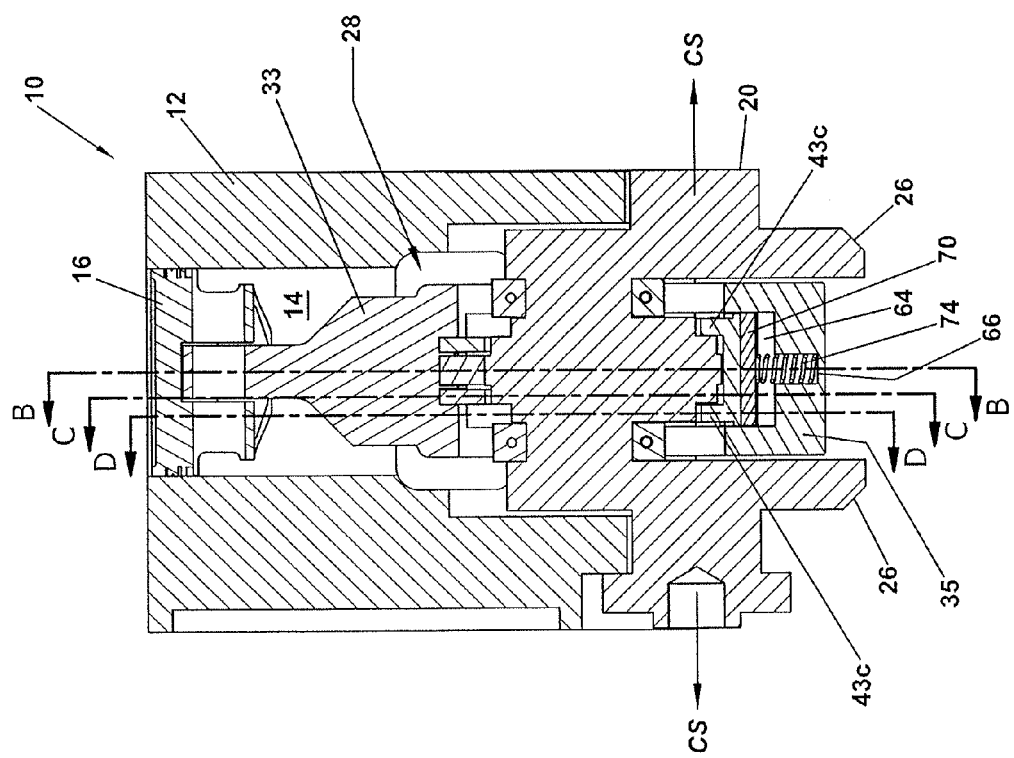
FIG. 7 is a schematic partial side section view taken along line A-A of FIG. 6.

As shown in FIGS. 4, 5A, and 5B, exemplary connecting rod 28 includes a rod portion 33 and a cap portion 35. Exemplary rod portion 33 and exemplary cap portion 35 define oblong openings 32a and 32b, with oblong openings 32a and 32b each defining a longitudinal axis, which may generally extend parallel to a longitudinal axis CR of connecting rod 28. Oblong openings 32a and 32b define a width orthogonal to longitudinal axes that generally corresponds to the cross-section diameter of crankpin journals 25a and 25b, thereby permitting crankpin journals 25a and 25b to move linearly relative to connecting rod 28. This exemplary configuration permits relative linear movement between the longitudinal crankpin axis CP and proximal end 30 of connecting rod 28.

As shown in FIGS. 4 and 5A, exemplary rod portion 33 includes a first pair of legs 37a and 37b and a second pair of legs 39a and 39b spaced from the first pair of legs 37a and 37b, thereby providing a clearance 41 between the first and second pairs of legs. First pair of legs 37a and 37b at least partially defines first oblong opening 32a, and second pair of legs 39a and 39b at least partially defines second oblong opening 32b.

In the exemplary embodiment shown in FIG. 4, sleeves 46 may be provided in oblong openings 32a and 32b. For example, exemplary sleeves 46 shown in FIG. 4 include sleeves halves 48 defining a bearing surface 50 for receiving one of journals 25a and 25b of crankpin 24. Sleeve halves 48 include opposing flanges 52, such that when sleeves 46 are assembled in oblong openings 32a and 32b, the pairs of legs 37a and 37b and 39a and 39b, are sandwiched between the opposing flanges 52 of respective sleeves 46. Sleeves 46 permit crankpin 24 to reciprocate within oblong openings 32a and 32b, while providing bearing surfaces 50 in which crankpin journals 25a and 25b rotate.

As shown in FIGS. 5A and 5B, rod portion 33 includes a follower 43 and secondary followers 43a and 43b associated with clearance 41. For example, in the exemplary embodiment shown, follower 43 and secondary followers 43a and 43b are located in clearance 41 at the apex of first pair of legs 37a and 37b and second pair of legs 39a and 39b. Rod portion 33 of connecting rod 28 is coupled to crankshaft 20 such that first pair of legs 37a and 37b and second pair of legs 39a and 39b are associated with first crankpin journal 25a and second crankpin journal 25b, respectively, with cam 27, secondary cams 27a and 27b, and tertiary cams 27c and 27d of crankpin 24 being positioned in clearance 41 (see FIG. 2). Exemplary cap portion 35 (see FIG. 5B) may be coupled to first pair of legs 37a and 37b and second pair of legs 39a and 39b by cap bolts (not shown), thereby enclosing respective oblong openings 32a and 32b about respective crankpin journals 25a and 25b, with cam 27, secondary cams 27a and 27b, and tertiary cams 27c and 27d being confined in clearance 41 of connecting rod 28. Some embodiments may include only a single secondary follower 43a corresponding to a single secondary crankpin cam 27a and/or only a single tertiary follower 42c corresponding to a single tertiary crankpin cam 27c.

According to the exemplary embodiment shown in FIG. 5A, exemplary follower 43 and secondary followers 43a and 43b are configured to oscillate with respect to rod portion 33 to reduce friction and wear between respective crankpin cam 27 and follower 43, and between respective secondary crankpin cams 27a and 27b and secondary followers 43a and 43b. Follower 43 and secondary followers 43a and 43b may be formed of a single piece construction such that they oscillate together with one another. According to some embodiments, follower 43 and secondary followers 43a and 43b may be formed independently of one another such that they may oscillate independently of one another. According to some embodiments, secondary followers 43a and 43b may be configured to oscillate together but independently from follower 43.

Follower 43 may include a follower surface shaped to provide a concave radius adjacent the surface of cam 27 that is substantially the same as the complimentary convex radius of cam profile 29 at the point in which the power stroke begins (e.g., at the angular position of radial axis RA coincident with the end of the delay of the beginning of the power stroke, for example, when radial axis RA is 35 degrees past first stroke termination angle $\theta_1$ (see, e.g., FIG. 11A)). For example, follower 43 may have a follower surface having a concave radius substantially the same as a portion of the convex radius of cam profile 29 that has substantially the same radius for at least about 70 degrees of cam profile 29 (e.g., for at least about 80 degrees, at least about 90 degrees, at least about 100 degrees, at least about 110 degrees, at least about 120 degrees, at least about 130 degrees, at least about 140 degrees, or at least about 150 degrees). Such an exemplary configuration may serve to increase the area of contact between cam 27 and follower 43, thereby reducing friction and/or wear of cam 27 and/or follower 43.

According to some embodiments (e.g., the exemplary embodiments shown in FIGS. 17-25F), secondary followers 43a and 43b may include respective follower surfaces shaped to have a concave radius adjacent the surface of secondary cams 27a and 27b that are substantially the same as the complimentary convex radii of secondary cam profiles 29a and 29b, for example, at the point in which the power stroke begins. For example, secondary followers 43a and 43b may have follower surfaces having concave radii substantially the same as a portion of the convex radii of cam secondary cam profiles 29a and 29b that have substantially the same radius for at least about 70 degrees of secondary cam profiles 29a and 29b (e.g., for at least about 80 degrees, at least about 90 degrees, at least about 100 degrees, at least about 110 degrees, at least about 120 degrees, at least about 130 degrees, at least about 140 degrees, or at least about 150 degrees). Such an exemplary configuration may serve to increase the area of contact between secondary crankpin cams 27a and 27b and respective secondary followers 43a and 43b, thereby reducing friction and/or wear of secondary cams 27a and 27b and/or secondary followers 43a and 43b.

Figure 9C:
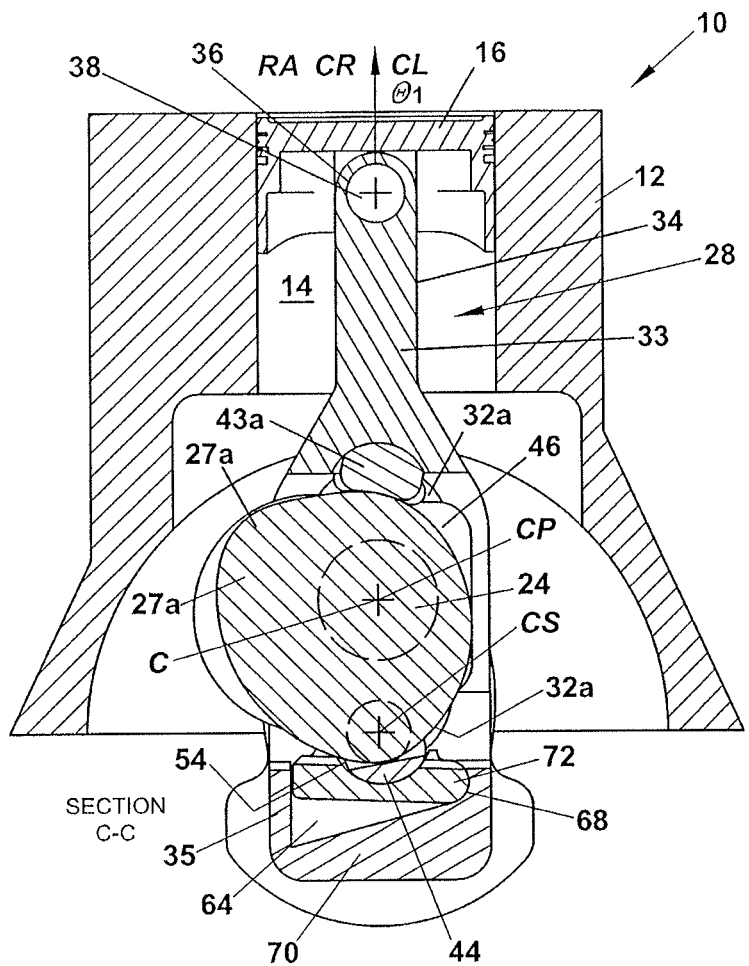
FIG. 9C is a schematic partial end section view taken along line C-C of FIG. 7 with a radial axis angle of the crankshaft shown at 0 degrees.

In the exemplary embodiment shown in FIG. 9A, exemplary follower 43 also includes a convex radius adjacent a complimentary surface of rod portion 33 against which follower 43 oscillates. This exemplary configuration may serve to increase the area of contact between follower 43 and the surface of rod portion 33, thereby reducing friction and/or wear of rod portion 33 and/or follower 43. Similarly, as shown in FIG. 9C, exemplary secondary followers 43a and 43b also include convex radii adjacent a complimentary surface of rod portion 33 against which secondary followers 43a and 43b oscillate. This exemplary configuration may serve to increase the area of contact between secondary followers 43a and 43b and the surface of rod portion 33, thereby reducing friction and/or wear of rod portion 33 and/or rod secondary followers 43a and 43b.

According to some embodiments, follower 43 and/or secondary followers 43a and 43b may include an arc-shaped slot (not shown), and rod portion 33 may include a pin (not shown), such that as the surfaces of cam 27 and secondary cams 27a and 27b ride, respectively, against follower 43 and secondary followers 43a and 43b, follower 43 and secondary followers 43a and 43b oscillate relative to rod portion 33. This may serve to maintain an increased area of contact between followers 43, 43a, and 43b and the respective surfaces of cams 27, 27a, and 27b, and rod portion 33, thereby reducing friction and/or wear of cams 27, 27a, and 27b, rod portion 33, and/or followers 43, 43a, and 43b.

Lubricant may be used to reduce the friction and/or wear resulting from relative motion between the respective cams and followers. For example, lubricant may be provided to reduce the friction and/or wear between one or more of the surfaces of followers 43, 43a, and 43b and the respective surfaces of cams 27, 27a, and 27b. According to some embodiments, one or more of the surfaces of followers 43, 43a, and 43b and the respective surfaces of cams 27, 27a, and 27b may be configured to promote hydrodynamic lubrication or fluid film lubrication between the respective surfaces.

In the exemplary embodiment shown in FIG. 5B, cap portion 35 of connecting rod 24 includes respective tertiary followers 43c and 43d configured to follow respective tertiary crankpin cams 27c and 27d. For example, in the exemplary embodiment shown in FIGS. 4 and 5B, tertiary followers 43c and 43d are located at the apexes of the cap-end of oblong openings 32a and 32b. Rod portion 33 and cap portion 35 of connecting rod 28 are coupled to crankshaft 20 such that tertiary crankpin cams 27c and 27d are aligned with tertiary followers 43c and 43d, respectively. Some embodiments may include only a single tertiary crankpin cam 27c and a single tertiary follower 43c. Tertiary crankpin cams 27c and 27d and tertiary followers 43c and 43d may serve to pull connecting rod 28 and piston 16 down cylinder 14 during the intake stroke of engine 10 (i.e., when engine 10 is a four-stroke engine), during which crankshaft 20 operates to pull piston 16 down cylinder 14 in the absence of combustion force acting on piston 16. Interaction between tertiary crankpin cams 27c and 27d and tertiary followers 43c and 43d transmits the pulling force from crankpin 24 to piston 16 via tertiary crankpin cams 27c and 27d, tertiary followers 43c and 43d, and connecting rod 28 by preventing crankpin 24 from sliding in an unrestrained manner within oblong openings 32a and 32b.

As shown in FIG. 5B, connecting rod 28 may include a single cap portion 35 that is coupled to first and second pairs of legs 37a, 37b, 39a, and 39b via, for example, fasteners such as bolts (not shown). As shown (see, e.g., FIG. 10A), exemplary cap portion 35 includes a cap recess 64 having a cavity 66 (e.g., a bore). In the exemplary embodiment shown, cap recess 64 includes one end 68 having an arc-shaped face, and cap recess 64 receives a rocker member 70 having one end with a surface 72 that is arc-shaped in a complimentary manner with respect to end 68 of cap recess 64 to facilitate movement, such as an oscillating motion, between rocker member 70 and cap portion 35. A biasing member 74 may be provided in cavity 66 to bias rocker member 70, such that it pivots out with respect to cap recess 64 of cap portion 35 (see, e.g., FIGS. 9E and 9F). Biasing member 74 may include any known biasing arrangement, such as, for example, one or more springs, hydraulic assemblies, and/or gas-pressurized assemblies.

According to some embodiments, rocker member 70 may include a groove 54 (e.g., having an arc-shaped cross-section) receiving tertiary followers 43c and 43d, which have respective surfaces complementary to groove 54, such that tertiary followers 43c and 43d may oscillate or otherwise generally move in groove 54. Tertiary followers 43c and 43d are mounted at opposite ends of a follower base 44 (see, e.g., FIG. 5B), and thus, tertiary followers 43c and 43d also oscillate or otherwise generally move with respect to cap portion 35. According to some embodiments, rocker member 70 may include one or more protrusions 45 adjacent groove 54 and tertiary followers 43c and 43d that help prevent tertiary followers 43c and 43d from binding in groove 54 during oscillation.

Exemplary rocker member 70 may serve to substantially maintain contact between respective tertiary crankpin cams 27c and 27d and tertiary followers 43c and 43d. For example, as shown in FIGS. 11E, 11F, 12E, and 12F, rocker member 70 pivots with respect to cap portion 35, with biasing member 74 providing a biasing force to hold tertiary followers 43c and 43d against respective tertiary crankpin cams 27c and 27d. This may result in reduced friction, wear, and/or noise during operation of engine 10.

According to the exemplary embodiments shown, tertiary followers 43c and 43d may include follower surfaces that are concave, such that they provide a greater area of contact with cam profiles 29c and 29d of tertiary crankpin cams 27c and 27d. For example, the follower surfaces may have a concave radius that corresponds to the smallest convex radius of tertiary crankpin cams 27c and 27d. According to some embodiments (e.g., as shown), the follower surfaces of tertiary followers 43c and 43d may be configured such that they contact tertiary crankpin cams 27c and 27d at at least two discrete contact points across at least a portion of the widths of the respective tertiary crankpin cams 27c and 27d and tertiary followers 43c and 43d (see, e.g., FIGS. 9F, 10F, 11F, 12F, 13F, 14F, 15F, and 16F). This may serve to reduce friction and/or wear between tertiary crankpin cams 27c and 27d and tertiary followers 43c and 43d.

According to some embodiments, as the surfaces of tertiary crankpin cams 27c and 27d ride against and pass tertiary followers 43c and 43d, followers 43c and 43d oscillate relative to cap portion 35, for example, as shown in FIGS. 9F, 10F, 11F, 12F, 13F, 14F, 15F, and 16F. This may serve to maintain an increased area of contact between tertiary followers 43c and 43d and the surfaces of tertiary crankpin cams 27c and 27d, thereby reducing friction and/or wear of tertiary crankpin cams 27c and 27d and/or tertiary followers 43c and 43d.

Lubricant may be used to reduce the friction and/or wear resulting from relative motion between the respective tertiary cams and tertiary followers. For example, lubricant may be provided to reduce the friction and/or wear between one or more of the surfaces of tertiary followers 43c and 43d and the respective surfaces of tertiary cams 27c and 27d. According to some embodiments, one or more of the surfaces of tertiary followers 43c and 43d and the respective surfaces of tertiary cams 27c and 27d may be configured to promote hydrodynamic lubrication or fluid film lubrication between the respective surfaces.

One or more of crankpin cam 27, secondary crankpin cams 27a and 27b, tertiary cams 27c and 27d, follower 43, secondary followers 43a and 43b, and tertiary followers 43c and 43d may be formed from a hardened material configured to withstand the friction associated with interaction between the cams and followers. For example, one or more of the cams and followers may be formed from hardened bearing material known to those skilled in the art. According to some embodiments, one or more of followers 43, secondary followers 43a and 43b, tertiary followers 43c and 43d may be mounted in a biased manner such that the follower(s) are biased to contact a corresponding cam. Such biasing force may be provided by, for example, a spring, a hydraulic biasing force, and/or a gas-pressurized biasing force. Such biasing may serve, for example, to maintain contact between crankpin cam 27, secondary crankpin cams 27a and 27b, and tertiary crankpin cams 27c and 27d, and respective follower 43, secondary followers 43a and 43b, and tertiary followers 43c and 43d, and/or to reduce noise associated with operation exemplary engine 10.

According to some embodiments, one or more of crankpin cam 27, secondary crankpin cams 27a and 27b, tertiary crankpin cams 27c and 27d, follower 43, secondary followers 43a and 43b, and tertiary followers 43c and 43d may be configured such that one or more of the cams remains in contact with a corresponding one or more of the followers throughout the 360-degree rotation of radial axis RA. In this exemplary manner, relative movement between crankpin 24 and connecting rod 28 may be more closely controlled throughout the 360-degree rotation of radial axis RA. According to some embodiments, relative movement between crankpin 24 and connecting rod 28 may not be closely controlled throughout the entire 360-degree rotation of radial axis RA.

During operation of a conventional engine, a piston reciprocates within the cylinder, such that during a power stroke of the internal combustion engine, combustion of an air/fuel mixture within a combustion chamber defined by the piston, cylinder, and a cylinder-head forces the piston toward the crankshaft. As the piston travels toward the crankshaft, the crankshaft is rotated via the connecting rod and crankpin, thereby converting the potential energy associated with the compressed air/fuel mixture into mechanical work.

Due to the architecture of a conventional internal combustion engine, however, when the piston is at a position within the cylinder that coincides with the maximum compression (i.e., the combustion chamber is at its lowest volume, this condition generally coinciding with maximum compression, when the piston is farthest from the crankshaft), the radial axis extending between the center of the crankshaft and the center of the crankpin tends to be nearly co-linear, if not co-linear, with the axis of the connecting rod. At these relative positions, as the piston first begins its movement toward the crankshaft during the power stroke, there is only a very short moment arm (if any) extending between the axis of the connecting rod and the radial axis. As a result, the force initially created by the air/fuel mixture at the moment of combustion does not transfer as much torque to the crankshaft as it would if the length of the moment arm were greater. This situation may be particularly undesirable because, during combustion and very shortly thereafter, the force on the piston due to the combustion event may approach its maximum magnitude. Further, as the piston travels down the cylinder toward the crankshaft and the length of the moment arm increases, the magnitude of the force from the combustion event acting on the piston may dissipate rapidly. Thus, because there is a very short moment arm created between the axis of the connecting rod and the radial axis during the time of maximum force on the piston, efficiency of the work generated from the combustion process in a conventional internal combustion engine may be less than desired.

In contrast, during operation of exemplary engine 10, as crankshaft 20 rotates, crankpins 24 revolve around crankshaft longitudinal axis CS, such that crankpin centers C define a circular path having a radius defined by the distance T defined along a radial axis RA (see, e.g., FIGS. 3 and 9A) extending between the longitudinal axis CS of crankshaft 20 and the longitudinal axis CP of the respective crankpins 24. Thus, proximal ends 30 of connecting rods 28, which are coupled to crankpins 24 via oblong openings 32a and 32b of connecting rods 28, move based on the profiles of crankpin cams 27, 27a, 27b, 27c, and 27d, as explained in more detail below with respect to FIGS. 9A-25F. Distal ends 34 of connecting rods 28 are constrained to move in a reciprocating and linear manner due to being operably coupled to pistons 16, which are likewise constrained to move in a reciprocating and linear manner within respective cylinders 14 defined by cylinder block 12. As a result, as crankshaft 20 rotates, pistons 16 reciprocate within respective cylinders 14, defining a piston stroke generally corresponding to twice the distance T between the crankpin axis CP and the crankshaft axis CS (as affected according to the exemplary operation described herein).

With exemplary engine 10, follower 43 rides against crankpin cam 27, secondary followers 43a and 43b ride against secondary crankpin cams 27a and 27b, and tertiary followers 43c and 43d ride against tertiary crankpin cams 27c and 27d. As the radial distance of the cam profiles vary, proximal end 30 of connecting rod 28 moves linearly with respect to longitudinal crankpin axis CP by virtue of crankpin journals 25a and 25b (see FIG. 3) reciprocating along the longitudinal axis within oblong openings 32a and 32b, as explained in more detail with respect to FIGS. 9A-25F. As a result of this exemplary configuration, the stroke of exemplary piston 16 is affected according to interaction between crankpin cams 27, 27a, 27b, 27c, and 27d, and respective followers 43, 43a, 43b, 43c, and 43d. As explained in more detail herein, this exemplary configuration may permit tailoring of the operation characteristics (e.g., power output, torque, efficiency, and/or responsiveness) of exemplary engine 10.

According to the exemplary embodiments shown in FIGS. 9A-25F, this interaction between crankpin 24 and connecting rod 28 may be configured such that substantial movement of piston 16 toward crankshaft 20 during the power stroke is delayed until crankshaft 20 has rotated to point at which there is a more effective moment arm between the transmission of the combustion force on piston 16 and a radial axis RA extending between crankshaft axis CS and a respective crankpin axis CP. For example, the crankpin cams may be shaped, such that crankpin 24 moves within oblong openings 32a and 32b as crankshaft 20 rotates without any movement, or without any significant amount of movement, of distal end 34 of connecting rod 28, thereby effectively increasing the distance between the center C of crankpin 24 and distal end 34 of connecting rod 28. As a result, a greater amount of the energy of the combustion event may be captured because the maximum force acting on piston 16 coincides with a greater moment arm, thereby resulting in more torque at crankshaft 20 during the power stroke. Timing of initiation of combustion may be tailored to take advantage of the delayed stroke.

For example, if piston 16 would have normally reversed its direction of travel where radial axis RA of crankshaft 20 is at 0 degrees, piston 16 may (1) reach its stroke termination point with radial axis RA at zero degrees and then delay its reversal of direction until a larger moment arm exists between connecting rod 28 and crankshaft axis CS, or (2) continue to move in cylinder 14 in a direction away from crankshaft 20, even after radial axis RA has reached 0 degrees and delay its reversal of direction until a larger moment arm exists between connecting rod 28 and crankshaft axis CS. As a result, a greater amount of the energy of the combustion event may be captured because the maximum force acting on piston 16 coincides with a greater moment arm, thereby resulting in more torque at crankshaft 20 during the power stroke.

FIGS. 9A-16F schematically illustrate exemplary operation of engine 10 having an exemplary configuration, which may serve to delay piston 16's travel down cylinder 14 at the beginning of the power stroke of engine 10. For example, followers 43, 43a, 43b, 43c, and 43d of connecting rod 28 interacts with cams 27, 27a, 27b, 27c, and 27d of crankpin 24, resulting in crankpin journals 25a and 25b (see FIG. 3) reciprocating within oblong openings 32a and 32b, thereby effectively altering the effective length of connecting rod 28. As shown in FIG. 8A, the cam profiles 29, 29a, and 29b respective radial distances $r_d$, $r_d'$, and $r_d''$ from longitudinal crankpin axis CP that varies, such that crankpin 24 is able to be move within oblong openings 32a and 32b as crankshaft 20 rotates without moving distal end 34 of connecting rod 28, thereby effectively increasing the distance between the center C of crankpin 24 and distal end 34 of connecting rod 28. Such an exemplary configuration renders it possible to effectively hold piston 16 in cylinder 14 at a substantially fixed position for a short period of time, even as crankpin 24 continues to revolve around crankshaft 20's axis CS as crankshaft 20 rotates. According to some embodiments, piston 16 may continue to travel up cylinder 14 for a short period of time. As a result, it is possible to maintain piston 16 at the point of highest compression in the combustion chamber while crankpin 24 revolves to a position that results in an increased moment arm defined by the transmission of the force acting on piston 16 and the radial axis RA extending between the center of crankshaft 20 and the center C of crankpin 24. This results in relatively more torque being applied to crankshaft 20 as combustion begins, with piston 16 being at a point farthest from the center of crankshaft 20 (i.e., at the end of its upward stroke as shown). In this exemplary manner, the delaying strategy outlined below may be implemented.

For the purpose of clarity of the description and due to the limited ability of the section views of FIGS. 9A-16F to show various exemplary structures, although the exemplary embodiments described with respect to FIGS. 9A-16F include pairs of crankpin journals 25a and 25b (see FIG. 3), pairs of oblong openings 32a and 32b, pairs of secondary crankpin cams 27a and 27b, pairs of secondary followers 43a and 43b, pairs of tertiary crankpin cams 27c and 27d, and pairs of tertiary followers 43c and 43d, the following description will refer to only one of the respective pairs of the crankpin journals, oblong openings, secondary crankpin cams, secondary followers, tertiary crankpin cams, and tertiary followers. As noted previously herein, some alternative embodiments may include only a single one of (i.e., as opposed to pairs of) the crankpin journal, the oblong opening, the secondary crankpin cam, the secondary follower, the tertiary crankpin cam, and/or the tertiary follower.

As shown in FIGS. 9A-9F, crankshaft 20 is oriented such that radial axis RA defined by the center of crankshaft 20 and the center C of crankpin 24 is oriented at zero degrees, which corresponds generally to a first stroke termination angle $\theta_1$ that generally coincides with the end of the compression stroke (and exhaust stroke in a four-stroke engine) of exemplary engine 10. Thus, with radial axis RA in this orientation, piston 16 is at its upper position within cylinder 14. According to some embodiments, piston 16 may be continuing to travel up cylinder 14 at this radial axis position.

As shown in FIGS. 9A and 9B, during operation of engine 10, crankshaft 20 rotates in the clockwise direction. With crankpin cam 27 and follower 43 interacting as shown, crankpin journal 25a (see FIG. 3) is located generally centrally within the length of oblong opening 32a, such that piston 16 is at the top of its stroke while radial axis RA of crankshaft 20 is substantially aligned with the longitudinal axis CR of connecting rod 28. This position and exemplary configuration results in the distance between the center C of crankpin 24 and distal end 34 (e.g., the center of second aperture 36) of connecting rod 28 being reduced relative to the distance between the center C of crankpin 24 and distal end 34 of connecting rod 28 shown in, for example, FIGS. 11A-15F.

Figure 9D:
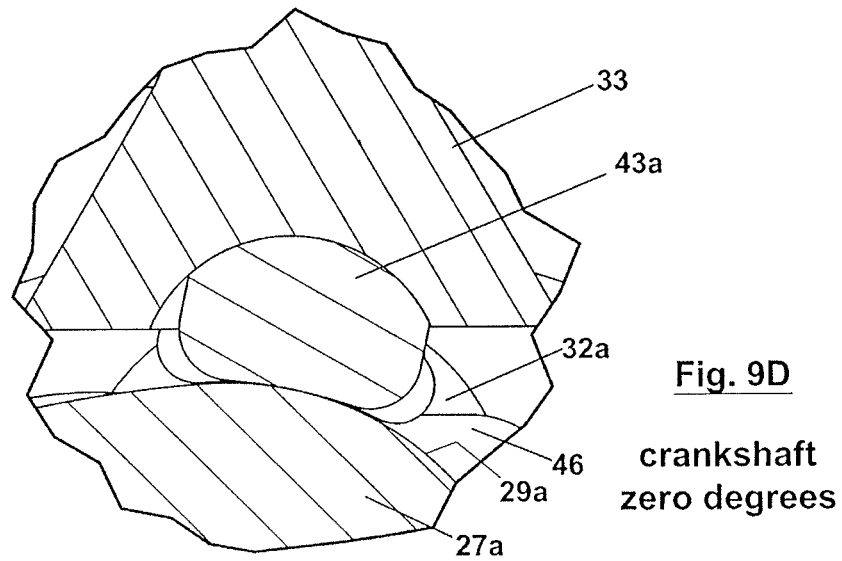
FIG. 9D is a schematic detail view of FIG. 9C.

As shown in FIGS. 9A and 9B, exemplary crankpin cam 27 and follower 43 are not in contact with one another. In particular, radial distance $r_d$ of cam profile 29 is short enough that crankpin cam 27 does not contact follower 43. Referring to FIGS. 9C and 9D, however, secondary crankpin cam 27a and secondary follower 43a are in contact with one another, and thus, serve to control the distance between the center C of crankpin 24 and distal end 34 of connecting rod 28 and/or or the longitudinal position of crankpin journal 25a along the longitudinal axes of oblong opening 32a.

Figure 9E:
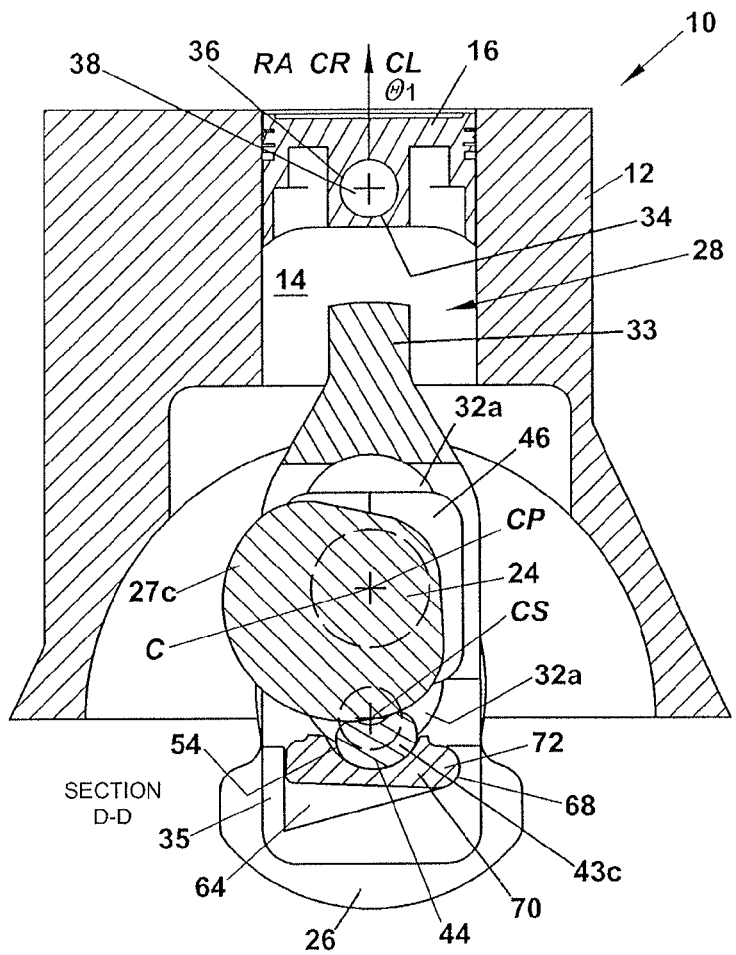
FIG. 9E is a schematic partial end section view taken along line D-D of FIG. 7 with a radial axis angle of the crankshaft shown at 0 degrees.
Figure 9F:
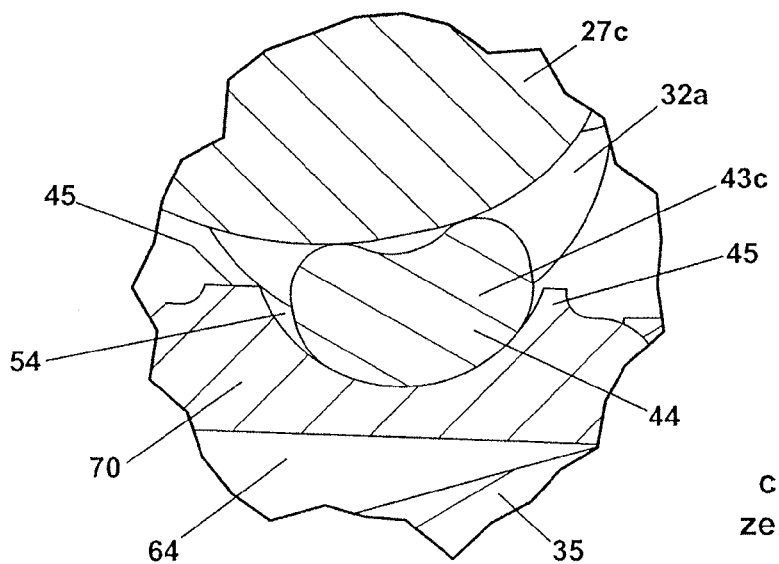
FIG. 9F is a schematic detail view of FIG. 9E.

Referring to FIGS. 9E and 9F, tertiary cam 27c and tertiary follower 43c are in contact with one another, and thus, the longitudinal position of crankpin journal 25a in oblong opening 32a may be closely controlled. Biasing member 74 provides a biasing force against rocker member 70, thereby holding tertiary follower 43c in contact with tertiary cam 43c.

Figure 10A:
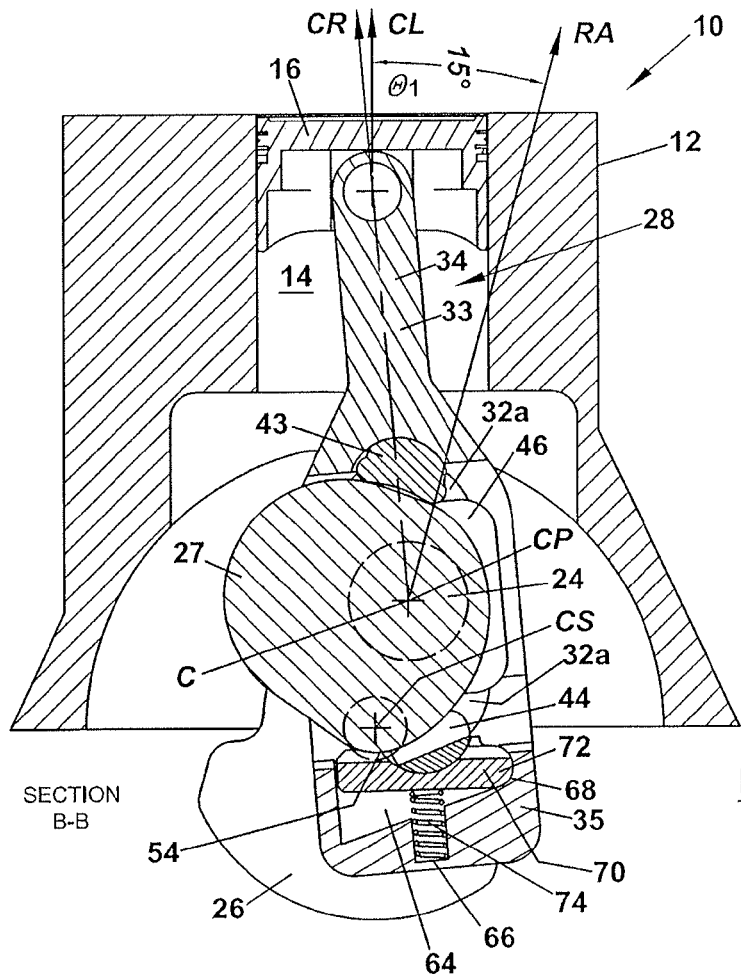
FIG. 10A is a schematic partial end section view taken along line B-B of FIG. 7 with a radial axis angle of the crankshaft shown at 15 degrees.
Figure 10B:
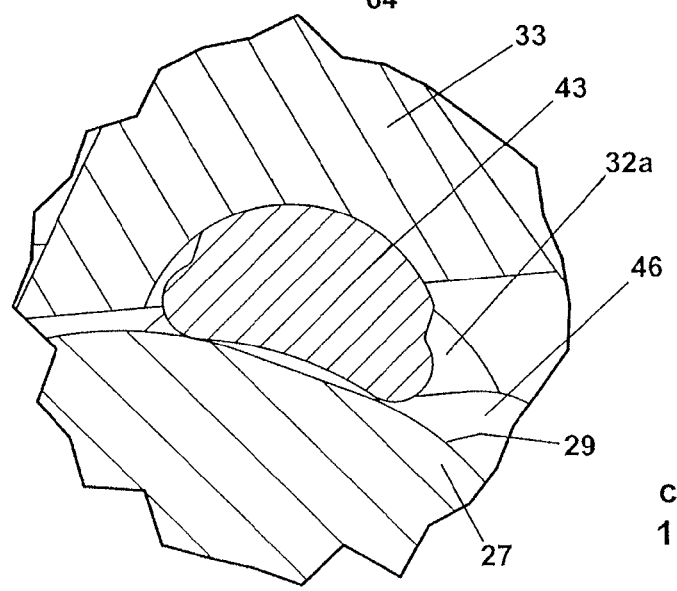
FIG. 10B is a schematic detail view of FIG. 10A.

Referring to FIGS. 10A-10F, crankshaft 20 is in an orientation where radial axis RA has rotated 15 degrees past first stroke termination angle $\theta_1$. In a conventional engine, piston 16 would have started to travel toward crankshaft axis CS as radial axis RA rotates through 15 degrees. In contrast, according to exemplary engine 10, piston 16 has not yet started its downward travel toward crankshaft axis CS. According to some embodiments, piston 16 may actually continue to travel slightly up cylinder 14 between zero and 15 degrees past first stroke termination angle $\theta_1$. As shown in FIGS. 10A and 10B, crankpin cam 27 is just beginning to contact follower 43, with the radius of the surface of follower 43 being slightly smaller than the radius of the surface of crankpin cam 27.

Figure 10C:
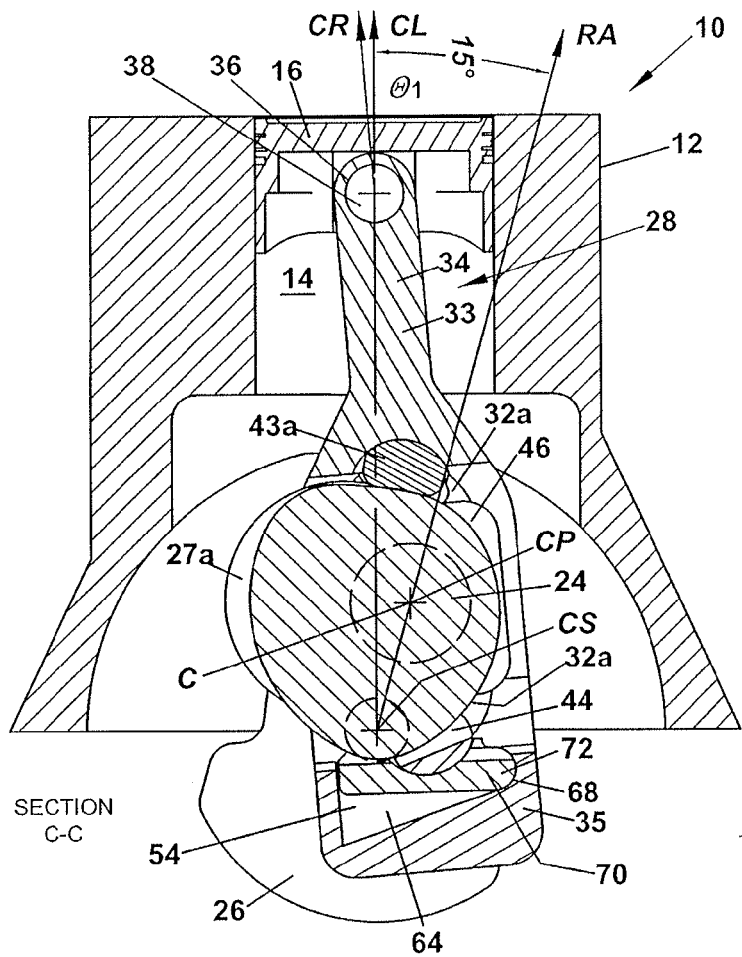
FIG. 10C is a schematic partial end section view taken along line C-C of FIG. 7 with a radial axis angle of the crankshaft shown at 15 degrees.
Figure 10D:
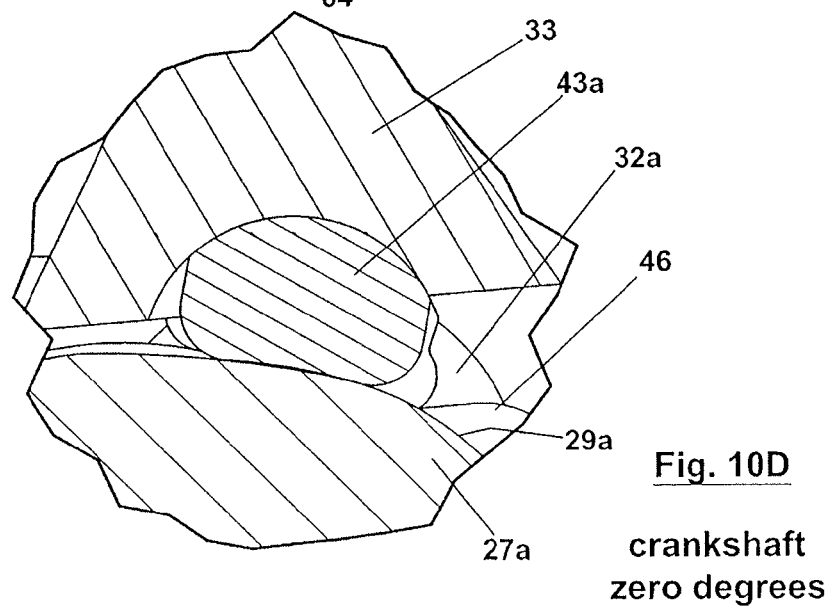
FIG. 10D is a schematic detail view of FIG. 10C.

Referring to FIGS. 10C and 10D, secondary crankpin cam 27a and secondary follower 43a remain in contact, with the radial distance $r_d'$ of secondary cam profile 29a increasing, such that crankpin journal 25a (see FIG. 3) moves longitudinally down oblong opening 32a, thereby increasing the effective length of connecting rod 28 (i.e., increasing the distance between the center C of crankpin 24 and distal end 34 of connecting rod 28). As a result, instead of piston 16 beginning to travel down cylinder 14, piston 16 remains at the end of its upward stroke (or continues to travel up cylinder 14). As shown in FIG. 10D, exemplary secondary crankpin cam 27a and exemplary secondary follower 43a are configured such that the radius of the surface of secondary crankpin cam 27a is similar to the radius of the adjacent surface of secondary follower 43a at this position of the radial axis RA of crankshaft 20.

Figure 10E:
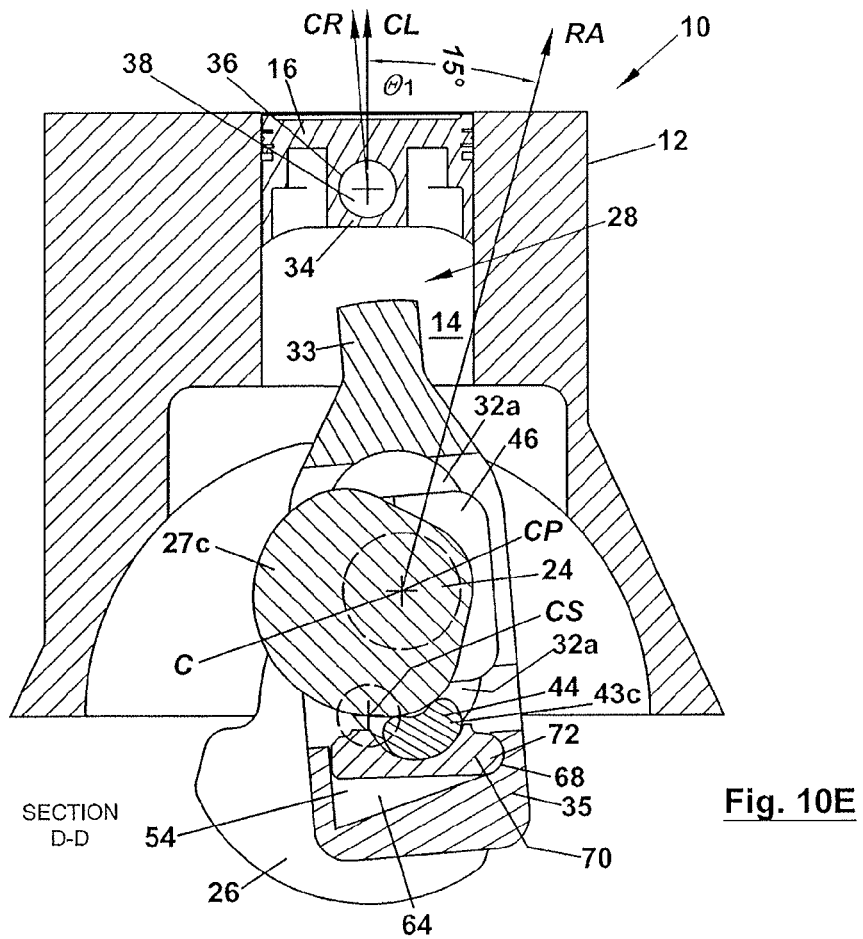
FIG. 10E is a schematic partial end section view taken along line D-D of FIG. 7 with a radial axis angle of the crankshaft shown at 15 degrees.
Figure 10F:
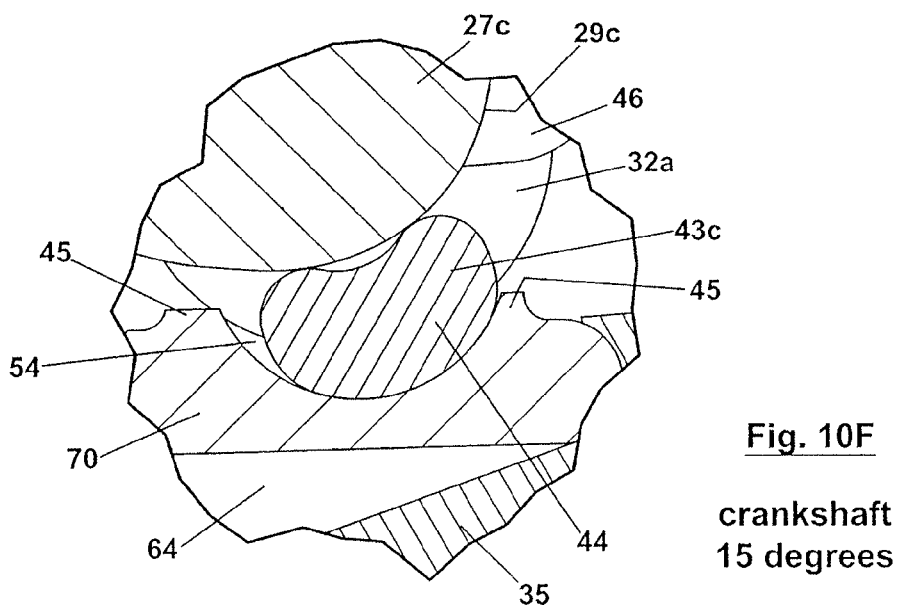
FIG. 10F is a schematic detail view of FIG. 10E.

Referring to FIGS. 10E and 10F, tertiary crankpin cam 27c and tertiary follower 43c remain in contact with one another, and thus, the longitudinal position of crankpin journal 25a in oblong opening 32a continues to be closely controlled. Biasing member 74 continues to provide a biasing force against rocker member 70, thereby holding tertiary follower 43c in contact with tertiary crankpin cam 43c.

In FIGS. 11A-11F, crankshaft 20 has rotated to an orientation where radial axis RA is 35 degrees past first stroke termination angle $\theta_1$. In a conventional engine, piston 16 would have traveled a significant distance toward crankshaft axis CS as radial axis RA rotates through 35 degrees. In contrast, according to exemplary engine 10, piston 16 has not yet started its downward travel toward crankshaft axis CS. Instead, secondary crankpin cam 27a has rotated relative secondary follower 43a (see FIGS. 9C, 10C, and 11C), such that interaction between secondary crankpin cam 27a and secondary follower 43a results in crankpin journal 25a (see FIG. 3) moving down (in the orientation shown) within oblong opening 32a to a position more remote from the central portion of oblong opening 32a in a manner resulting in substantially no movement of distal end 34 of connecting rod 28. In particular, radial distance $r_d'$ of secondary cam profile 29a has increased (compare FIGS. 9C and 11C), thereby forcing crankpin journal 25a down oblong opening 32a. As a result, the distance between the center C of crankpin 24 and distal end 34 of connecting rod 28 has increased relative the distance between the center C of crankpin 24 and distal end 34 of connecting rod 28 shown in FIGS. 9A and 9B. As a result of this increase in the distance, piston 16 has not started to travel down cylinder 14, even though crankpin 24 has rotated clockwise relative to the center C of crankshaft 20, such that the center CP of crankpin 24 is farther from the top of cylinder 14. According to some embodiments, piston 16 may actually continue to travel slightly up cylinder 14 between zero and 35 degrees past first stroke termination angle $\theta_1$.

Figure 11A:
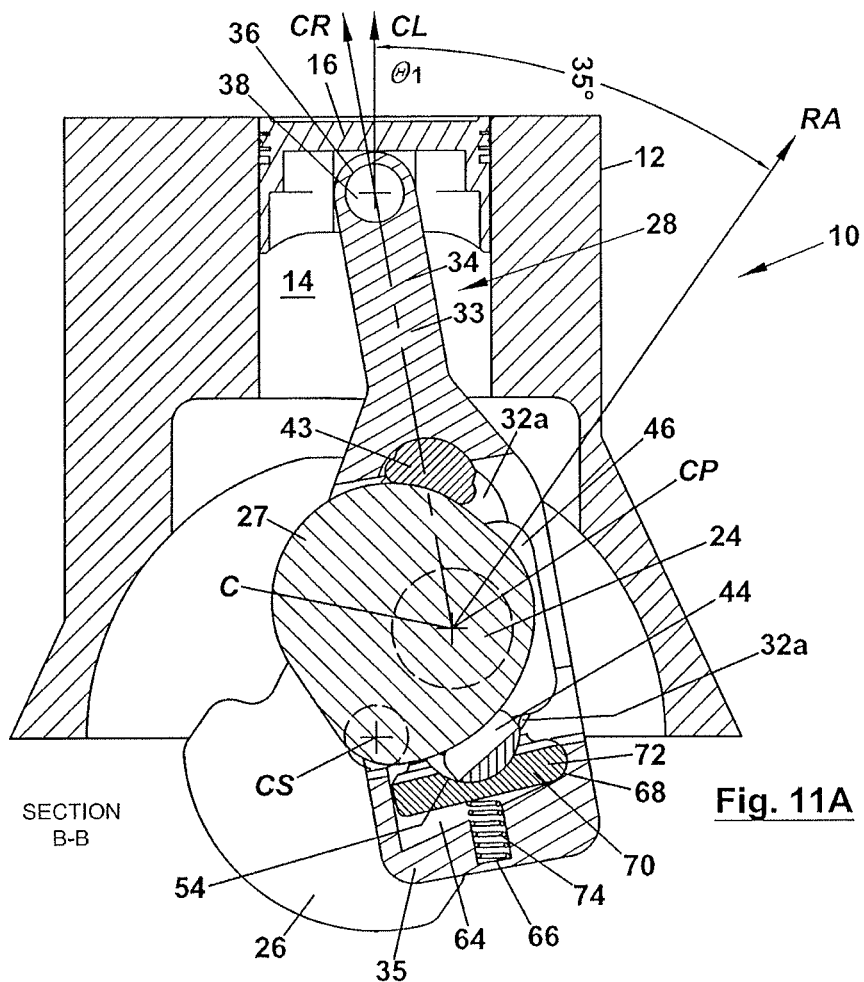
FIG. 11A is a schematic partial end section view taken along line B-B of FIG. 7 with a radial axis angle of the crankshaft shown at 35 degrees.
Figure 11B:
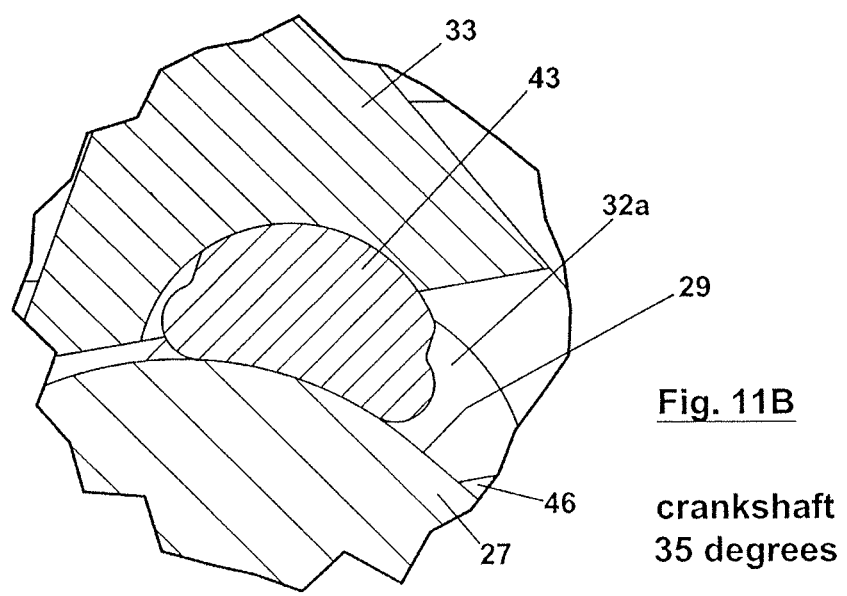
FIG. 11B is a schematic detail view of FIG. 11A.
Figure 11C:
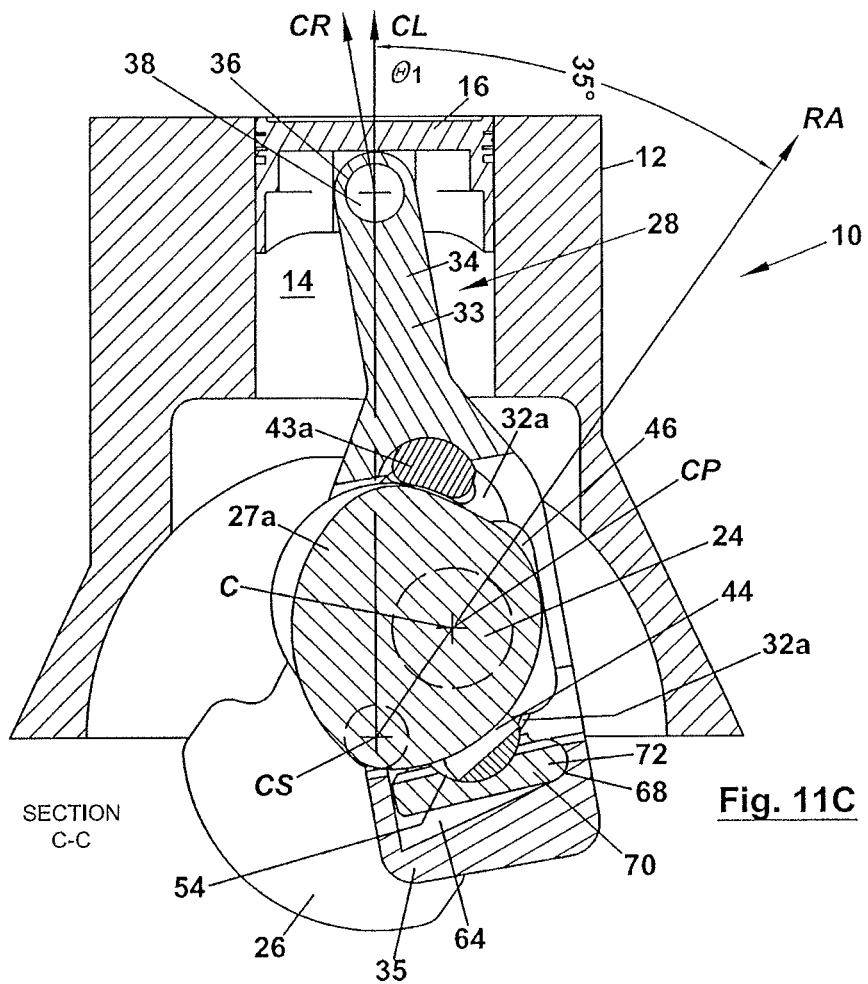
FIG. 11C is a schematic partial end section view taken along line C-C of FIG. 7 with a radial axis angle of the crankshaft shown at 35 degrees.

As shown in FIGS. 11A and 11B, crankpin cam 27 is now in contact with follower 43, with the radius of the surface of follower 43 being about the same as (e.g., the same as) the radius of the surface of crankpin cam 27. By virtue of the radii of the respective surfaces of crankpin cam 27 and follower 43 being similar or the same, the area of contact between the two surfaces is greater, which may serve to reduce friction and/or wear between the surfaces of crankpin cam 27 and follower 43 during the power stroke of engine 10 (and, when engine 10 is a four-stroke engine, during the intake stroke).

Figure 11D:
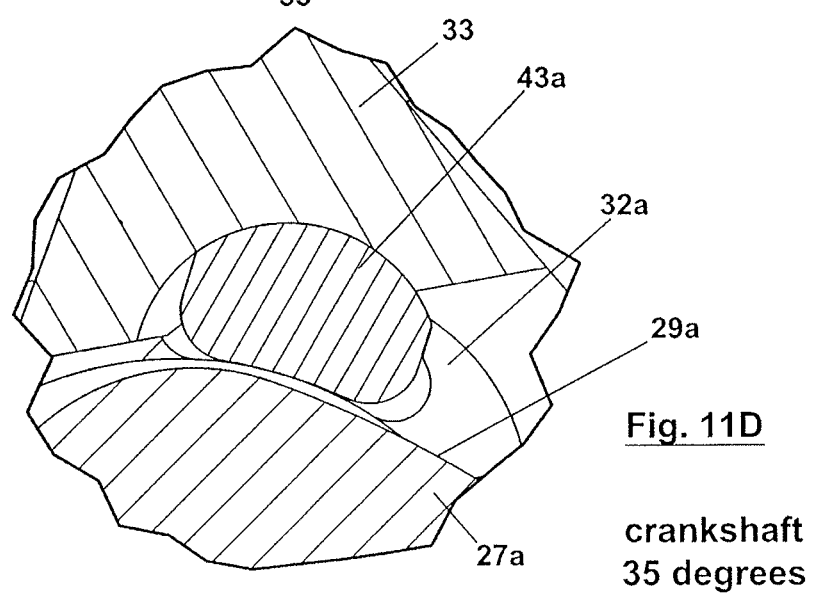
FIG. 11D is a schematic detail view of FIG. 11C.

In the example shown, the radial distance $r_d$ of crankpin cam 27 at the point or surface of contact with follower 43 is increasing, thereby increasing the effective length of connecting rod 28. As a result, instead of piston 16 traveling down cylinder 14, piston 16 remains at the end of its upward stroke or, in some embodiments, continues to travel up cylinder 14. In contrast to FIG. 10D, as shown in FIG. 11D, exemplary secondary cam 27a and secondary follower 43a are no longer in contact with one another, and thus, the contact between crankpin cam 27 and follower 43 control the longitudinal position of crankpin journal 25a (see FIG. 3) in oblong opening 32a.

Figure 11E:
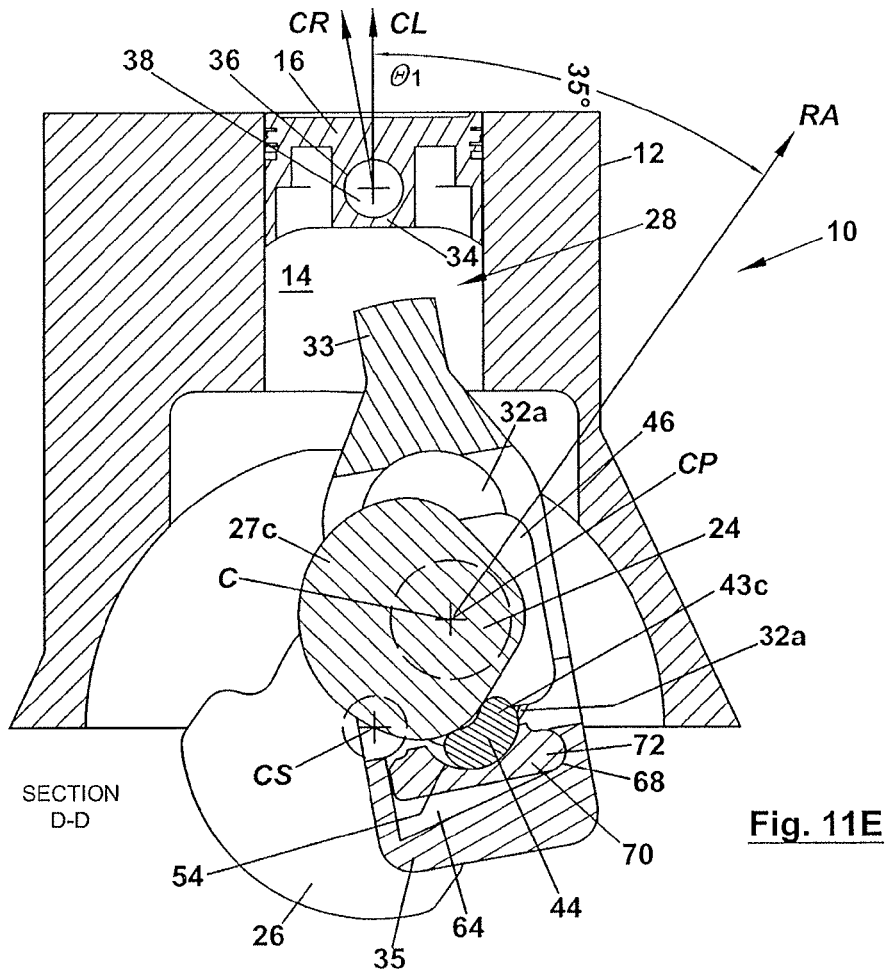
FIG. 11E is a schematic partial end section view taken along line D-D of FIG. 7 with a radial axis angle of the crankshaft shown at 35 degrees.
Figure 11F:
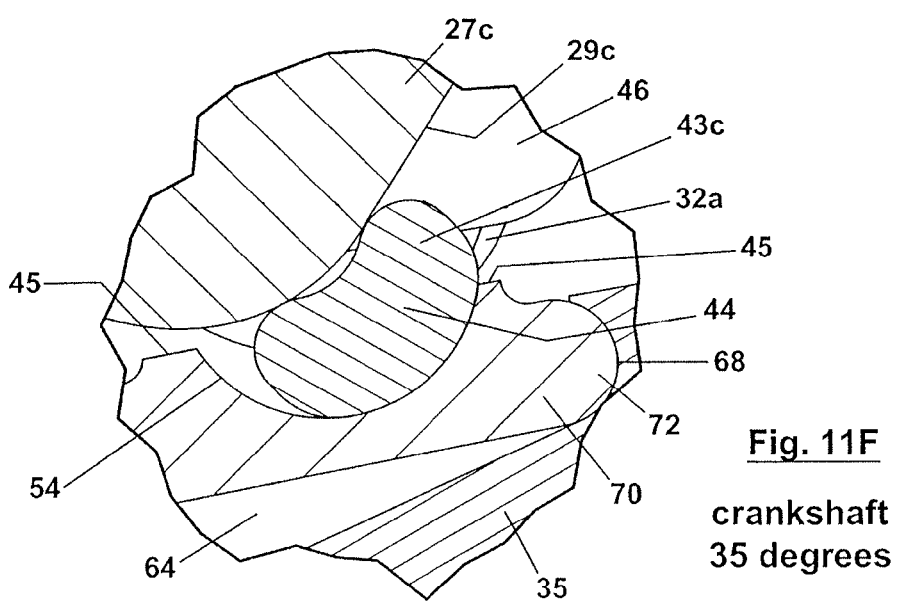
FIG. 11F is a schematic detail view of FIG. 11E.

As shown in FIGS. 11E and 11F, tertiary cam 27c and tertiary follower 43c remain in contact with one another, and thus, the longitudinal position of crankpin journal 25a in oblong opening 32a is closely controlled by crankpin cam 27, follower 43, tertiary cam 27c, and tertiary follower 43c. Biasing member 74 continues to provide a biasing force against rocker member 70, thereby holding tertiary follower 43c in contact with tertiary cam 43c.

Figure 12A:
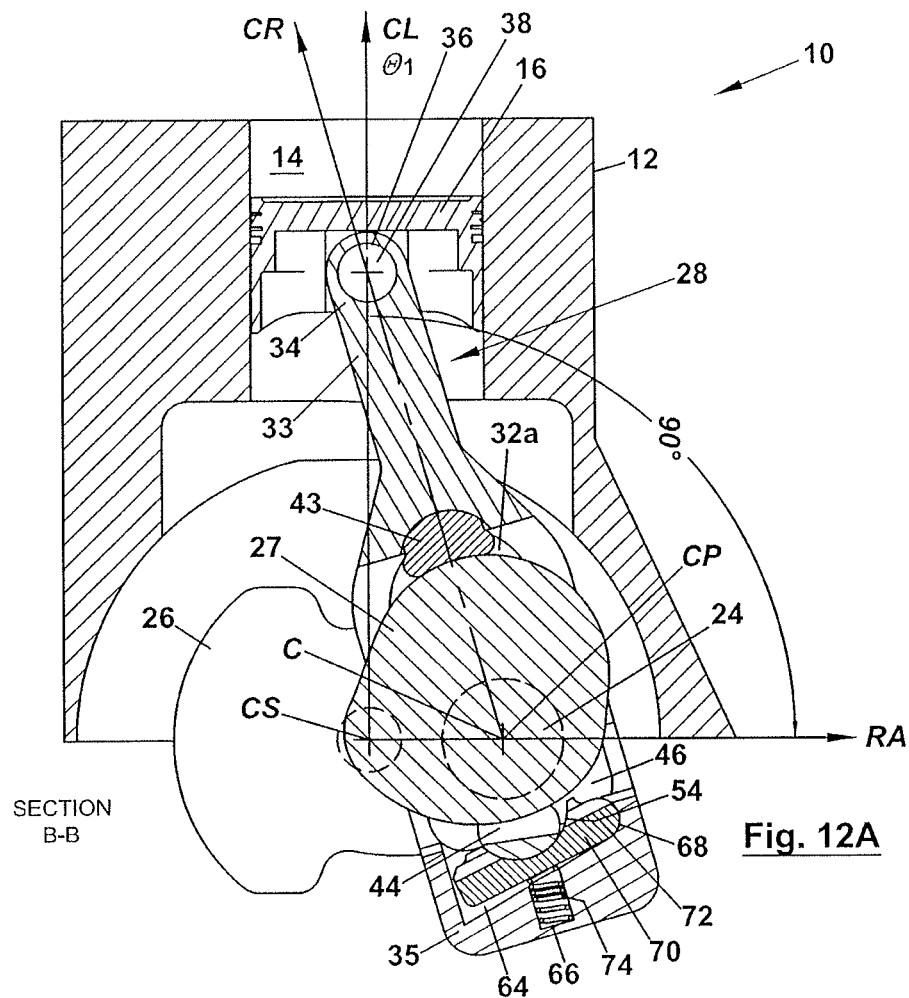
FIG. 12A is a schematic partial end section view taken along line B-B of FIG. 7 with a radial axis angle of the crankshaft shown at 90 degrees.
Figure 12B:
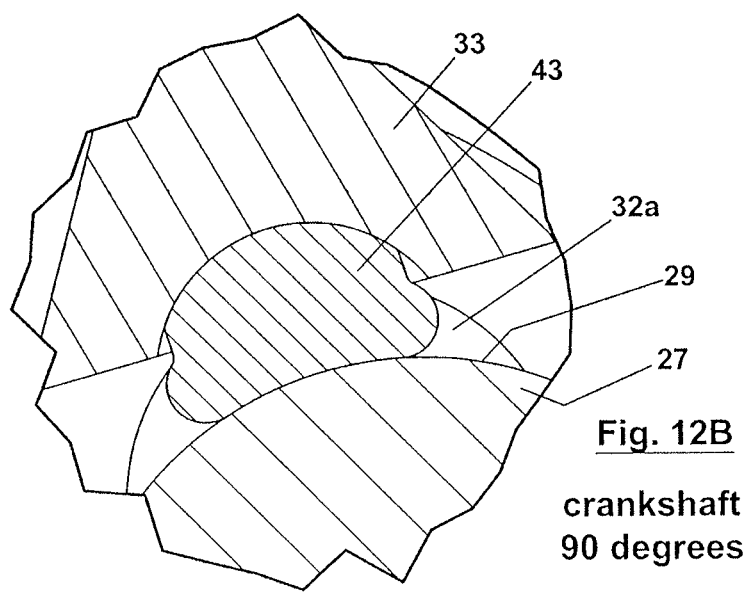
FIG. 12B is a schematic detail view of FIG. 12A.
Figure 12C:
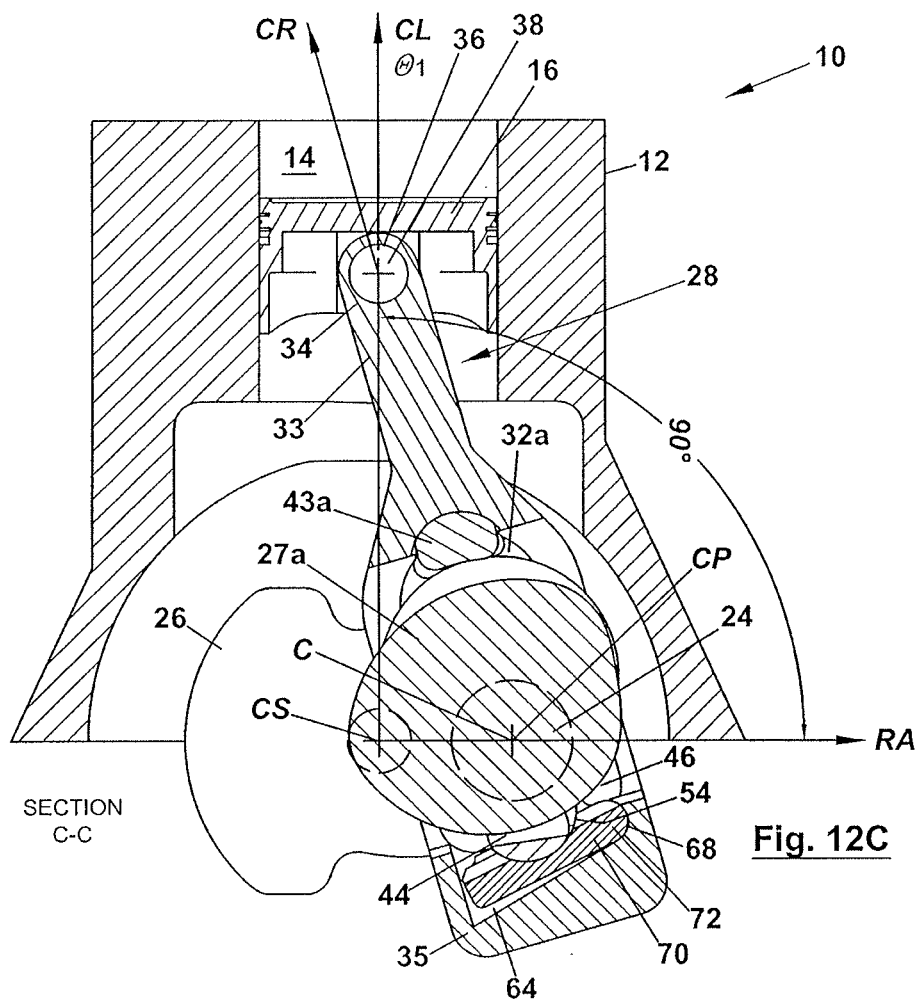
FIG. 12C is a schematic partial end section view taken along line C-C of FIG. 7 with a radial axis angle of the crankshaft shown at 90 degrees.
Figure 12D:
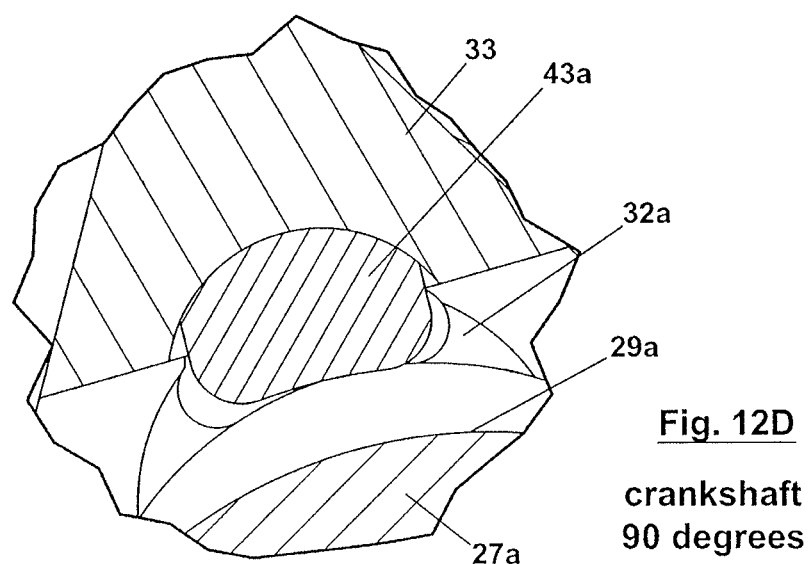
FIG. 12D is a schematic detail view of FIG. 12C.

As shown in FIGS. 12A-12F, crankshaft 20 has rotated to an orientation where radial axis RA is 90 degrees past first stroke termination angle $\theta_1$. In contrast to FIGS. 9A-11F, piston 16 has now started its downward travel toward crankshaft axis CS. As shown in FIGS. 12A and 12B, crankpin cam 27 remains in contact with follower 43, and the radius of the surface of follower 43 continues to be similar to (e.g., the same as) the radius of the surface of crankpin cam 27. As shown in FIG. 12A, the radial distance $r_d$ of crankpin cam 27 at the point or surface of contact with follower 43 is at about its maximum, resulting in crankpin journal 25a (see FIG. 3) being at about its maximum longitudinal position down oblong opening 32a, such that the effective length of connecting rod 28 is at about its maximum. As shown in FIG. 12D, exemplary secondary crankpin cam 27a and secondary follower 43a continue to not be in contact with one another. As a result, the contact between crankpin cam 27 and follower 43 controls the longitudinal position of crankpin journal 25a in oblong opening 32a.

Figure 12E:
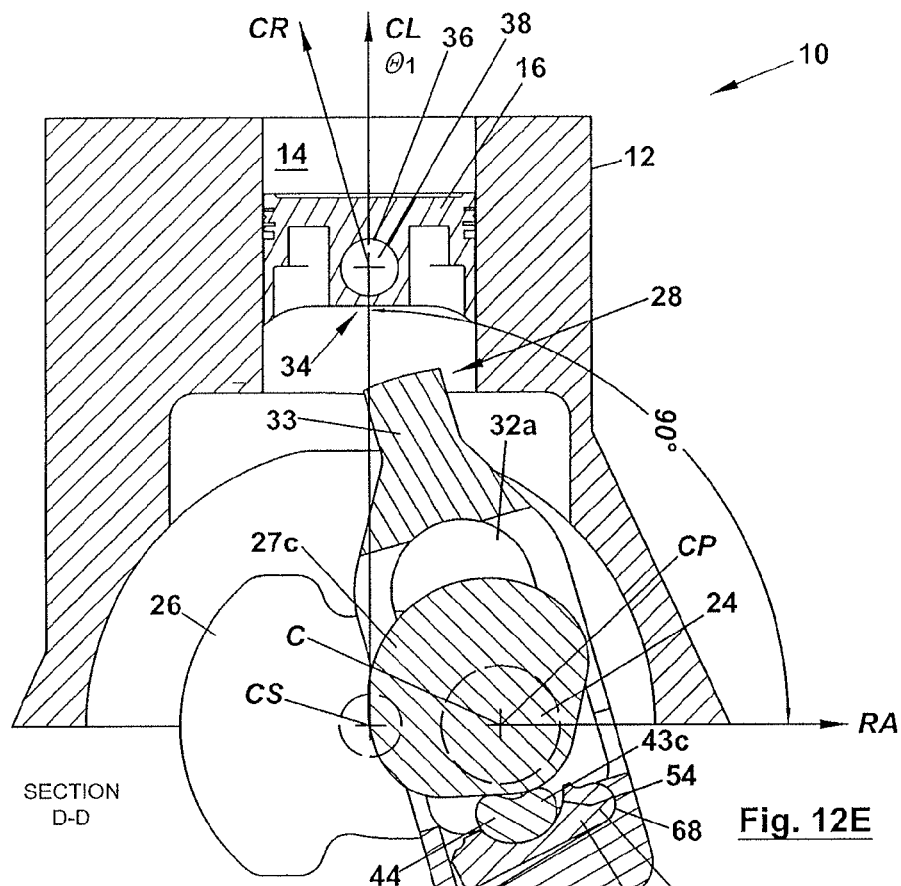
FIG. 12E is a schematic partial end section view taken along line D-D of FIG. 7 with a radial axis angle of the crankshaft shown at 90 degrees.
Figure 12F:
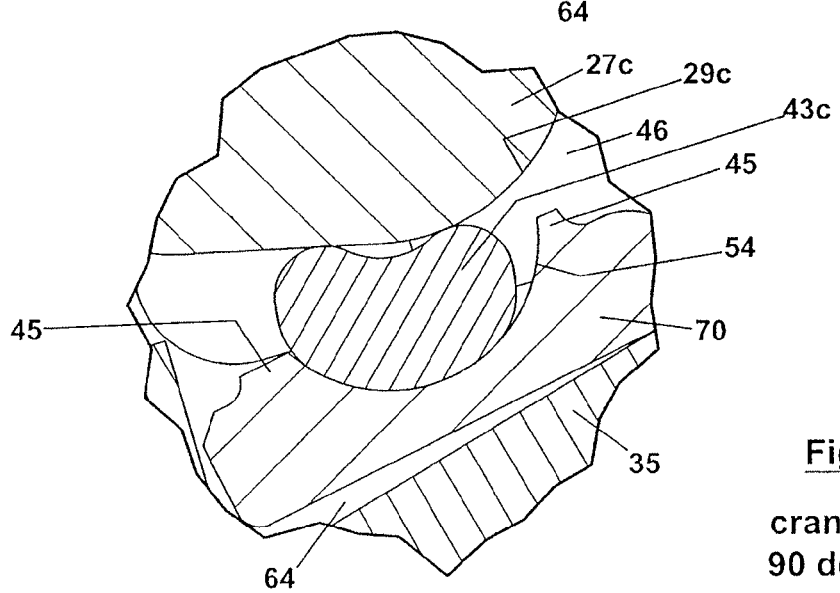
FIG. 12F is a schematic detail view of FIG. 12E.

As shown in FIGS. 12E and 12F, tertiary crankpin cam 27c and tertiary follower 43c remain in contact with one another, and thus, the longitudinal position of crankpin journal 25a in oblong opening 32a is closely controlled by crankpin cam 27, follower 43, tertiary crankpin cam 27c, and tertiary follower 43c. Biasing member 74 continues to provide a biasing force against rocker member 70, thereby holding tertiary follower 43c in contact with tertiary crankpin cam 43c. However, as shown in FIGS. 12E and 12F, rocker member 70 is no longer spaced significantly from cap recess 64 of cap portion 35 of connecting rod 28, with the interaction between tertiary crankpin cam 27c and tertiary follower 43c compressing biasing member 74.

Figure 13A:
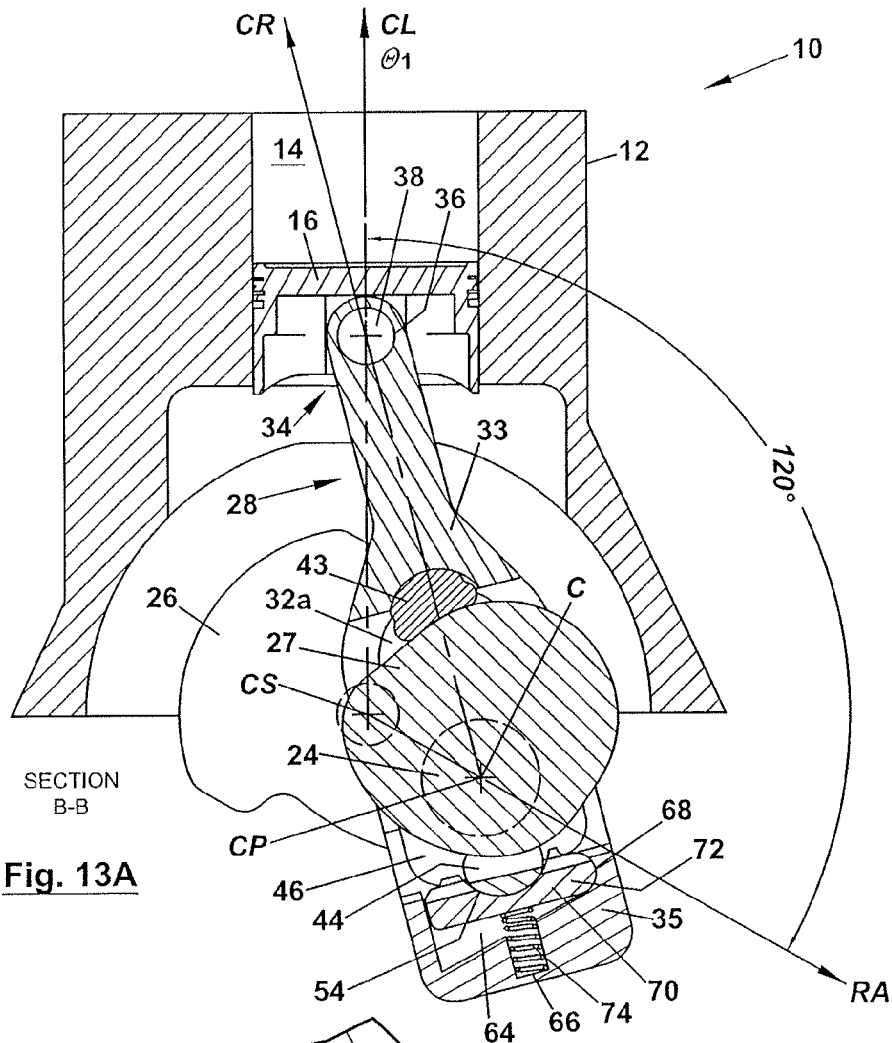
FIG. 13A is a schematic partial end section view taken along line B-B of FIG. 7 with a radial axis angle of the crankshaft shown at 120 degrees.
Figure 13B:
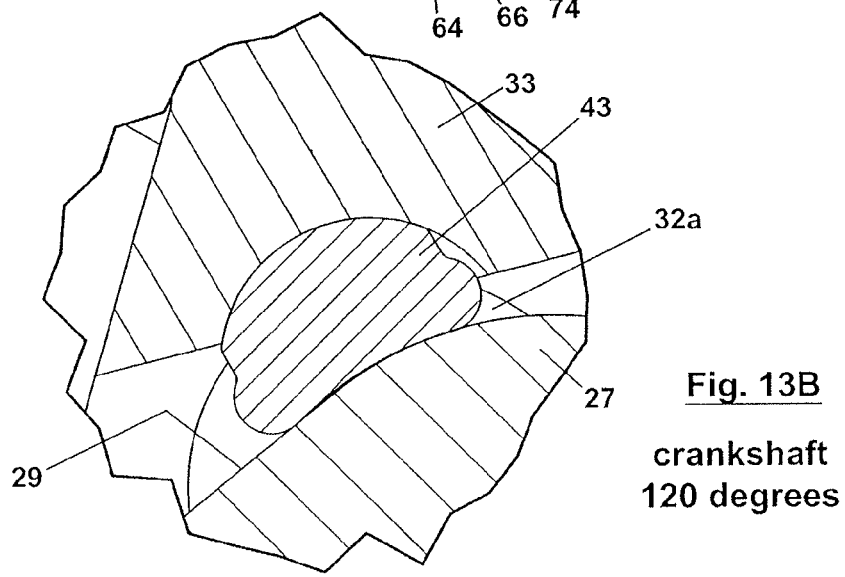
FIG. 13B is a schematic detail view of FIG. 13A.
Figure 13C:
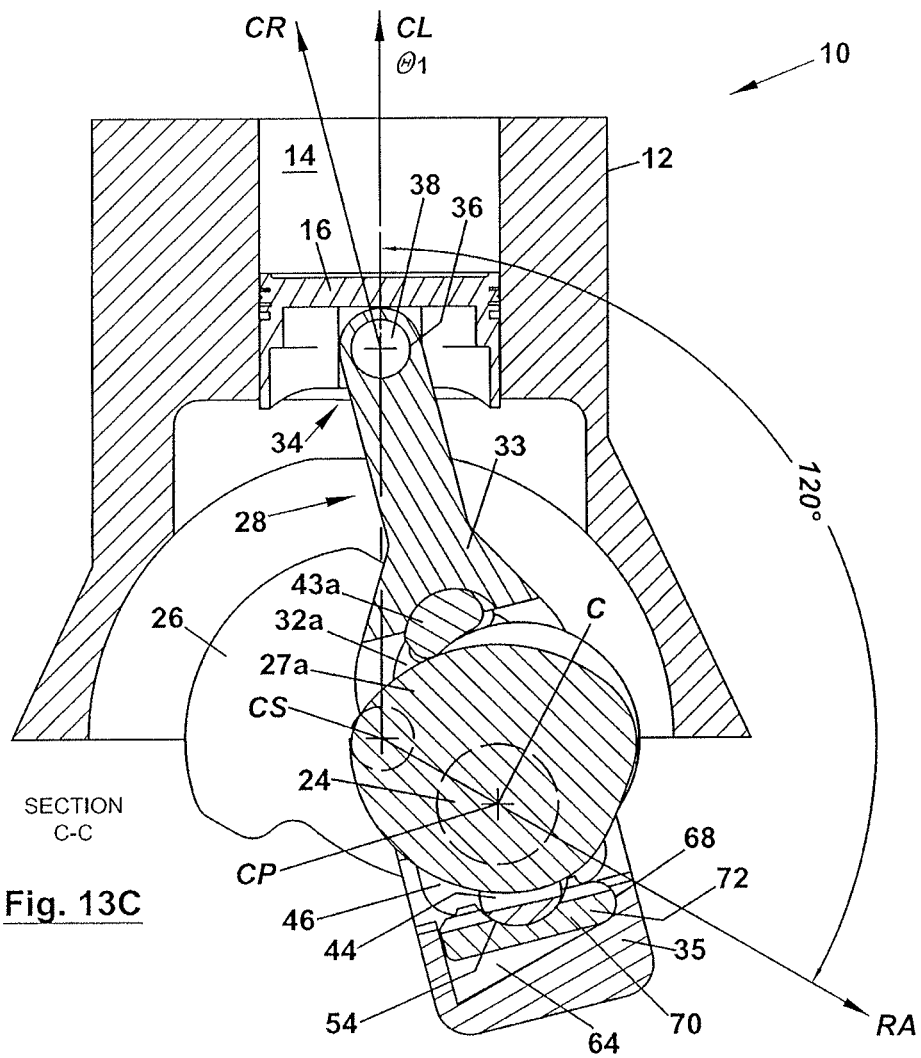
FIG. 13C is a schematic partial end section view taken along line C-C of FIG. 7 with a radial axis angle of the crankshaft shown at 120 degrees.

Referring to FIGS. 13A-13F, crankshaft 20 has rotated to an orientation where radial axis RA is 120 degrees past first stroke termination angle $\theta_1$. Piston 16 continues to travel down cylinder 14. Crankpin cam 27 remains in contact with follower 43, and the radius of the surface of follower 43 continues to be similar to (e.g., the same as) the radius of the surface of crankpin cam 27. As shown in FIG. 13A, the radial distance $r_d$ of crankpin cam 27 at the point or surface of contact with follower 43 remains about the same as shown in FIGS. 12A-12F, resulting in crankpin journal 25a (see FIG. 3) remaining substantially stationary in oblong opening 32a, such that the effective length of connecting rod 28 remains substantially the same.

According to some embodiments, radius of the surface of crankpin cam 27 and/or the radial distance $r_d$ of crankpin cam 27 may remain substantially the same throughout a range of angular motion of radial axis RA of crankshaft 20. With the radial distance $r_d$ remaining substantially constant, the longitudinal position of crankpin journal 25a in oblong opening 32a remains substantially constant, such that the effective length of connecting rod 28 remains substantially the same throughout the range of angular motion of crankshaft 20. For example, cam profile 29 may have a portion defining a substantially constant radial distance $r_d$ for at least about 70 degrees of cam profile (e.g., at least about 80 degrees, at least about 90 degrees, at least about 100 degrees, at least about 110 degrees, at least about 120 degrees, at least about 130 degrees, at least about 140 degrees, or at least about 150 degrees). According to some embodiments, the surface of crankpin cam 27 may have a substantially constant radius for at least about 70 degrees of cam profile 29 (e.g., for at least about 80 degrees, at least about 90 degrees, at least about 100 degrees, at least about 110 degrees, at least about 120 degrees, at least about 130 degrees, at least about 140 degrees, or at least about 150 degrees). For example, in the exemplary embodiment shown in FIGS. 9A-15F, the radius of the surface of crankpin cam 27 and the radial distance $r_d$ remain substantially unchanged from about 35 degrees to about 120 degrees past first stroke termination angle $\theta_1$. According to some embodiments, the substantially constant surface radius and substantially constant radial distance $r_d$ of cam profile 29 may not coincide.

Figure 13D:
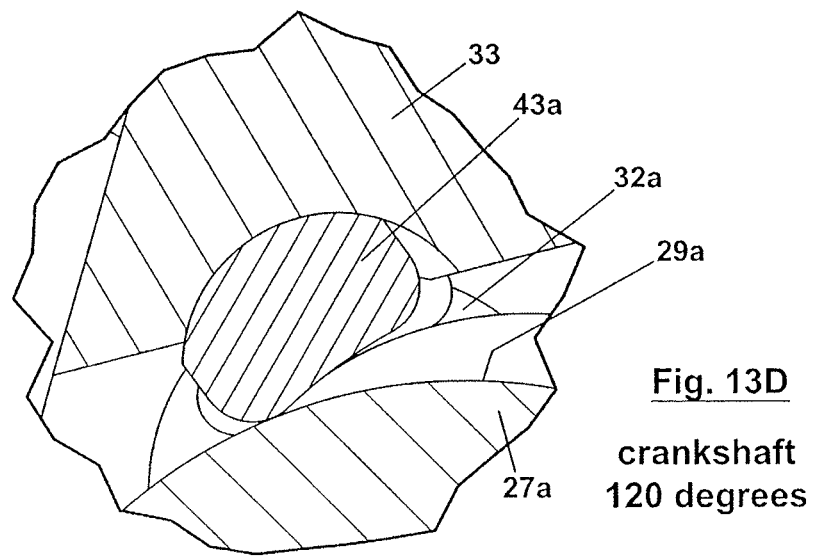
FIG. 13D is a schematic detail view of FIG. 13C.

In contrast to FIG. 12D, as shown in FIG. 13D, exemplary secondary cam 27a and secondary follower 43a begin to come into contact with one another as radial distance $r_d'$ of secondary crankpin cam 27a increases. As a result, the contact between crankpin cam 27 and follower 43 and between secondary crankpin cam 27a and secondary follower 43a control the longitudinal position of crankpin journal 25a in oblong opening 32a.

Figure 13E:
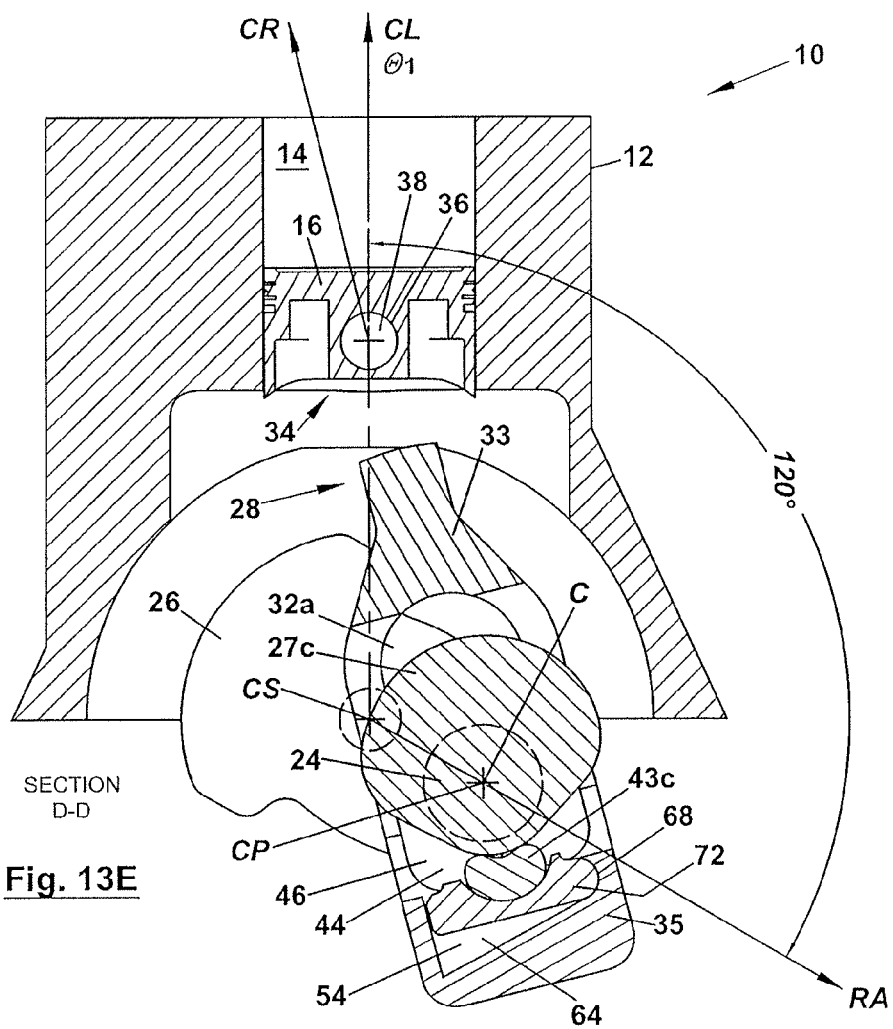
FIG. 13E is a schematic partial end section view taken along line D-D of FIG. 7 with a radial axis angle of the crankshaft shown at 120 degrees.
Figure 13F:
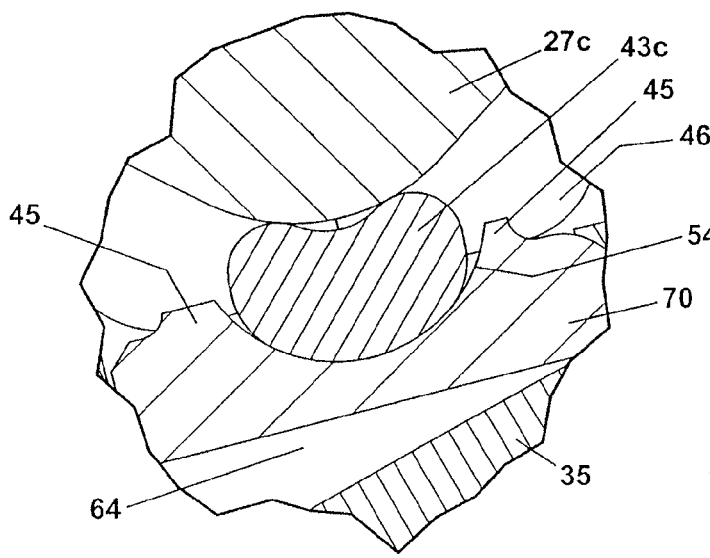
FIG. 13F is a schematic detail view of FIG. 13E.

As shown in FIGS. 13E and 13F, tertiary crankpin cam 27c and tertiary follower 43c remain in contact with one another, and thus, the longitudinal position of crankpin journal 25a in oblong opening 32a is closely controlled by crankpin cam 27, follower 43, secondary crankpin cam 27a, secondary follower 43a, tertiary crankpin cam 27c, and tertiary follower 43c. Biasing member 74 continues to provide a biasing force against rocker member 70, thereby holding tertiary follower 43c in contact with tertiary crankpin cam 43c. In contrast to FIGS. 12E and 12F, as shown in FIGS. 13E and 13F, rocker member 70 returns to being spaced from cap recess 64 of cap portion 35, with biasing member 74 returning to a more extended configuration.

Figures 14A, 14B:
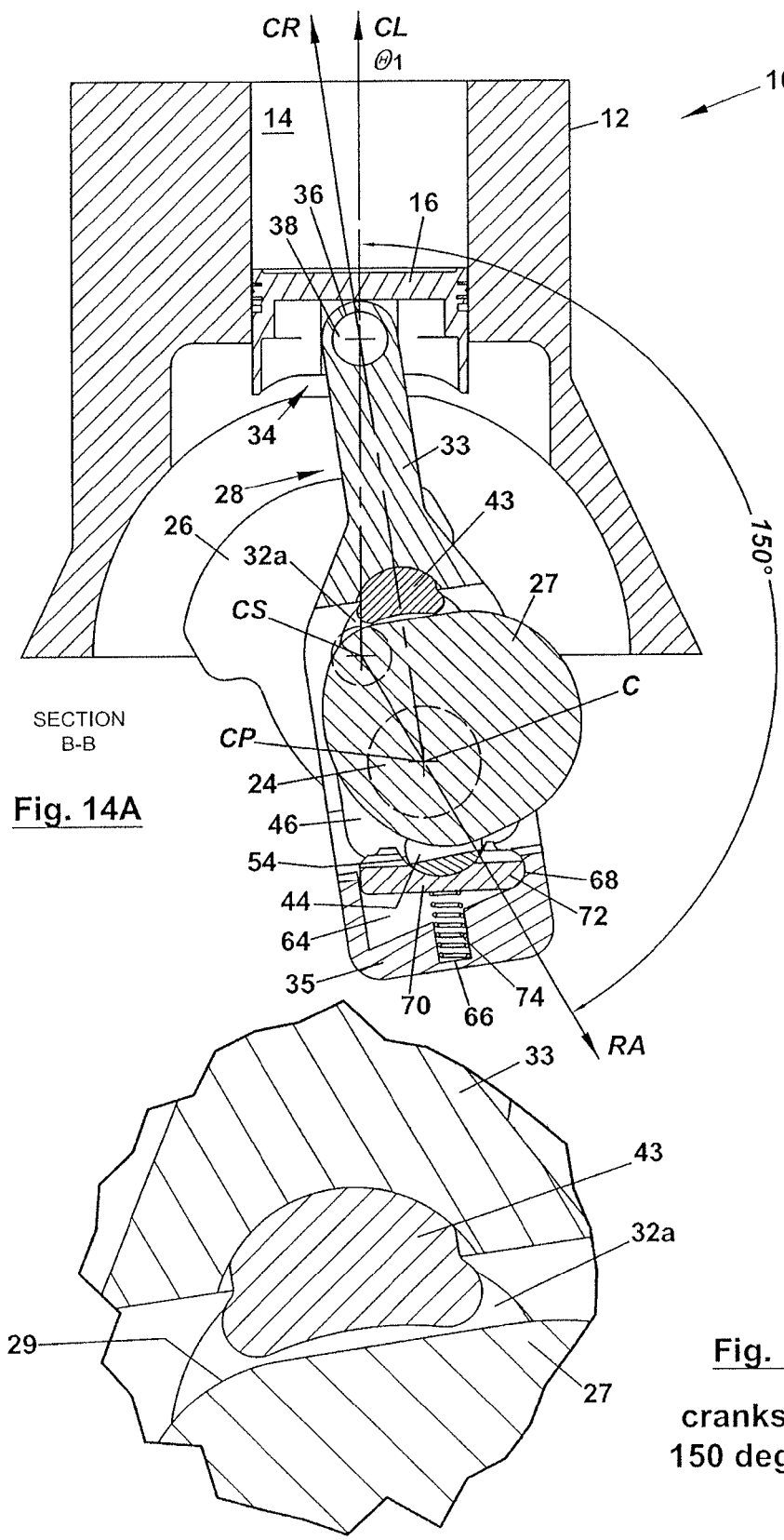
FIG. 14A is a schematic partial end section view taken along line B-B of FIG. 7 with a radial axis angle of the crankshaft shown at 150 degrees.
FIG. 14B is a schematic detail view of FIG. 14A.
Figure 14C:
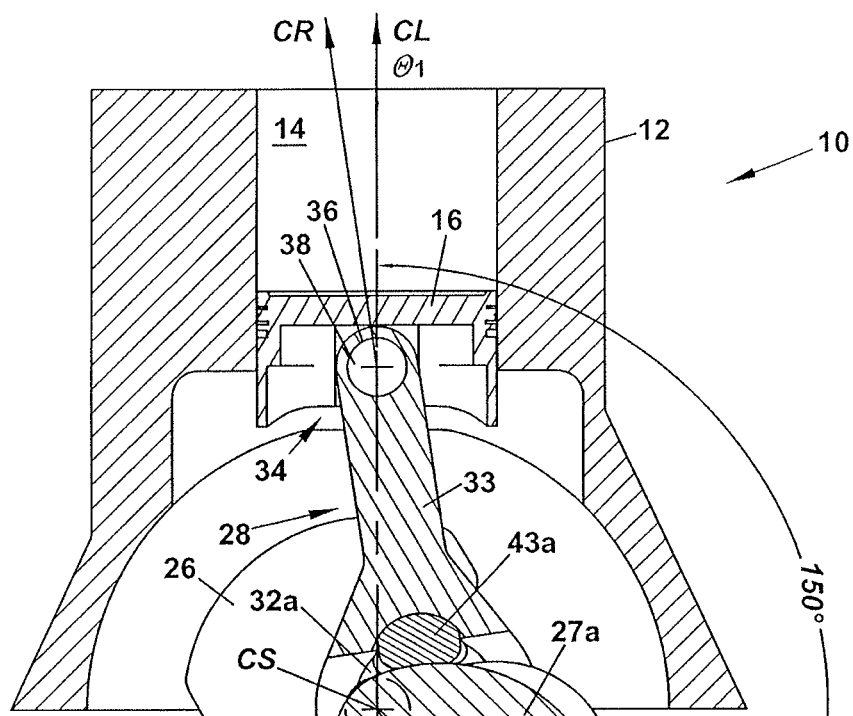
FIG. 14C is a schematic partial end section view taken along line C-C of FIG. 7 with a radial axis angle of the crankshaft shown at 150 degrees.
Figure 14D:
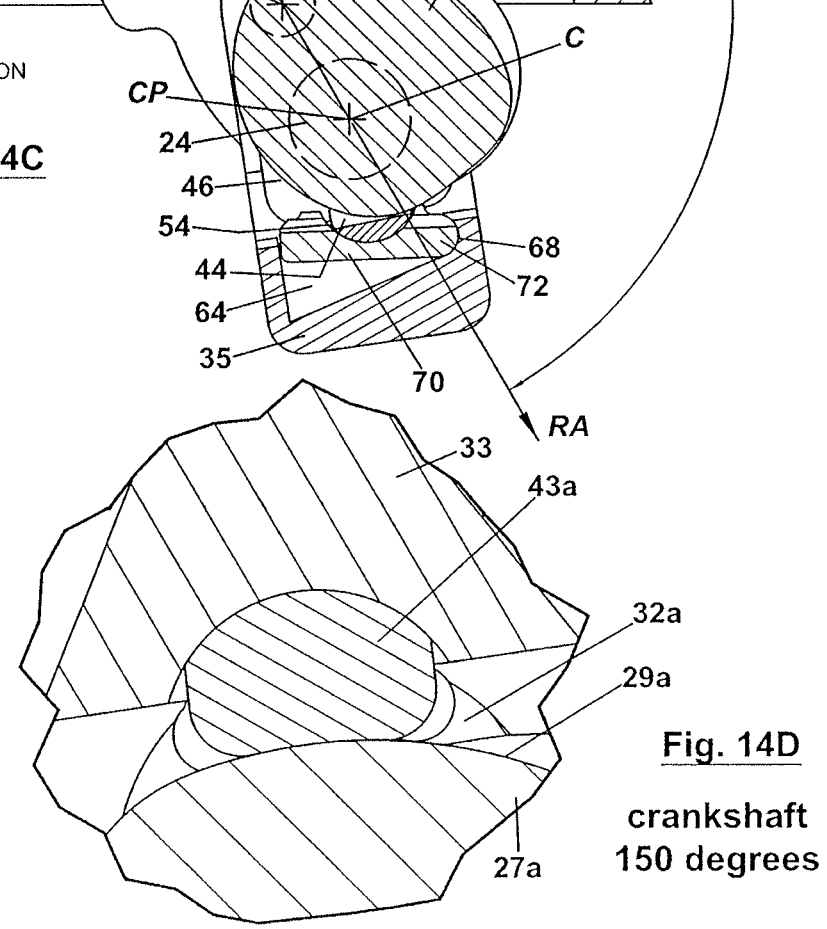
FIG. 14D is a schematic detail view of FIG. 14C.

As shown in FIGS. 14A-14F, crankshaft 20 has continued to rotate to an orientation where radial axis RA is 150 degrees past first stroke termination angle $\theta_1$. Piston 16 continues to travel down cylinder 14. In the exemplary embodiment shown, crankpin cam 27 and follower 43 separate from one another as radial distance $r_d$ of crankpin cam 27 decreases, and the radial distance $r_d'$ of secondary crankpin cam 27a begins to increase to the extent that secondary crankpin cam 27a and secondary follower 43a come into contact with one another, as shown in FIGS. 14C and 14D. The radius of the surface of secondary crankpin cam 27a is similar to (e.g., the same as) as the radius of the surface of secondary follower 43a at this point of contact, as shown in FIG. 14D. The contact between secondary crankpin cam 27a and secondary follower 43a controls the longitudinal position of crankpin journal 25a (see FIG. 3) in oblong opening 32a. Relative to the position shown in FIGS. 13A-13F, crankpin journal 25a remains in a relatively stationary longitudinal position in oblong opening 32a, such that the effective length of connecting rod 28 remains substantially the same.

Figures 14E, 14F:
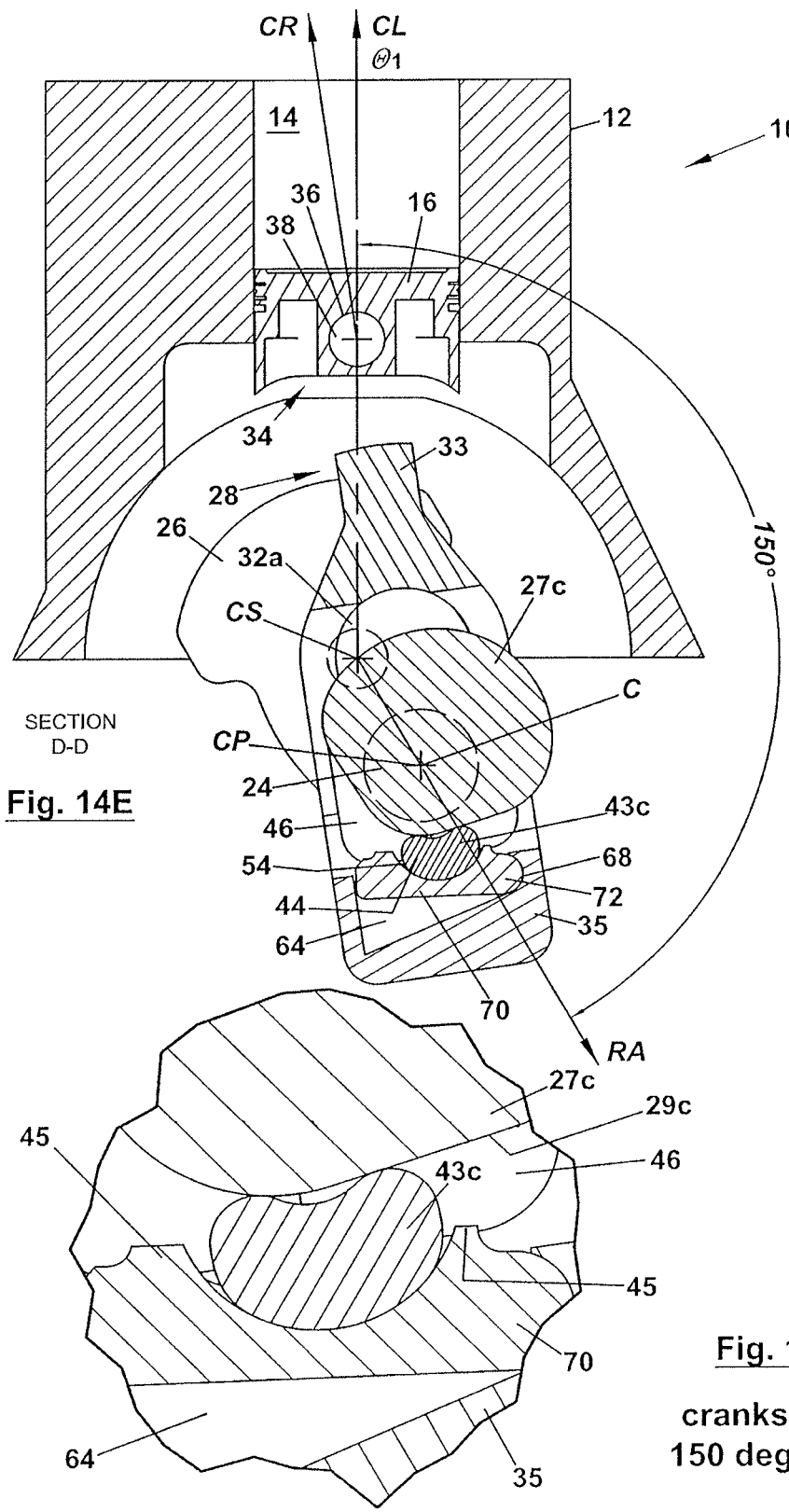
FIG. 14E is a schematic partial end section view taken along line D-D of FIG. 7 with a radial axis angle of the crankshaft shown at 150 degrees.
FIG. 14F is a schematic detail view of FIG. 14E.

As shown in FIGS. 14E and 14F, tertiary crankpin cam 27c and tertiary follower 43c remain in contact with one another, and thus, the longitudinal position of crankpin journal 25a in oblong opening 32a is closely controlled by secondary crankpin cam 27a, secondary follower 43a, tertiary crankpin cam 27c, and tertiary follower 43c. Biasing member 74 continues to provide a biasing force against rocker member 70, thereby holding tertiary follower 43c in contact with tertiary cam 43c. Rocker member 70 remains spaced from cap recess 64 of cap portion 35, with biasing member 74 remaining in an extended configuration.

As shown in FIGS. 15A-15F, crankshaft 20 has continued to rotate to an orientation where radial axis RA is 180 degrees past first stroke termination angle $\theta_1$ (i.e., at a second stroke termination angle $\theta_2$, which corresponds generally to the end of the power stroke (or intake stroke)). At this orientation of crankshaft 20, piston 16 ceases its travel down cylinder 14 and begins reversing direction for commencement of the exhaust stroke (or compression stroke). In the exemplary embodiment shown in FIGS. 15A and 15B, crankpin cam 27 and follower 43 remain separated from one another, and secondary crankpin cam 27a and secondary follower 43a remain in contact with one another, as shown in FIGS. 15C and 15D. The radius of the surface of secondary crankpin cam 27a begins to decrease, such that at this point of contact, the radius of the surface of secondary follower 43a is larger than the radius of the surface of secondary crankpin cam 27a. Contact between secondary crankpin cam 27a and secondary follower 43a controls the longitudinal position of crankpin journal 25a (see FIG. 3) in oblong opening 32a. Relative to the position shown in FIGS. 14A-14F, crankpin journal 25a remains in a relatively stationary longitudinal position in oblong opening 32a, such that the effective length of connecting rod 28 remains substantially the same.

As shown in FIGS. 15E and 15F, tertiary crankpin cam 27c and tertiary follower 43c remain in contact with one another, and thus, the longitudinal position of crankpin journal 25a in oblong opening 32a is closely controlled by secondary crankpin cam 27a, secondary follower 43a, tertiary crankpin cam 27c, and tertiary follower 43c. Biasing member 74 continues to provide a biasing force against rocker member 70, thereby holding tertiary follower 43c in contact with tertiary cam 43c. Rocker member 70 remains spaced from cap recess 64 of cap portion 35, with biasing member 74 remaining in an extended configuration.

Figure 16A:
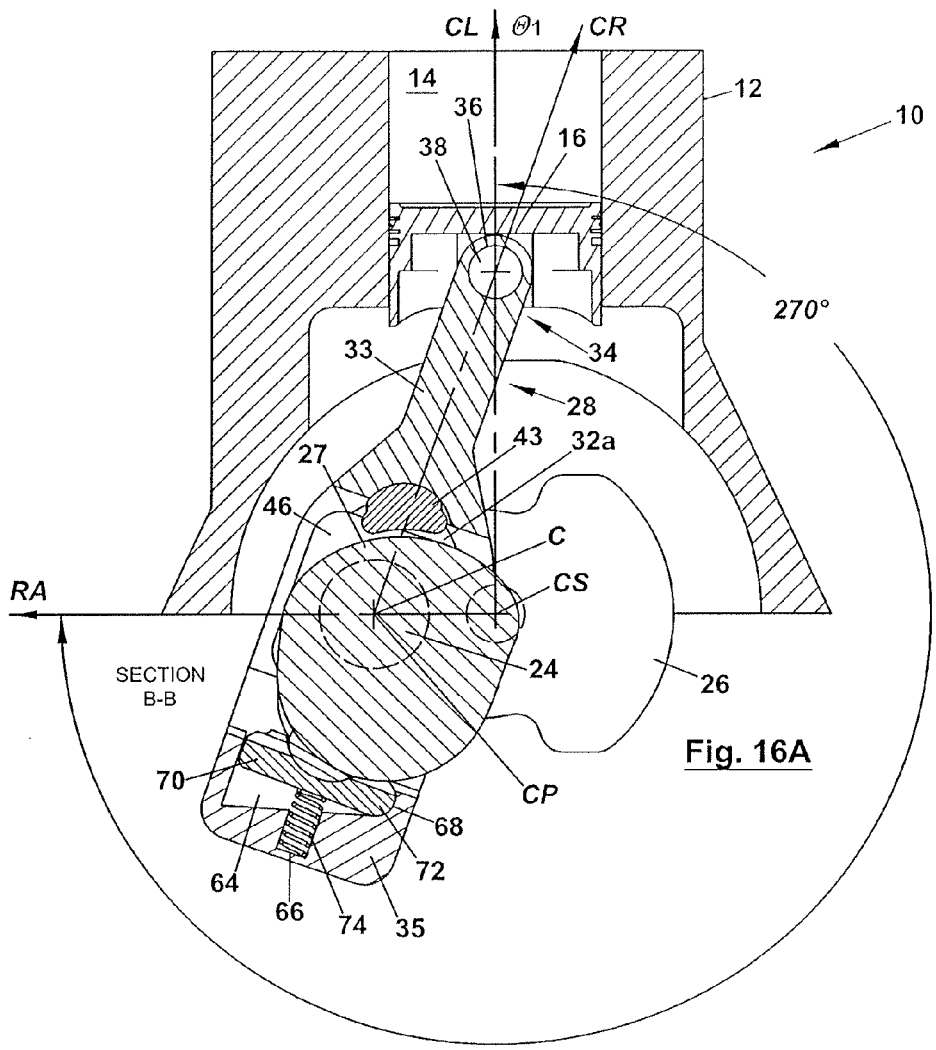
FIG. 16A is a schematic partial end section view taken along line B-B of FIG. 7 with a radial axis angle of the crankshaft shown at 270 degrees.
Figure 16B:
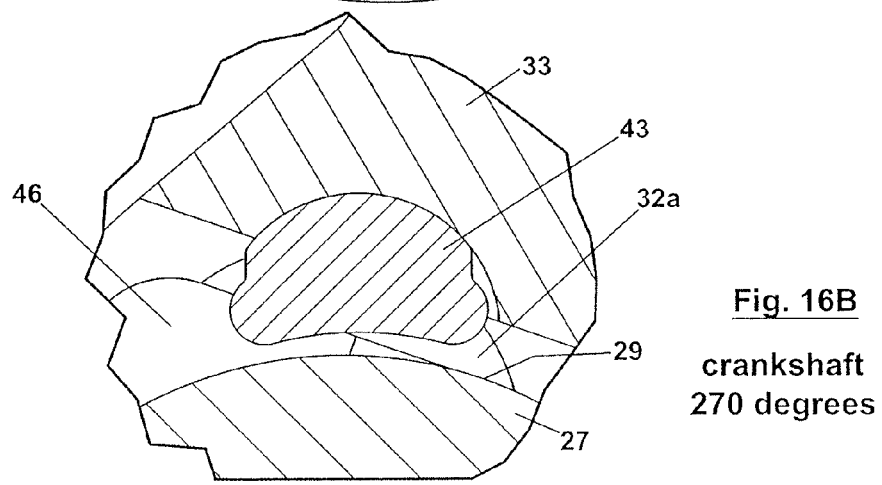
FIG. 16B is a schematic detail view of FIG. 16A.
Figure 16C:
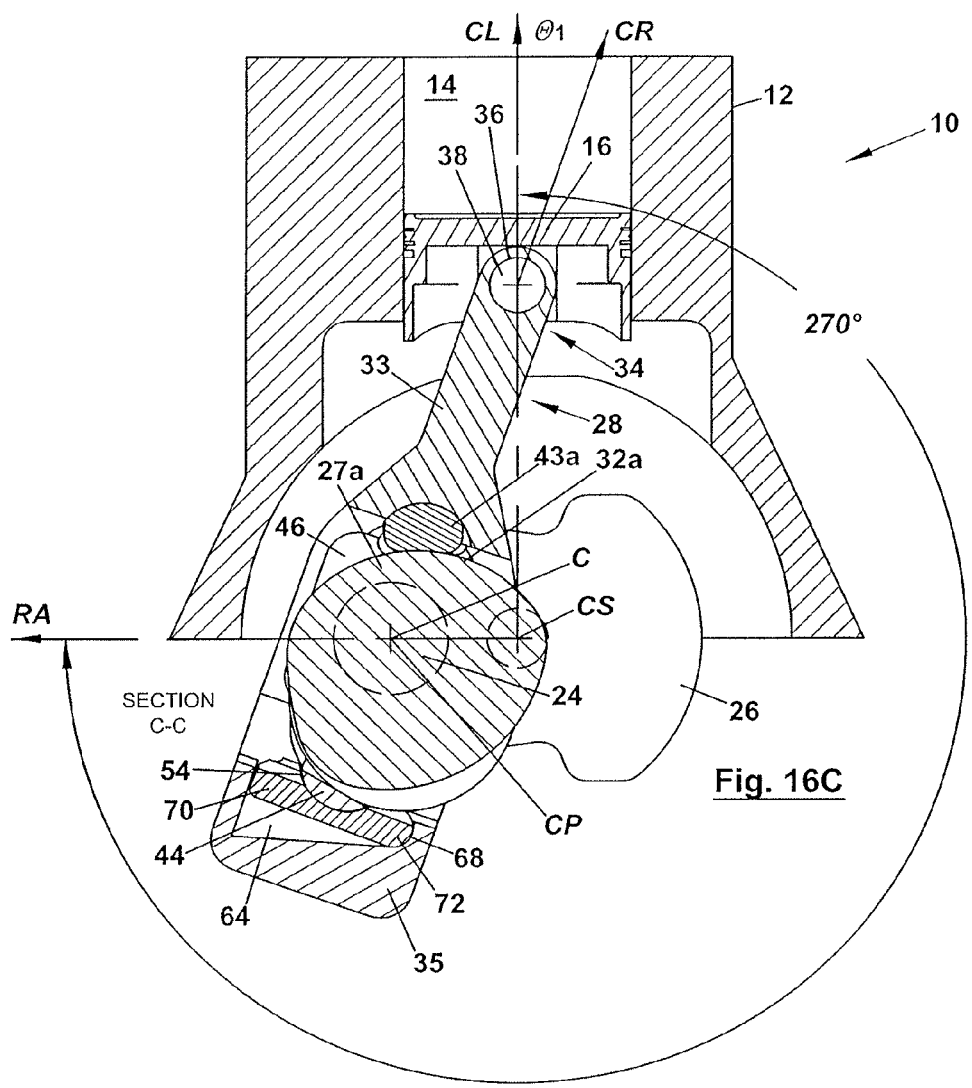
FIG. 16C is a schematic partial end section view taken along line C-C of FIG. 7 with a radial axis angle of the crankshaft shown at 270 degrees.
Figure 16D:
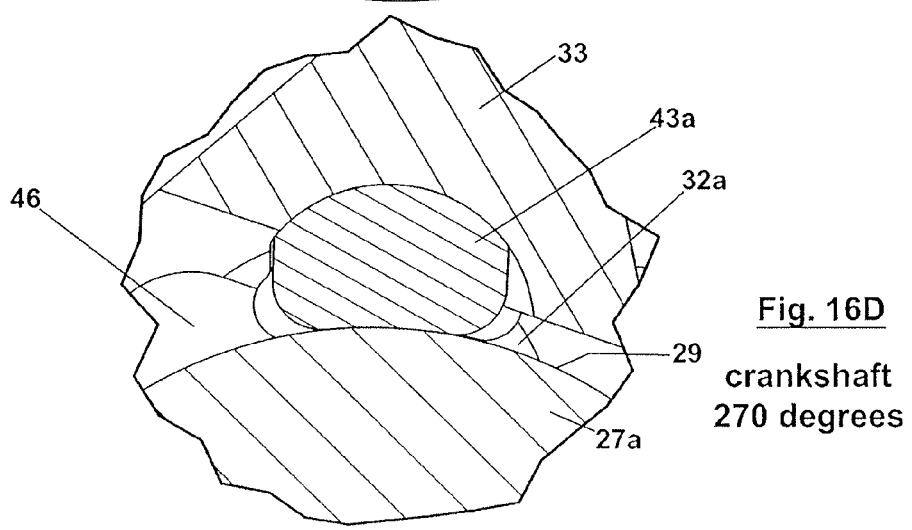
FIG. 16D is a schematic detail view of FIG. 16C.

As shown in FIGS. 16A-16F, crankshaft 20 has continued to rotate to an orientation where radial axis RA is 270 degrees past first stroke termination angle $\theta_1$. At this orientation of crankshaft 20, piston 16 continues to travel up cylinder 14. As shown in FIGS. 16A and 16B, crankpin cam 27 and follower 43 remain separated from one another, and secondary crankpin cam 27a and secondary follower 43a remain in contact with one another, as shown in FIGS. 16C and 16D. The radius of the surface of secondary cam 27a returns to being similar to (e.g., the same as) the radius of the surface of secondary follower 43a at this point of contact. Contact between secondary crankpin cam 27a and secondary follower 43a controls the longitudinal position of crankpin journal 25a (see FIG. 3) in oblong opening 32a. Relative to the position shown in FIGS. 15A-15F, radial distance $r_d'$ of secondary crankpin cam 27a has decreased, and thus, crankpin journal 25a has traveled longitudinally back up oblong opening 32a, such that the effective length of connecting rod 28 begins to shorten as piston 16 approaches the end of its stroke up cylinder 14.

Figure 16E:
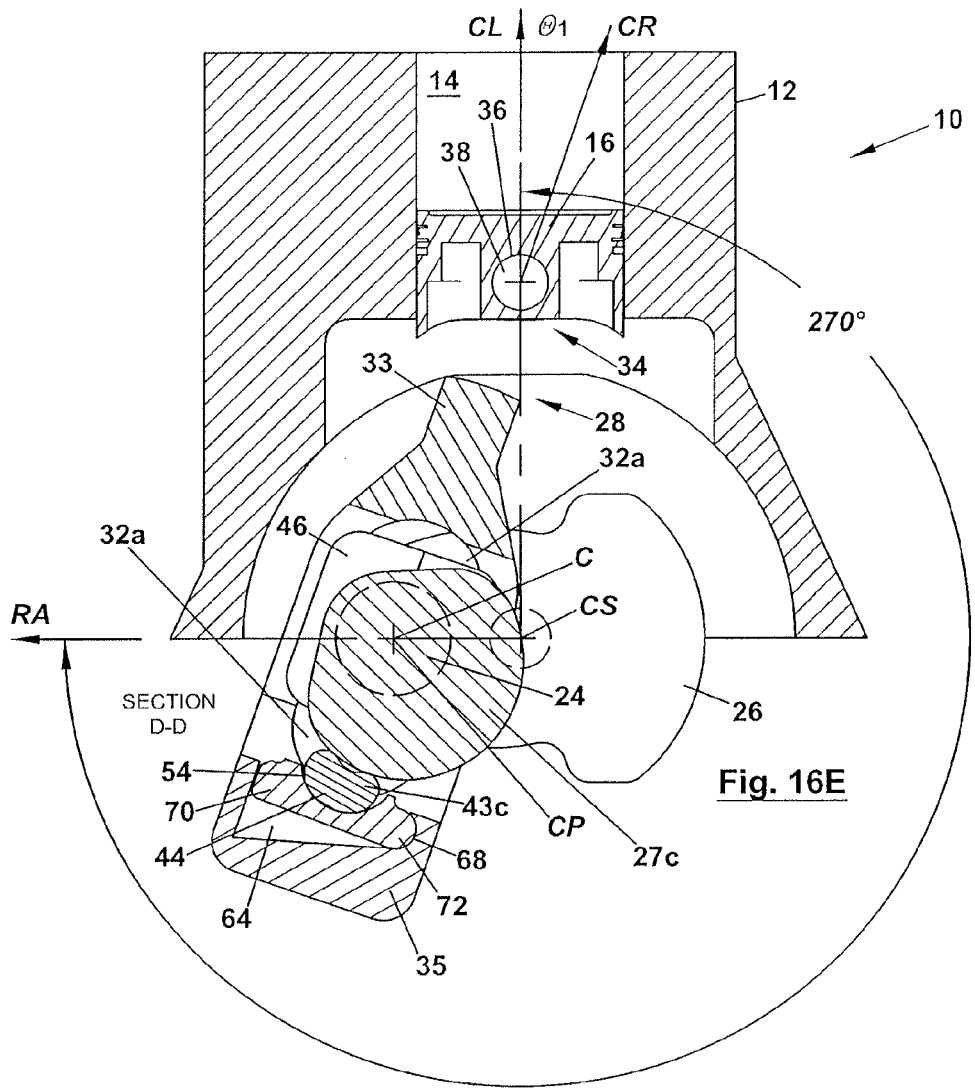
FIG. 16E is a schematic partial end section view taken along line D-D of FIG. 7 with a radial axis angle of the crankshaft shown at 270 degrees.
Figure 16F:
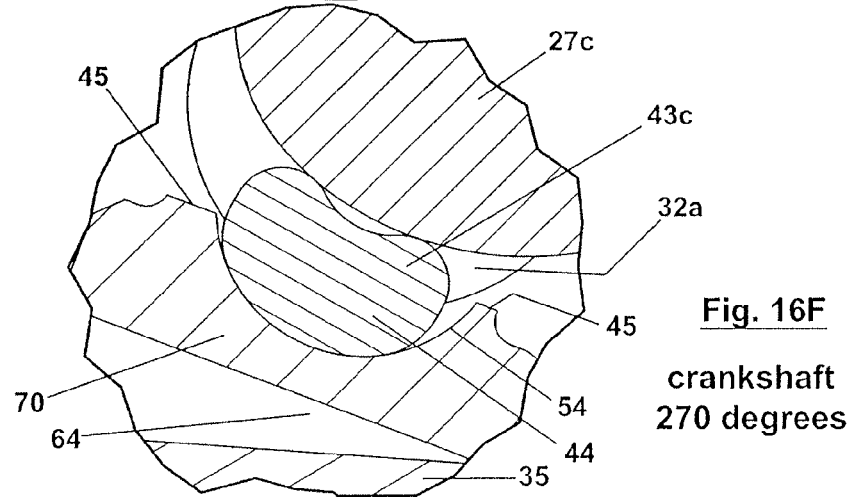
FIG. 16F is a schematic detail view of FIG. 16E.
Figure 17:
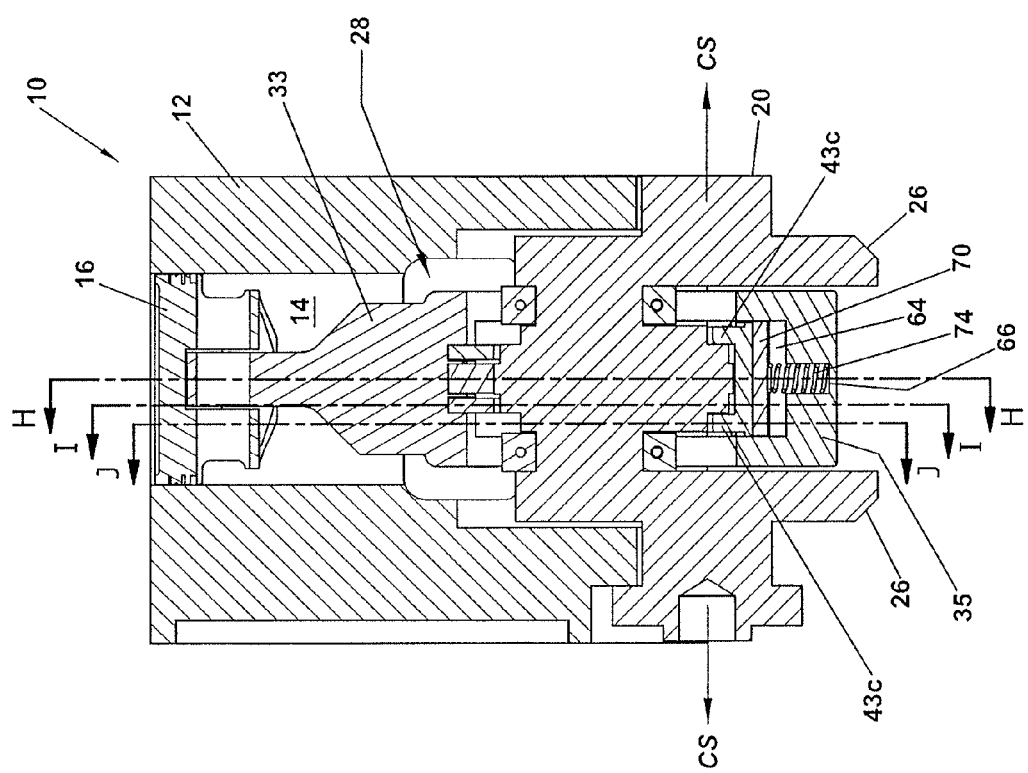
FIG. 17 is a schematic partial side section view similar to FIG. 7 showing a portion of another exemplary embodiment of an internal combustion engine.

As shown in FIGS. 16E and 16F, tertiary crankpin cam 27c and tertiary follower 43c remain in contact with one another, and the longitudinal position of crankpin journal 25a in oblong opening 32a is closely controlled by secondary crankpin cam 27a, secondary follower 43a, tertiary crankpin cam 27c, and tertiary follower 43c. Biasing member 74 continues to provide a biasing force against rocker member 70, thereby holding tertiary follower 43c in contact with tertiary crankpin cam 43c. Rocker member 70 remains spaced from cap recess 64 of cap portion 35, with biasing member 74 remaining in an extended configuration.

Referring back to FIGS. 9A-9F, crankshaft 20 has continued to rotate to an orientation where radial axis RA is 360 degrees past first stroke termination angle $\theta_1$, in particular, such that radial axis RA has returned to first stroke termination angle $\theta_1$. At this orientation of crankshaft 20, piston 16 has traveled up cylinder 14 to the end of its stroke. (As mentioned previously herein, according to some embodiments, piston 16 may continue to travel slightly up cylinder 14 as radial axis RA passes 360 degrees past first stroke termination angle $\theta_1$.). As shown in FIGS. 9A and 9B, crankpin cam 27 and follower 43 remain slightly separated from one another, and secondary crankpin cam 27a and secondary follower 43a remain in contact with one another, as shown in FIGS. 9C and 9D. The radius of the surface of secondary cam 27a is slightly less than the radius of the surface of secondary follower 43a at this point of contact. Contact between secondary crankpin cam 27a and secondary follower 43a controls the longitudinal position of crankpin journal 25a in oblong opening 32a. Relative to the position shown in FIGS. 16A-16F, radial distance $r_d'$ of secondary crankpin cam 27a has continued to decrease, and thus, crankpin journal 25a has continued to travel longitudinally up oblong opening 32a to a longitudinal position resulting in the effective length of connecting rod 28 being at a substantial minimum as piston 16 reaches the end of its stroke up cylinder 14.

As shown in FIGS. 9E and 9F, tertiary crankpin cam 27c and tertiary follower 43c remain in contact with one another, and the longitudinal position of crankpin journal 25a in oblong opening 32a is closely controlled by secondary crankpin cam 27a, secondary follower 43a, tertiary cam 27c, and tertiary follower 43c. Biasing member 74 continues to provide a biasing force against rocker member 70, thereby holding tertiary follower 43c in contact with tertiary cam 43c.

Rocker member 70 remains spaced from cap recess 64 of cap portion 35, with biasing member 74 remaining in an extended configuration.

According to some embodiments, cam 27 and follower 43 may be in contact with one another, and secondary cam 27a and secondary follower 43a may be in contact with one another, in an alternating fashion. (Actual contact may optionally be limited by, for example, hydrodynamic lubrication that may exist between the respective surfaces.) For example, while cam 27 and follower 43 are in contact with one another, secondary cam 27a and secondary follower 43a are not in contact with one another, and conversely, while secondary cam 27a and secondary follower 43a are in contact with one another, cam 27 and follower 43 are not in contact with one another. According to some embodiments, there may be ranges of the angular position of radial axis RA for which cam 27 and follower 43 are in contact with one another, and secondary cam 27a and follower 43a are in contact with one another.

In the exemplary manner described above, the distance between the center C of crankpin 24 and distal end 34 of connecting rod 28 (e.g., the center of pin 38) is variable. More specifically, the distance is variable (see, e.g., FIGS. 9A and 11B), with the variability of the distance being facilitated in the exemplary embodiment by virtue of crankpin 24 and connecting rod 28. As radial axis RA rotates between first stroke termination angle $\theta_1$ and 180 degrees past first stroke termination angle $\theta_1$ (i.e., to second stroke termination angle $\theta_2$), the distance between the center C of crankpin 24 and distal end 34 of connecting rod 28 initially increases, thereby delaying initiation of the power stroke until radial axis RA reaches a point, for example, at least about 35-40 degrees past first stroke termination angle $\theta_1$ in the exemplary embodiment shown. Timing of the initiation of combustion may be tailored to take advantage of this delay. The distance between the center C of crankpin 24 and distal end 34 of connecting rod 28 may remain relatively constant as radial axis RA continues to rotate toward an orientation 180 degrees past first stroke termination angle $\theta_1$ (see FIGS. 9A-15A). As the radial axis RA rotates between 180 and 360 degrees past first stroke termination angle $\theta_1$, the distance decreases (see FIGS. 15A and 9A).

According to some embodiments, the exemplary configuration and/or interaction between crankshaft 20 and connecting rod 28 may be tailored to achieve desired performance characteristics of exemplary engine 10, such as, for example, improved efficiency, improved torque, improved power output, and/or improved responsiveness. For example, the profiles of the one or more of the crankpin cams may be configured to improve efficiency and/or power of exemplary engine 10, for example, by changing at least one of the timing and magnitude of the delay of initiation of the power stroke.

According to some embodiments, initiation of the power stroke of exemplary engine 10 may be delayed until radial axis RA has rotated at least about 15 degrees beyond the first stroke termination angle $\theta_1$. In other embodiments, initiation of the power stroke may be delayed until radial axis RA has rotated at least about 30 degrees beyond the first stroke termination angle $\theta_1$ (e.g., at least about 40 or 45 degrees beyond the first stroke termination angle $f_1$). In other embodiments, rotation may be set to about 25 or 35 degrees beyond the first stroke termination angle $\theta_1$, for example, to achieve a desired performance characteristic of engine 10.

According to some embodiments, depending on, for example, the profile of one or more of the crankpin cams, piston 16 may continue to travel slightly up into cylinder 14 as radial axis RA rotates between 0 degrees and, for example, about 35-40 degrees past first stroke termination angle $\theta_1$, with the downward travel of piston 16 within cylinder 14 beginning thereafter. In other words, during the delay of the power stroke, piston 16 is not necessarily stationary in cylinder 14, but rather, piston 16 may continue its upward travel in cylinder 14 relative to its position in cylinder 14 as radial axis RA passes 0 degrees relative to first stroke termination angle $\theta_1$.

Cam profiles 29, 29a, 29b, 29c, and/or 29d of respective crankpin cams 27, 27a, 27b, 27c, and/or 27d may be selected to facilitate a desired speed and/or acceleration of the travel of piston 16 within cylinder 14. For example, the cam profile of one or more of the crankpin cams may be configured to provide a relatively faster travel and/or higher acceleration following the end of the delay of the beginning of the power stroke. Such cam profile tailoring may be performed to provide a desired power, torque, and/or efficiency of engine 10.

According to some embodiments, engine 10 may be configured to selectively operate in at least two modes. For example, in a first mode of operation the distance between the between the center C of crankpin 24 (e.g., the longitudinal axis CP of crankpin 24) and distal end 34 of connecting rod 28 may vary in a constant manner as described above. In a second mode of operation, the profiles of one or more of the crankpin cams may be variable in a radial manner, such that the delay in the power stroke of piston 16 may be varied according to a desired tailoring. This may be accomplished via, for example, cam phasing, where one or more of crankpin cams 27, 27a, 27b, 27c, and 27d may rotate relative to crankpin journals 25a and 25b (see FIG. 3), thereby changing the position of radial axis RA at which the power stroke begins. In this exemplary second mode of operation, it may be possible to tailor operation of engine 10 to vary the power output, torque, and/or efficiency of the operation of engine 10 according to certain operating parameters. According to some embodiments, engine 10 may operate according to a combination of the first and second modes.

As described in more detail below, the exemplary engine 10 shown in FIGS. 17-25F operates in a manner similar to the exemplary engine shown in FIGS. 7-16F, with the exception of crankpin cam 27 and secondary crankpin cams 27a and 27b, and the associated followers 43, 43a, and 43b. In particular, the roles of crankpin cam 27 and secondary crankpin cams 27a and 27b are reversed relative to the exemplary embodiment shown in FIGS. 7-16F.

For the purpose of clarity of the description and due to the limited ability of the section views of FIGS. 18A-25F to show various exemplary structures, although the exemplary embodiments described with respect to FIGS. 18A-25F include pairs of crankpin journals 25a and 25b (see FIG. 3), pairs of oblong openings 32a and 32b, pairs of secondary crankpin cams 27a and 27b, pairs of secondary followers 43a and 43b, pairs of tertiary crankpin cams 27c and 27d, and pairs of tertiary followers 43c and 43d, the following description will refer to only one of the respective pairs of the crankpin journals, oblong openings, secondary crankpin cams, secondary followers, tertiary crankpin cams, and tertiary followers. As noted previously herein, some alternative embodiments may include only a single one of (i.e., as opposed to pairs of) the crankpin journal, the oblong opening, the secondary crankpin cam, the secondary follower, the tertiary crankpin cam, and/or the tertiary follower.

Figure 18A:
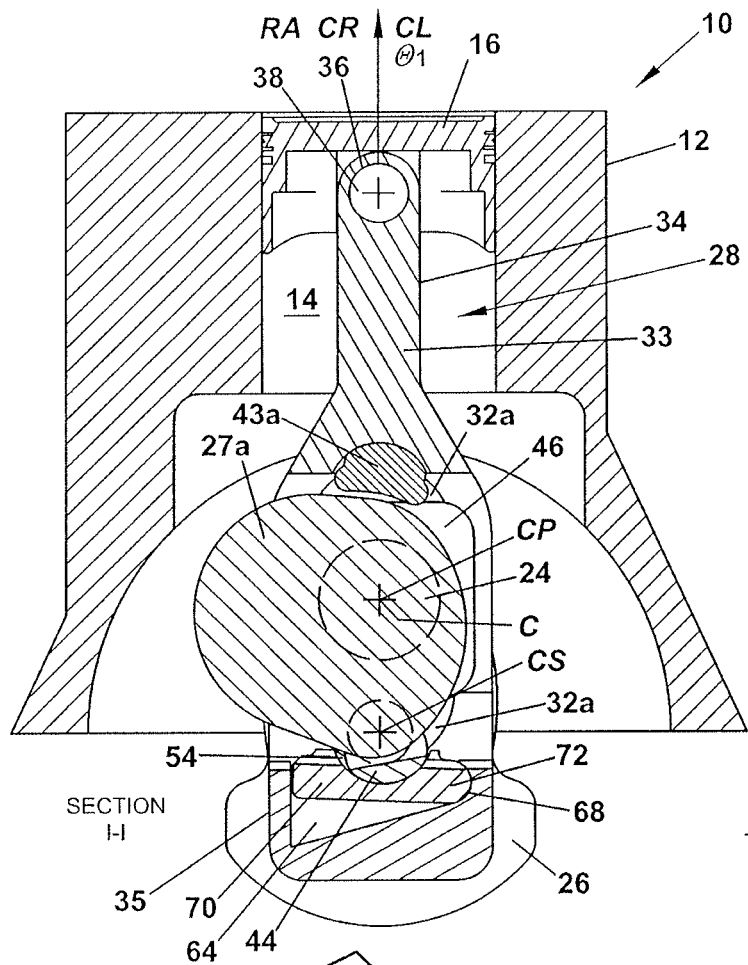
FIG. 18A is a schematic partial end section view taken along line I-I of FIG. 17 with a radial axis angle of the crankshaft shown at 0 degrees.
Figure 18B:
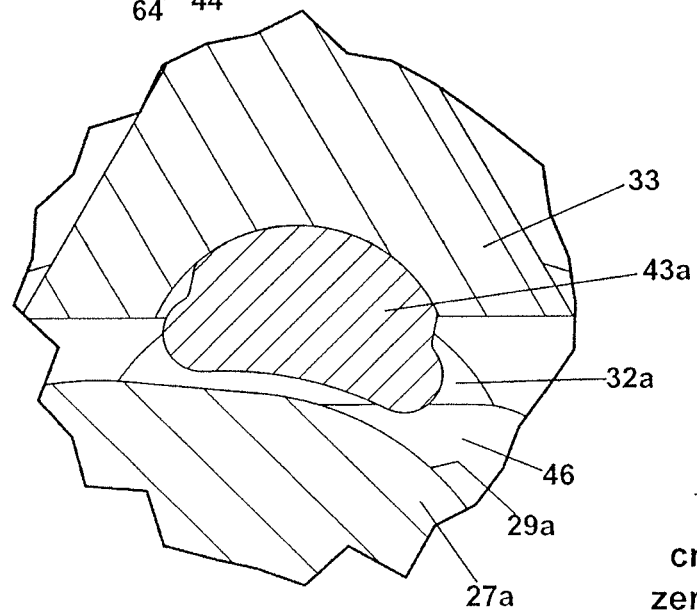
FIG. 18B is a schematic detail view of FIG. 18A.

As shown in FIGS. 18A and 18B, during operation of this exemplary engine 10, crankshaft 20 rotates in the clockwise direction. With secondary crankpin cam 27a and secondary follower 43a interacting as shown, crankpin journal 25a (see FIG. 3) is located generally centrally within the length of oblong opening 32a, such that piston 16 is at the top of its stroke while radial axis RA of crankshaft 20 is substantially aligned with the longitudinal axis CR of connecting rod 28. This position and exemplary configuration results in the distance between the center C of crankpin 24 and distal end 34 (e.g., the center of second aperture 36) of connecting rod 28 being reduced relative to the distance between the center C of crankpin 24 and distal end 34 of connecting rod 28 shown in, for example, FIGS. 20A-24F.

Figure 18C:
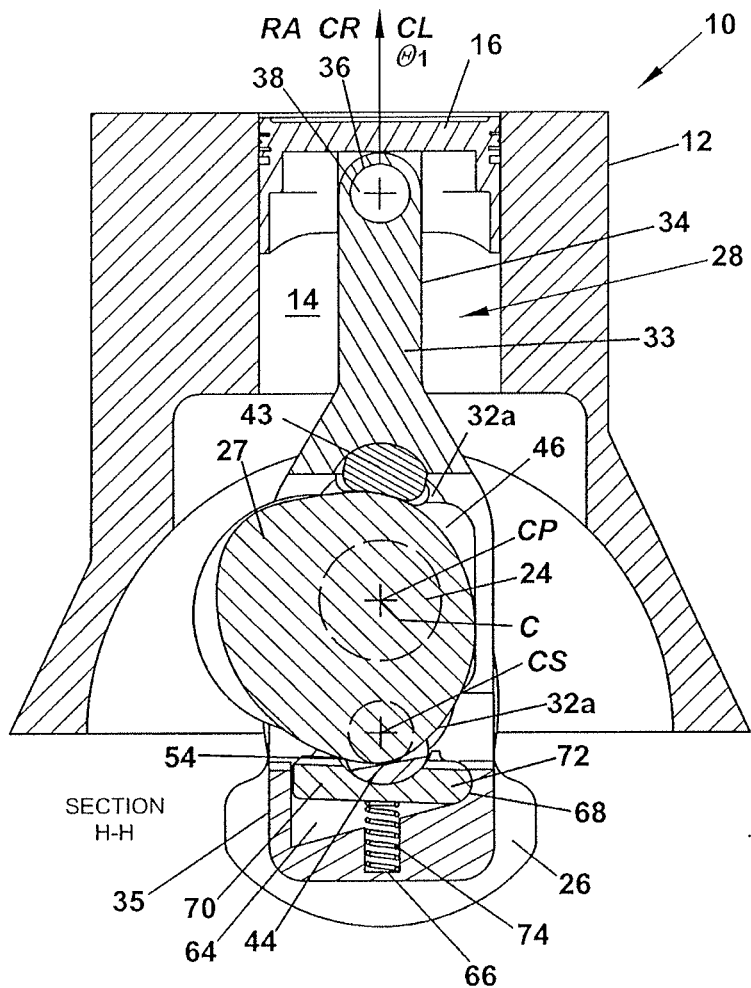
FIG. 18C is a schematic partial end section view taken along line H-H of FIG. 17 with a radial axis angle of the crankshaft shown at 0 degrees.
Figure 18D:
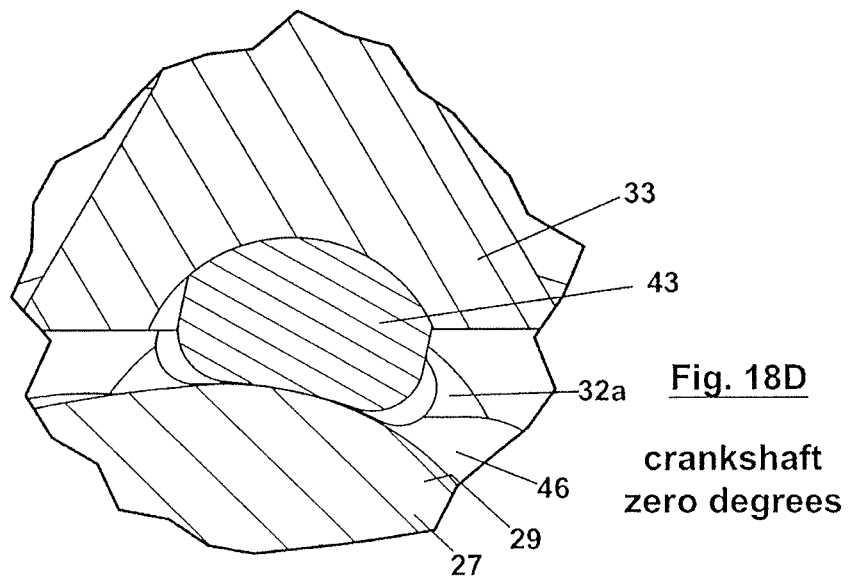
FIG. 18D is a schematic detail view of FIG. 18C.

As shown in FIGS. 18A and 18B, exemplary secondary crankpin cam 27a and exemplary secondary follower 43a are not in contact with one another. In particular, radial distance $r_d'$ of secondary cam profile 29a is short enough that secondary crankpin cam 27a does not contact secondary follower 43a. Referring to FIGS. 18C and 18D, however, crankpin cam 27 and follower 43 are in contact with one another, and thus, serve to control the distance between the center C of crankpin 24 and distal end 34 of connecting rod 28 and/or or the longitudinal position of crankpin journal 25a along the longitudinal axis of oblong opening 32a.

Figure 18E:
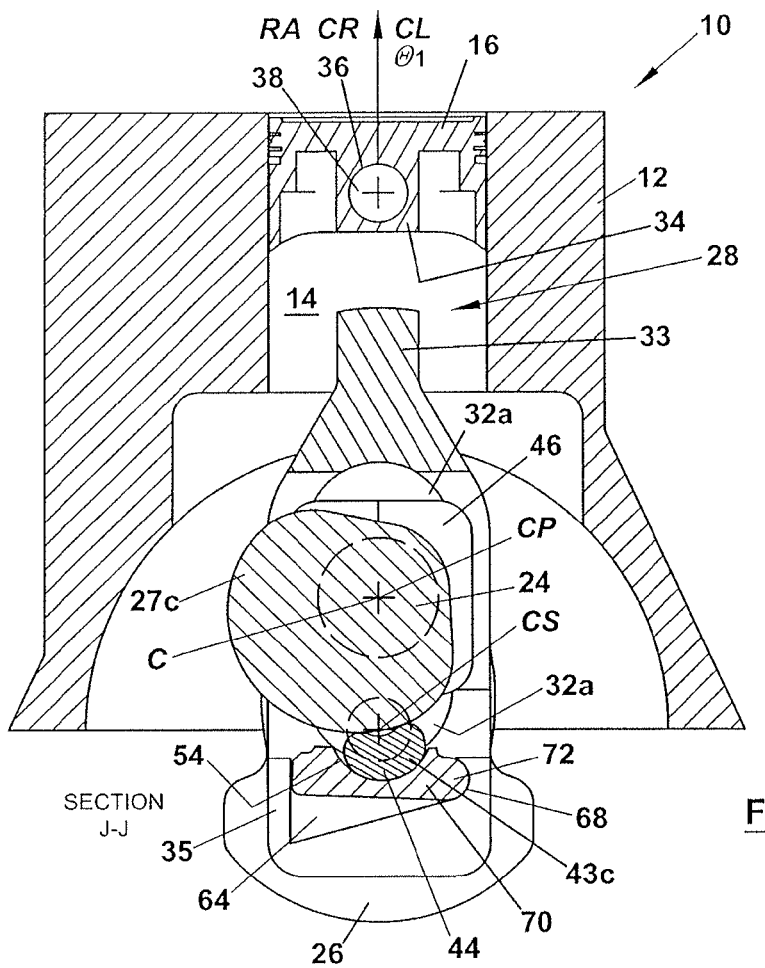
FIG. 18E is a schematic partial end section view taken along line J-J of FIG. 17 with a radial axis angle of the crankshaft shown at 0 degrees.
Figure 18F:
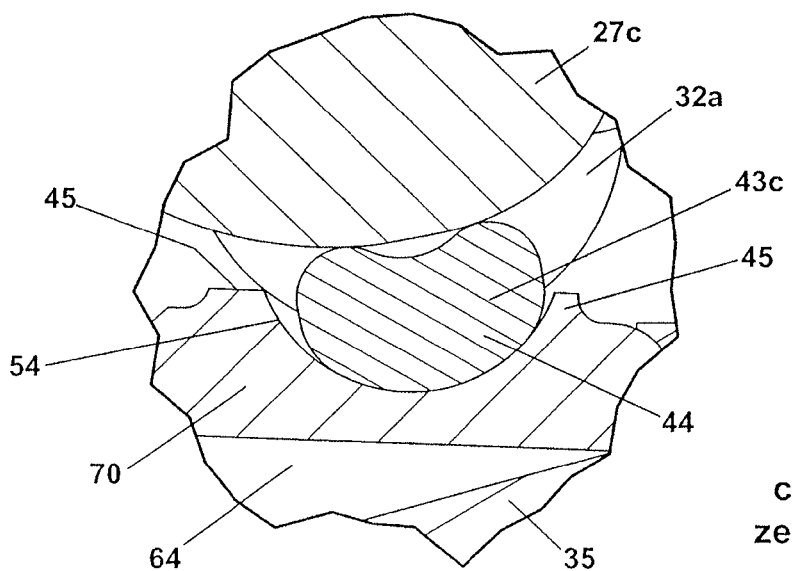
FIG. 18F is a schematic detail view of FIG. 18E.

Referring to FIGS. 18E and 18F, tertiary crankpin cam 27c and tertiary follower 43c are in contact with one another, and thus, the longitudinal position of crankpin journal 25a in oblong opening 32a may be closely controlled. Biasing member 74 provides a biasing force against rocker member 70, thereby holding tertiary follower 43c in contact with tertiary crankpin cam 43c.

Figure 19A:
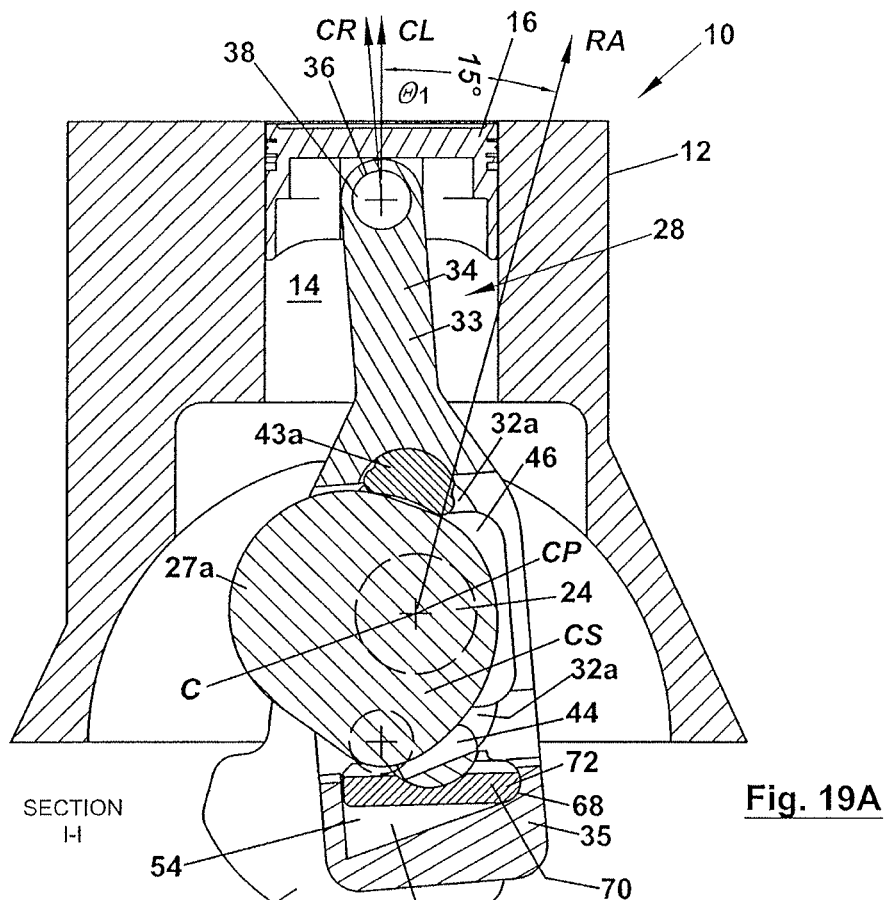
FIG. 19A is a schematic partial end section view taken along line I-I of FIG. 17 with a radial axis angle of the crankshaft shown at 15 degrees.
Figure 19B:
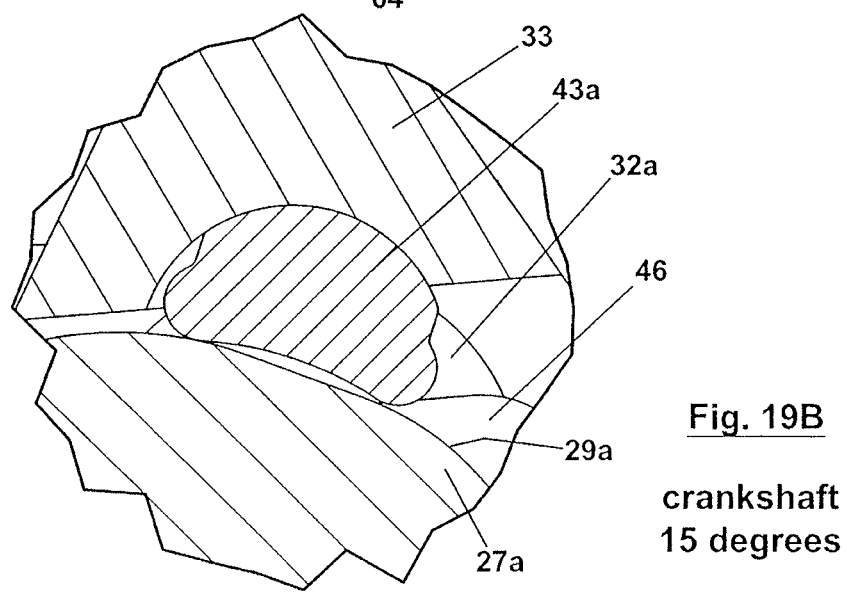
FIG. 19B is a schematic detail view of FIG. 19A.

Referring to FIGS. 19A-19F, crankshaft 20 is in an orientation where radial axis RA has rotated 15 degrees past first stroke termination angle $\theta_1$. In a conventional engine, piston 16 would have started to travel toward crankshaft axis CS as radial axis RA rotates through 15 degrees. In contrast, according to exemplary engine 10, piston 16 has not yet started its downward travel toward crankshaft axis CS. According to some embodiments, piston 16 may actually continue to travel slightly up cylinder 14 between zero and 15 degrees past first stroke termination angle $\theta_1$. As shown in FIGS. 19A and 19B, secondary crankpin cam 27a is just beginning to contact secondary follower 43a, with the radius of the surface of secondary follower 43a being slightly smaller than the radius of the surface of secondary crankpin cam 27a.

Figures 19C, 19D:
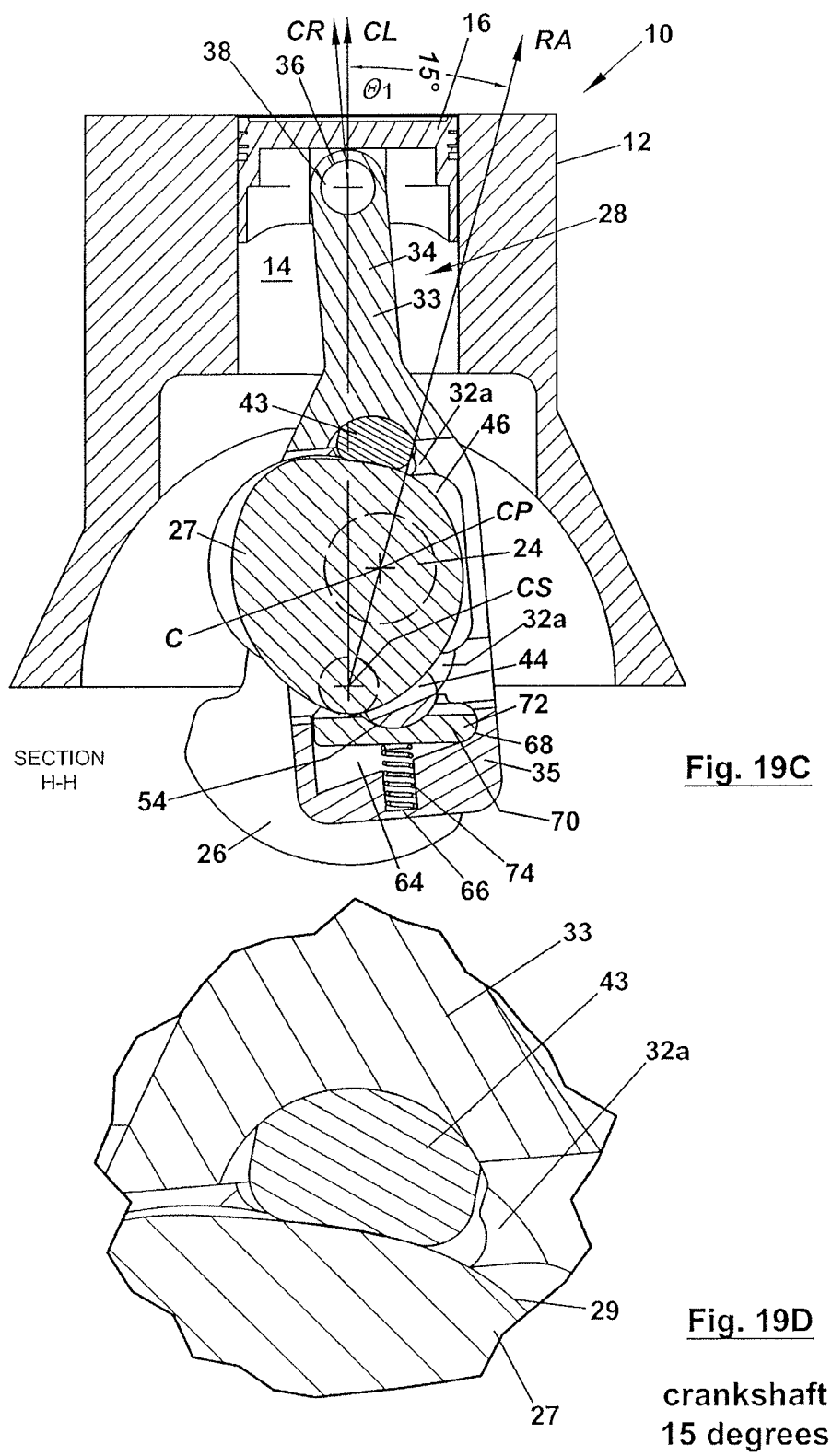
FIG. 19C is a schematic partial end section view taken along line H-H of FIG. 17 with a radial axis angle of the crankshaft shown at 15 degrees.
FIG. 19D is a schematic detail view of FIG. 19C.

Referring to FIGS. 19C and 19D, crankpin cam 27 and follower 43 remain in contact, with the radial distance $r_d$ of cam profile 29 increasing, such that crankpin journal 25a (see FIG. 3) moves longitudinally down oblong opening 32a, thereby increasing the effective length of connecting rod 28 (i.e., increasing the distance between the center C of crankpin 24 and distal end 34 of connecting rod 28). As a result, instead of piston 16 beginning to travel down cylinder 14, piston 16 remains at the end of its upward stroke (or continues to travel up cylinder 14). As shown in FIG. 19D, exemplary crankpin cam 27 and follower 43 are configured such that the radius of the surface of crankpin cam 27 is similar to the radius of the adjacent surface of follower 43 at this position of the radial axis RA of crankshaft 20.

Figure 19E:
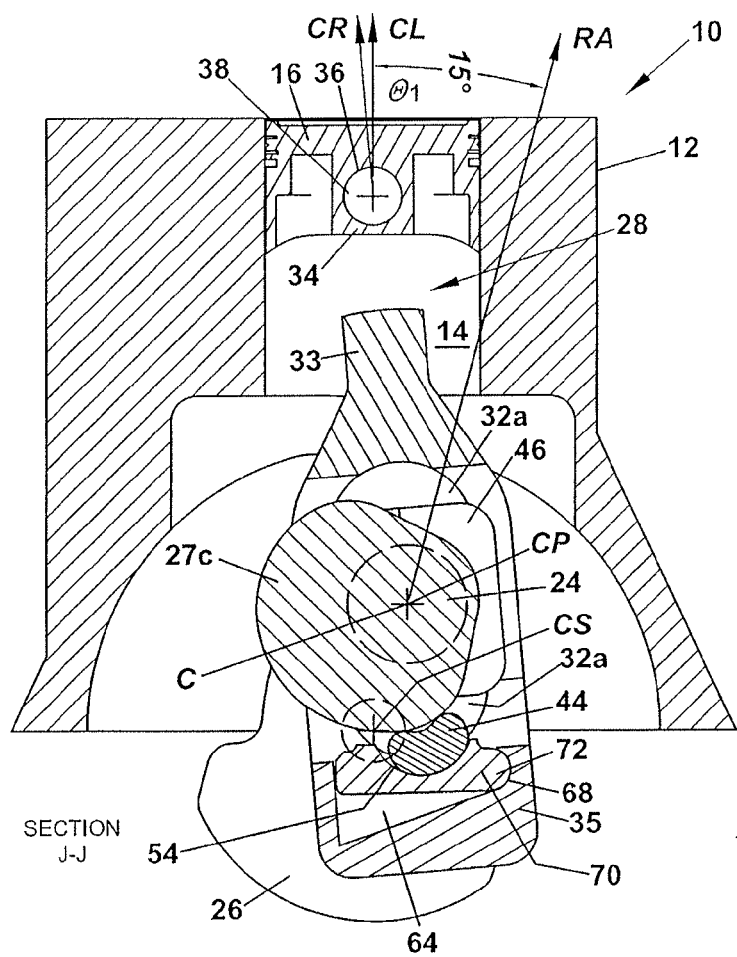
FIG. 19E is a schematic partial end section view taken along line J-J of FIG. 17 with a radial axis angle of the crankshaft shown at 15 degrees.
Figure 19F:
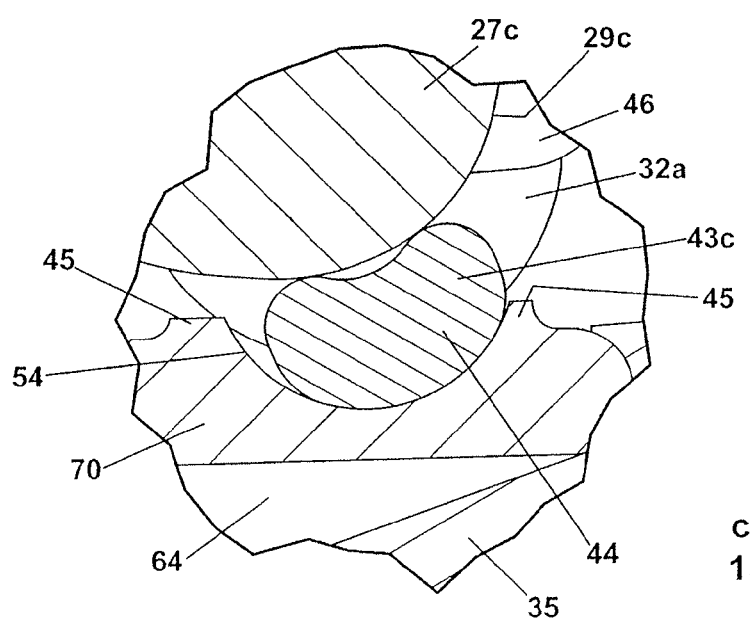
FIG. 19F is a schematic detail view of FIG. 19E.

Referring to FIGS. 19E and 19F, tertiary crankpin cam 27c and tertiary follower 43c remain in contact with one another, and thus, the longitudinal position of crankpin journal 25a in oblong opening 32a continues to be closely controlled. Biasing member 74 continues to provide a biasing force against rocker member 70, thereby holding tertiary follower 43c in contact with tertiary crankpin cam 43c.

In FIGS. 20A-20F, crankshaft 20 has rotated to an orientation where radial axis RA is 35 degrees past first stroke termination angle $\theta_1$. In a conventional engine, piston 16 would have traveled a significant distance toward crankshaft axis CS as radial axis RA rotates through 35 degrees. In contrast, according to exemplary engine 10, piston 16 has not yet started its downward travel toward crankshaft axis CS. Instead, secondary crankpin cam 27a has rotated relative secondary follower 43a, such that interaction between secondary crankpin cam 27a and secondary follower 43a results in crankpin journal 25a (see FIG. 3) moving down (in the orientation shown) within oblong opening 32a to a position more remote from the central portion of oblong opening 32a in a manner resulting in substantially no movement of distal end 34 of connecting rod 28. In particular, radial distance $r_d'$ of secondary cam profile 29a has increased (compare FIGS. 18A and 20A), thereby forcing crankpin journal 25a down oblong opening 32a. As a result, the distance between the center C of crankpin 24 and distal end 34 of connecting rod 28 has increased relative the distance shown in FIGS. 18A and 18B. As a result of this increase in the distance, piston 16 has not started to travel down cylinder 14, even though crankpin 24 has rotated clockwise relative to the center C of crankshaft 20, such that the center CP of crankpin 24 is farther from the top of cylinder 14. As a result, the distance increases, such that rather than beginning downward travel in cylinder 14, piston 16 remains substantially in its position of maximum stroke. According to some embodiments, piston 16 may actually continue to travel slightly up cylinder 14 between zero and 35 degrees past first stroke termination angle $\theta_1$.

Figure 20A:
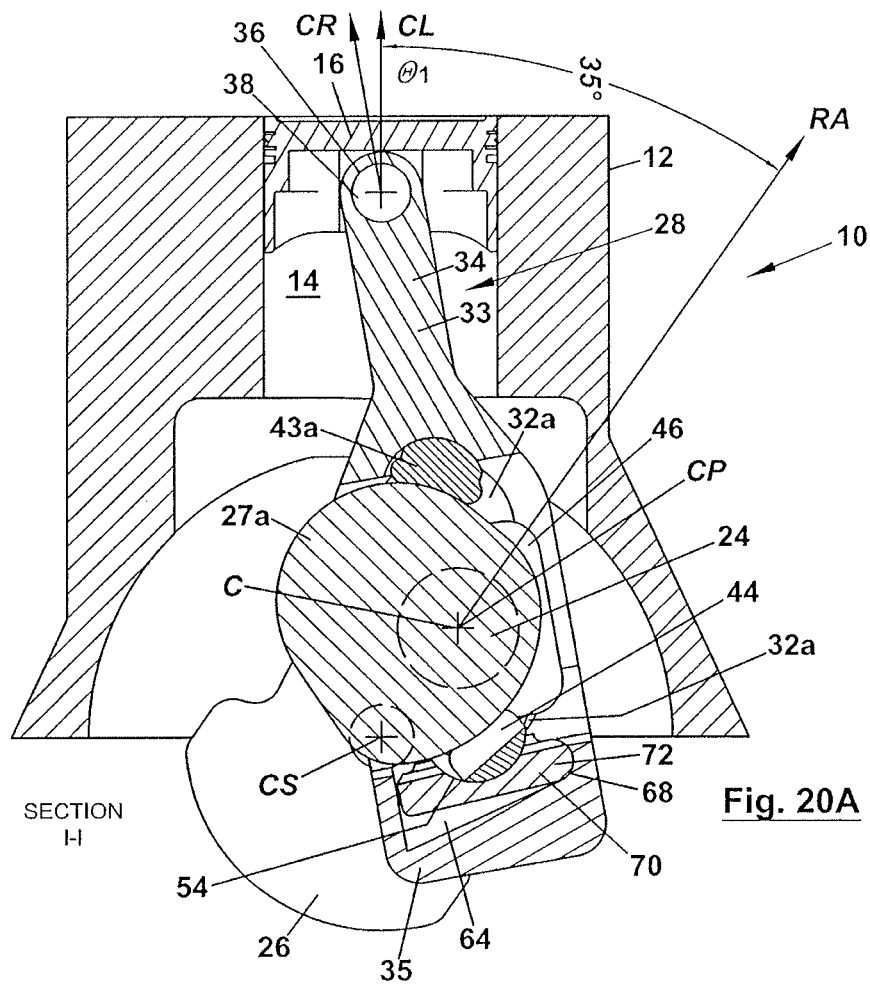
FIG. 20A is a schematic partial end section view taken along line I-I of FIG. 17 with a radial axis angle of the crankshaft shown at 35 degrees.
Figure 20B:
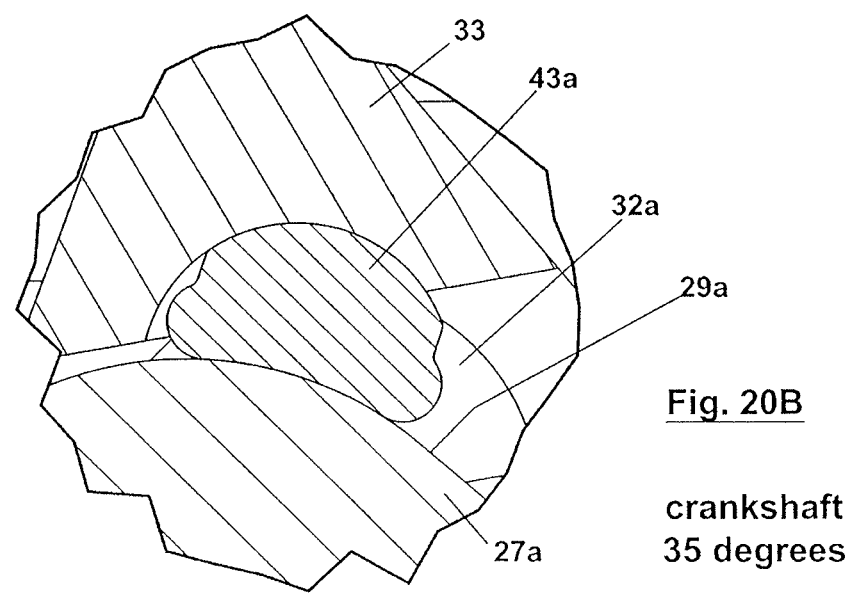
FIG. 20B is a schematic detail view of FIG. 20A.
Figure 20C:
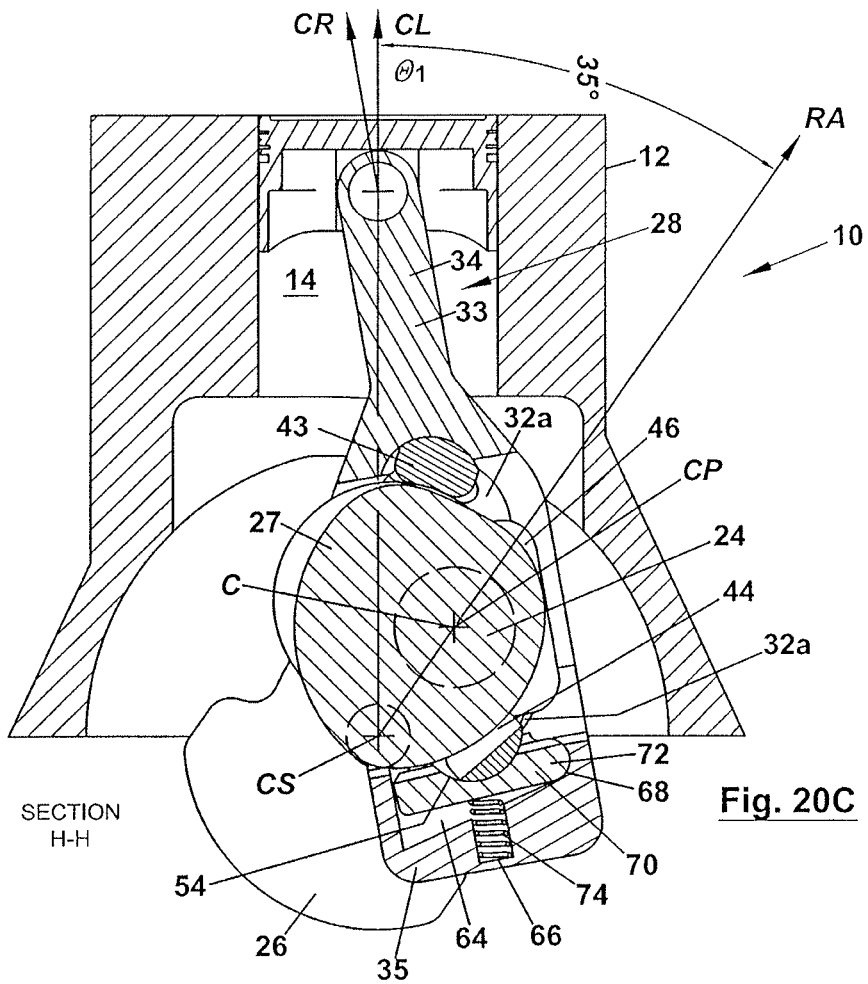
FIG. 20C is a schematic partial end section view taken along line H-H of FIG. 17 with a radial axis angle of the crankshaft shown at 35 degrees.

As shown in FIGS. 20A and 20B, secondary crankpin cam 27a is now in contact with secondary follower 43a, with the radius of the surface of secondary follower 43a being similar to (e.g., the same as) the radius of the surface of secondary crankpin cam 27a. By virtue of the radii of the respective surfaces of secondary crankpin cam 27a and secondary follower 43a being similar or the same, the area of contact between the two surfaces is greater, which may serve to reduce friction and/or wear between the surfaces of secondary crankpin cam 27a and secondary follower 43a during the power stroke of engine 10 (and, when engine 10 is a four-stroke engine, during the intake stroke).

Figure 20D:
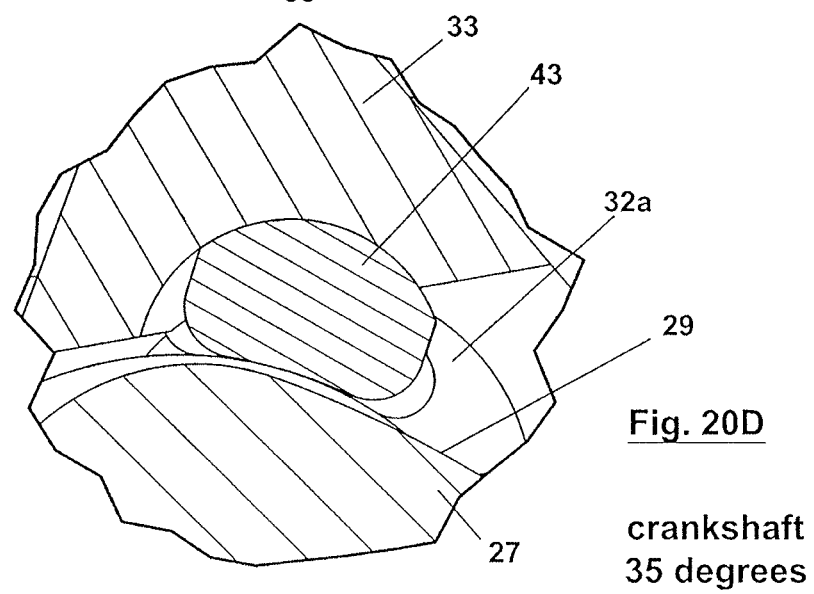
FIG. 20D is a schematic detail view of FIG. 20C.

In the example shown, the radial distance $r_d'$ of secondary crankpin cam 27a at the point or surface of contact with secondary follower 43a is increasing, thereby increasing the effective length of connecting rod 28. As a result, instead of piston 16 beginning to travel down cylinder 14, piston 16 remains at the end of its upward stroke or, in some embodiments, continues to travel up cylinder 14. In contrast to FIG. 19D, as shown in FIG. 20D, exemplary cam 27 and follower 43 are no longer in contact with one another, and thus, the contact between secondary crankpin cam 27a and secondary follower 43a control the longitudinal position of crankpin journal 25a (see FIG. 3) in oblong opening 32a.

Figure 20E:
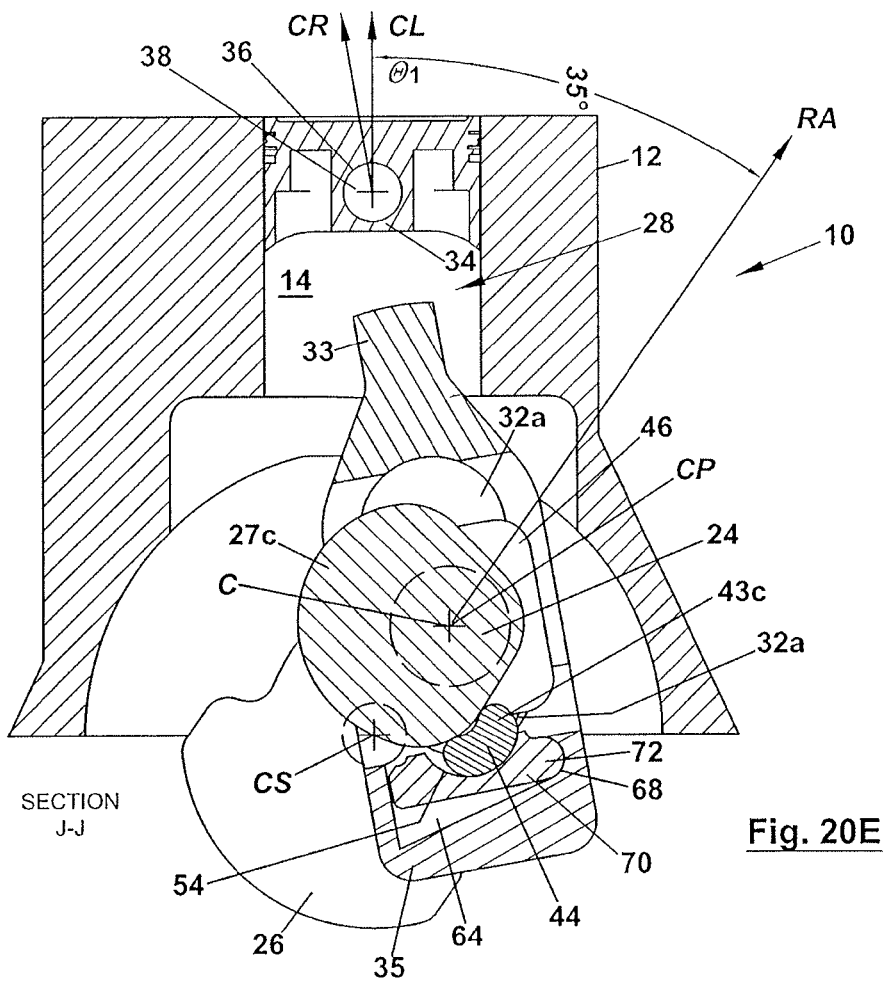
FIG. 20E is a schematic partial end section view taken along line J-J of FIG. 17 with a radial axis angle of the crankshaft shown at 35 degrees.
Figure 20F:
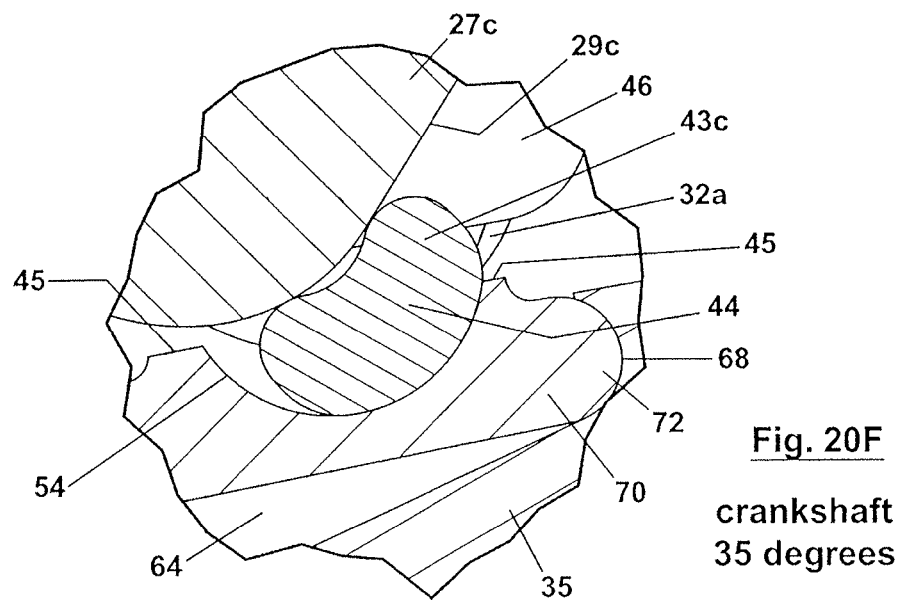
FIG. 20F is a schematic detail view of FIG. 20E.

As shown in FIGS. 20E and 20F, tertiary crankpin cam 27c and tertiary follower 43c remain in contact with one another, and thus, the longitudinal position of crankpin journal 25a in oblong opening 32a is closely controlled by secondary crankpin cam 27a, secondary follower 43a, tertiary crankpin cam 27c, and tertiary follower 43c. Biasing member 74 continues to provide a biasing force against rocker member 70, thereby holding tertiary follower 43c in contact with tertiary crankpin cam 43c.

Figure 21A:
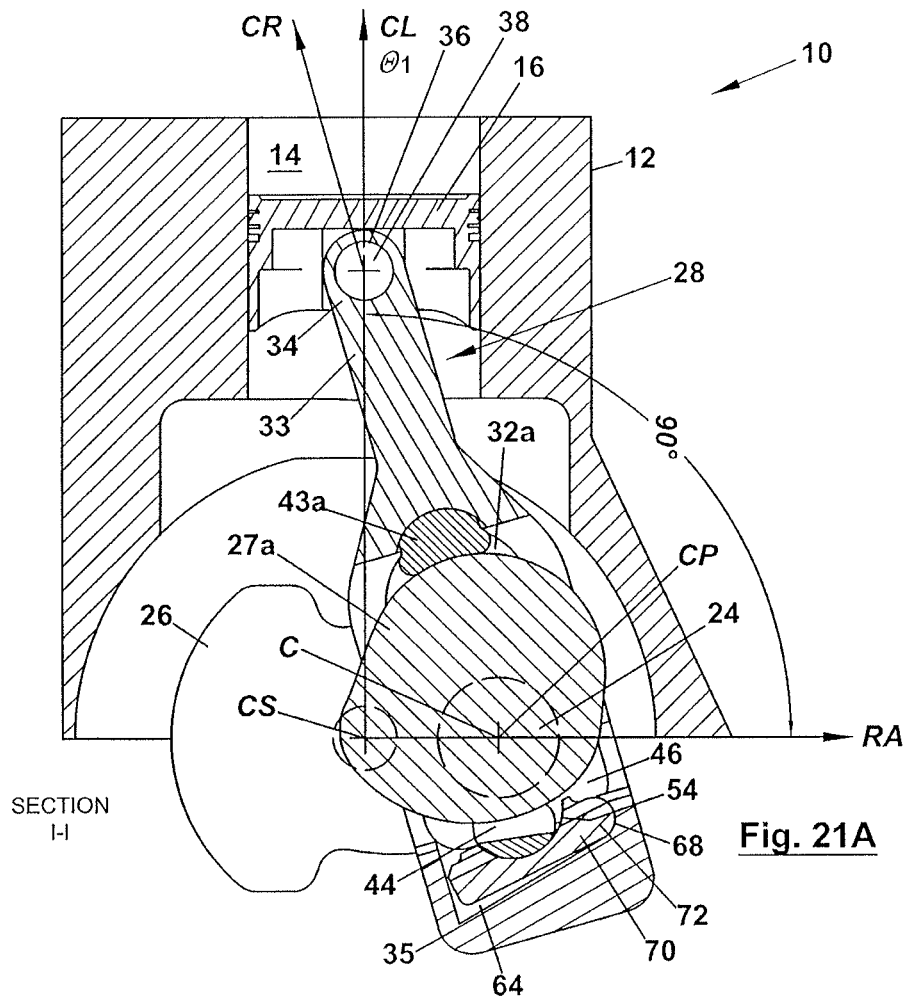
FIG. 21A is a schematic partial end section view taken along line I-I of FIG. 17 with a radial axis angle of the crankshaft shown at 90 degrees.
Figure 21B:
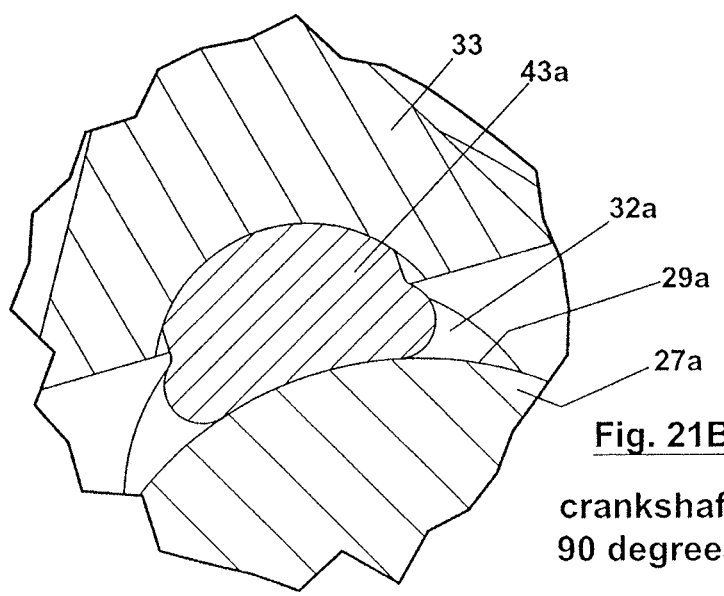
FIG. 21B is a schematic detail view of FIG. 21A.
Figure 21C:
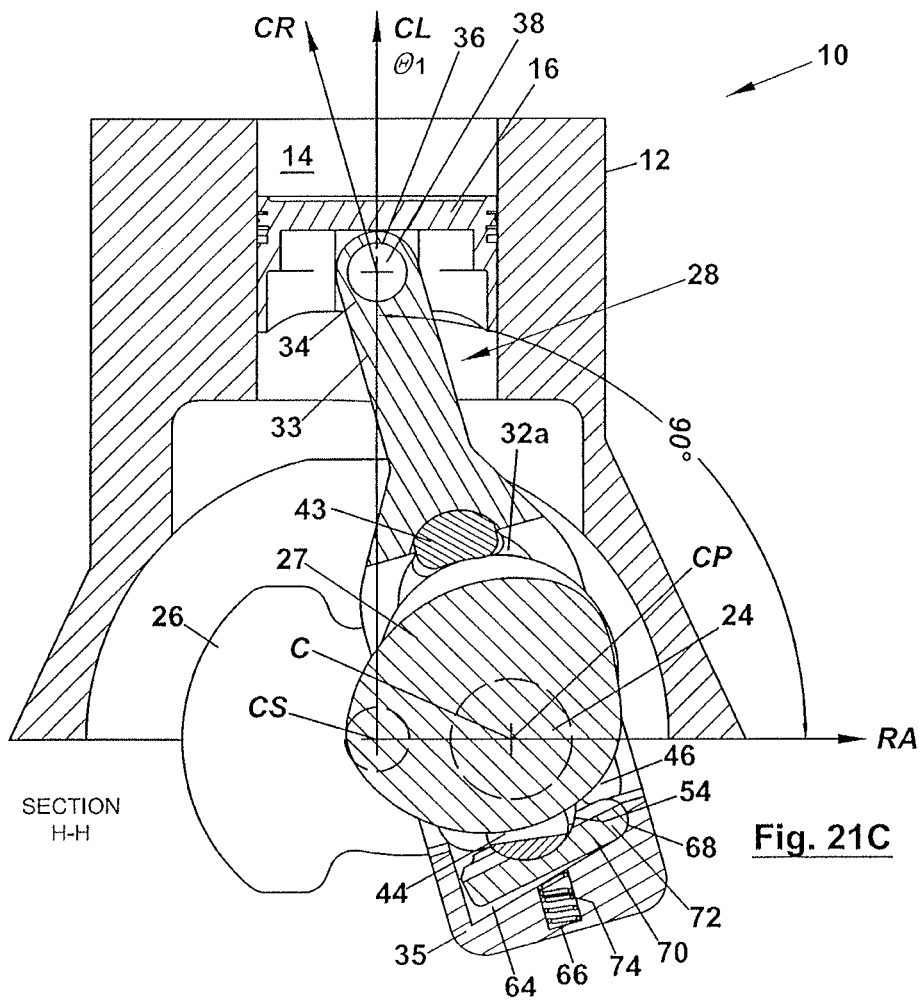
FIG. 21C is a schematic partial end section view taken along line H-H of FIG. 17 with a radial axis angle of the crankshaft shown at 90 degrees.

As shown in FIGS. 21A-21F, crankshaft 20 has rotated to an orientation where radial axis RA is 90 degrees past first stroke termination angle $\theta_1$. In contrast to FIGS. 18A-20F, piston 16 has now started its downward travel toward crankshaft axis CS. As shown in FIGS. 21A and 21B, secondary crankpin cam 27a remains in contact with secondary follower 43a, and the radius of the surface of secondary follower 43a continues to be similar to (e.g., the same as) the radius of the surface of secondary crankpin cam 27a. As shown in FIG.

Figure 21D:
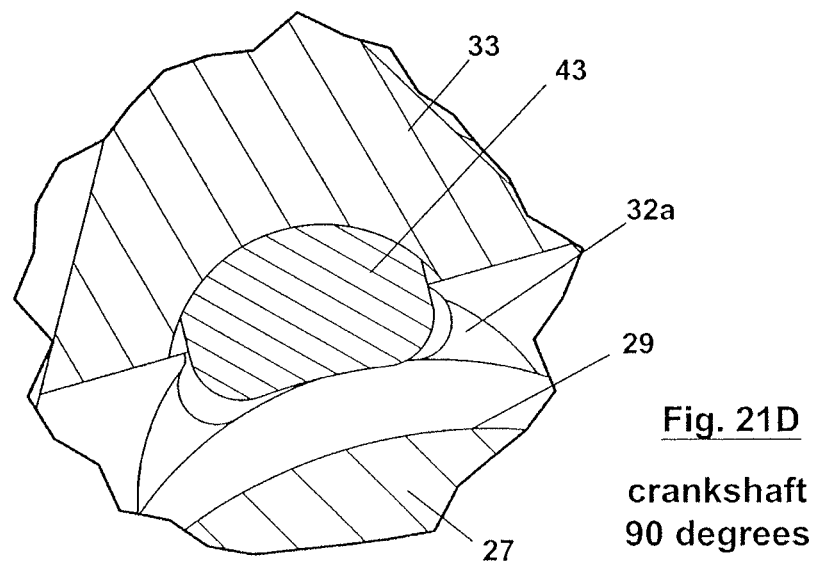
FIG. 21D is a schematic detail view of FIG. 21C.

21A, the radial distance $r_d'$ of secondary crankpin cam 27a at the point or surface of contact with secondary follower 43a is at about its maximum, resulting in crankpin journal 25a being at about its maximum longitudinal position down oblong opening 32a, such that the effective length of connecting rod 28 is at about its maximum. As shown in FIG. 21D, exemplary crankpin cam 27 and follower 43 continue to not be in contact with one another. As a result, the contact between secondary crankpin cam 27a and secondary follower 43a controls the longitudinal position of crankpin journal 25a in oblong opening 32a.

Figure 21E:
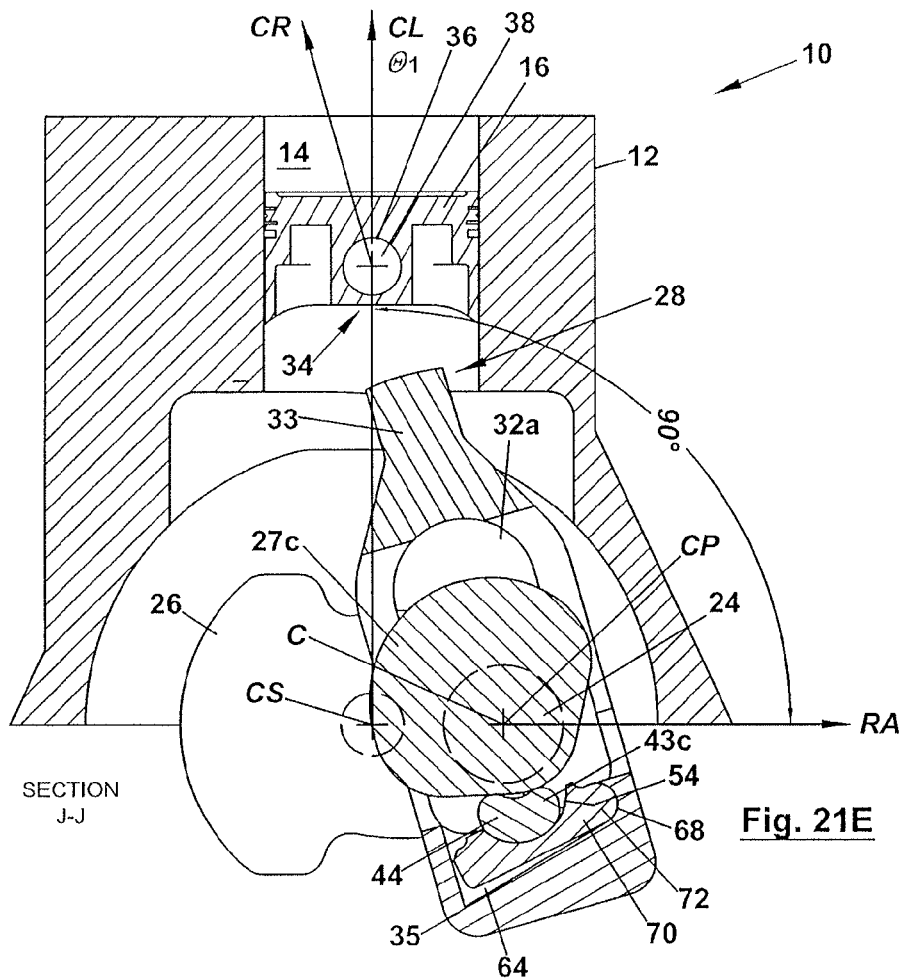
FIG. 21E is a schematic partial end section view taken along line J-J of FIG. 17 with a radial axis angle of the crankshaft shown at 90 degrees.
Figure 21F:
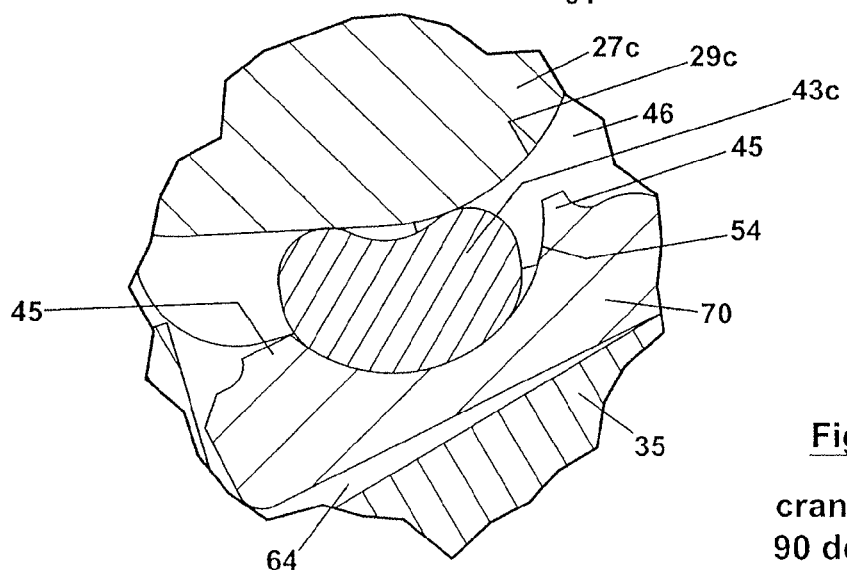
FIG. 21F is a schematic detail view of FIG. 21E.

As shown in FIGS. 21E and 21F, tertiary crankpin cam 27c and tertiary follower 43c remain in contact with one another, and thus, the longitudinal position of crankpin journal 25a (see FIG. 3) in oblong opening 32a is closely controlled by secondary crankpin cam 27a, secondary follower 43a, tertiary crankpin cam 27c, and tertiary follower 43c. Biasing member 74 continues to provide a biasing force against rocker member 70, thereby holding tertiary follower 43c in contact with tertiary crankpin cam 43c. However, as shown in FIGS. 21E and 21F, rocker member 70 is no longer spaced significantly from cap recess 64 of cap portion 35 of connecting rod 28, with the interaction between tertiary crankpin cam 27c and tertiary follower 43c compressing biasing member 74.

Figure 22A:
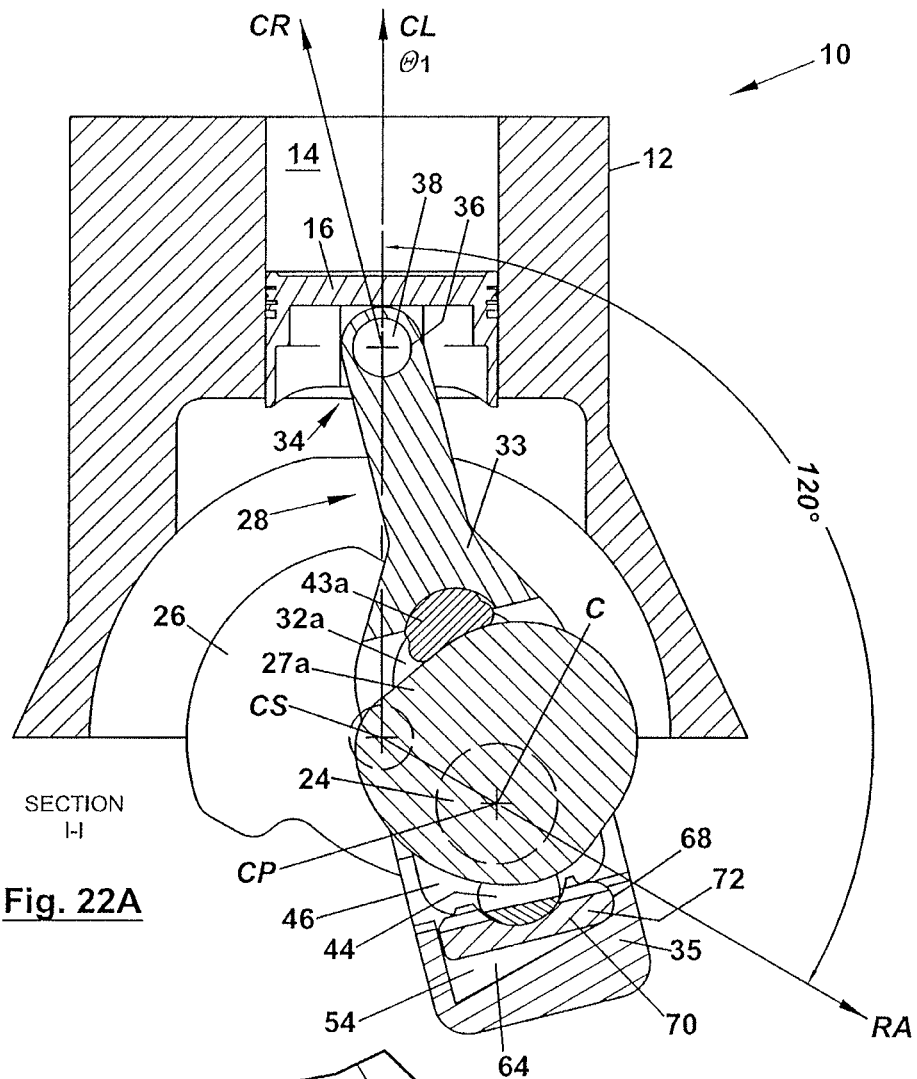
FIG. 22A is a schematic partial end section view taken along line I-I of FIG. 17 with a radial axis angle of the crankshaft shown at 120 degrees.
Figure 22B:
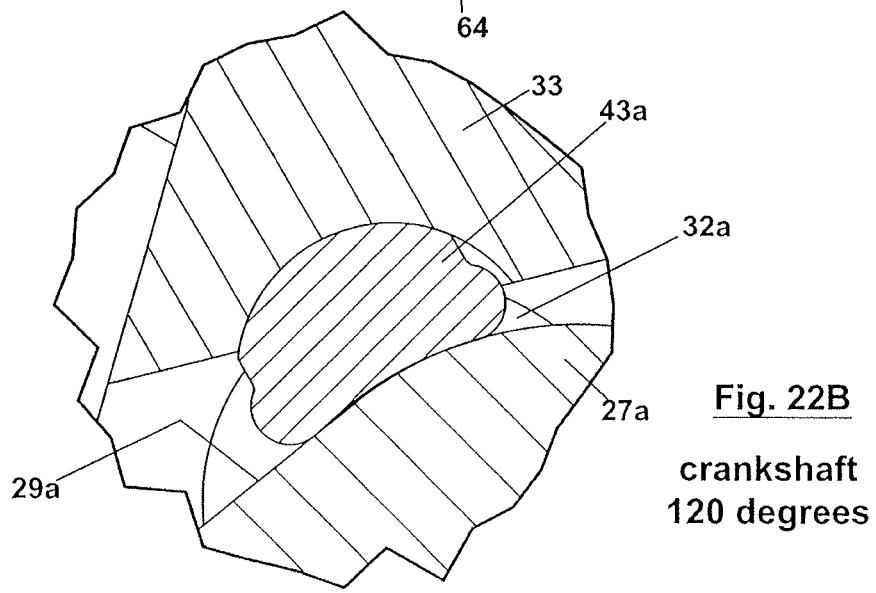
FIG. 22B is a schematic detail view of FIG. 22A.
Figure 22C:
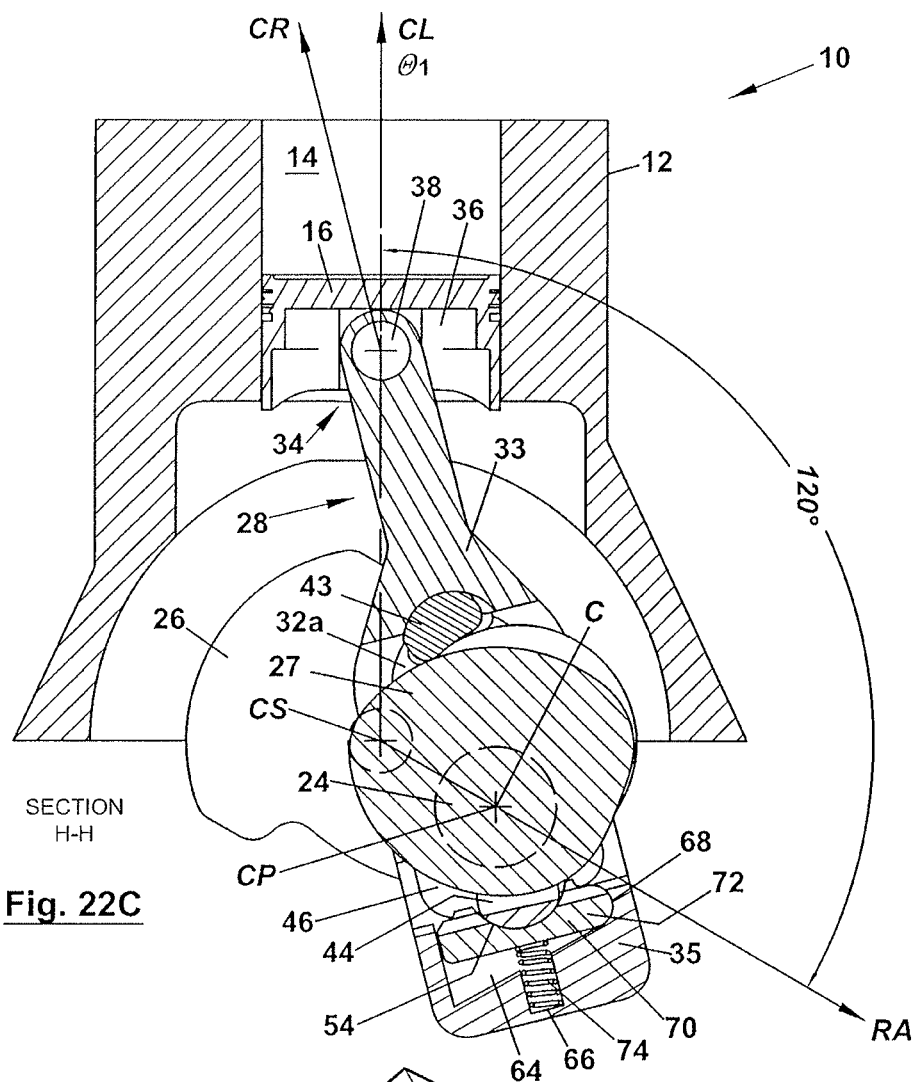
FIG. 22C is a schematic partial end section view taken along line H-H of FIG. 17 with a radial axis angle of the crankshaft shown at 120 degrees.

Referring to FIGS. 22A-22F, crankshaft 20 has rotated to an orientation where radial axis RA is 120 degrees past first stroke termination angle $\theta_1$. Piston 16 continues to travel down cylinder 14. Secondary crankpin cam 27a remains in contact with secondary follower 43a, and the radius of the surface of secondary follower 43a continues to be similar to (e.g., the same as) the radius of the surface of secondary crankpin cam 27a. As shown in FIG. 22A, the radial distance $r_d'$ of secondary crankpin cam 27a at the point or surface of contact with secondary follower 43a is remaining the same as shown in FIGS. 21A-21F, resulting in crankpin journal 25a (see FIG. 3) remaining substantially stationary in oblong opening 32a, such that the effective length of connecting rod 28 remains substantially the same.

According to some embodiments, the radius of the surface of secondary crankpin cam 27a and/or the radial distance $r_d'$ of secondary crankpin cam 27a may remain substantially the same throughout a range of angular motion of radial axis RA of crankshaft 20. With the radial distance $r_d'$ remaining substantially constant, the longitudinal position of crankpin journal 25a (see FIG. 3) in oblong opening 32a remains substantially constant, such that the effective length of connecting rod 28 remains substantially the same throughout the range of angular motion of crankshaft 20. For example, secondary cam profile 29a may have a portion defining a substantially constant radial distance $r_d'$ for at least about 70 degrees of cam profile (e.g., at least about 80 degrees, at least about 90 degrees, at least about 100 degrees, at least about 110 degrees, at least about 120 degrees, at least about 130 degrees, at least about 140 degrees, or at least about 150 degrees). According to some embodiments, the surface of secondary crankpin cam 27a may have a substantially constant radius for at least about 70 degrees of secondary cam profile 29a (e.g., for at least about 80 degrees, at least about 90 degrees, at least about 100 degrees, at least about 110 degrees, at least about 120 degrees, at least about 130 degrees, at least about 140 degrees, or at least about 150 degrees). For example, in the exemplary embodiment shown in FIGS. 17-25F, the radius of the surface of secondary crankpin cam 27a and the radial distance $r_d'$ remain substantially unchanged from about 35 degrees to about 120 degrees past first stroke termination angle $\theta_1$. According to some embodiments, the substantially constant surface radius and substantially constant radial distance $r_d'$ of secondary cam profile 29a may not coincide.

Figure 22D:
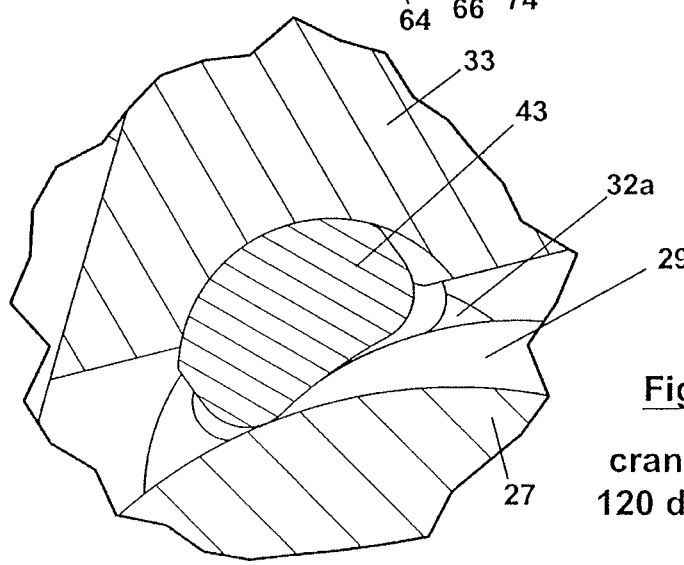
FIG. 22D is a schematic detail view of FIG. 22C.

In contrast to FIG. 21D, as shown in FIG. 22D, exemplary cam 27 and follower 43 begin to come into contact with one another as radial distance $r_d$ of crankpin cam 27 increases. As a result, the contact between crankpin cam 27 and follower 43a and between secondary crankpin cam 27a and secondary follower 43a control the longitudinal position of crankpin journal 25a in oblong opening 32a.

Figure 22E:
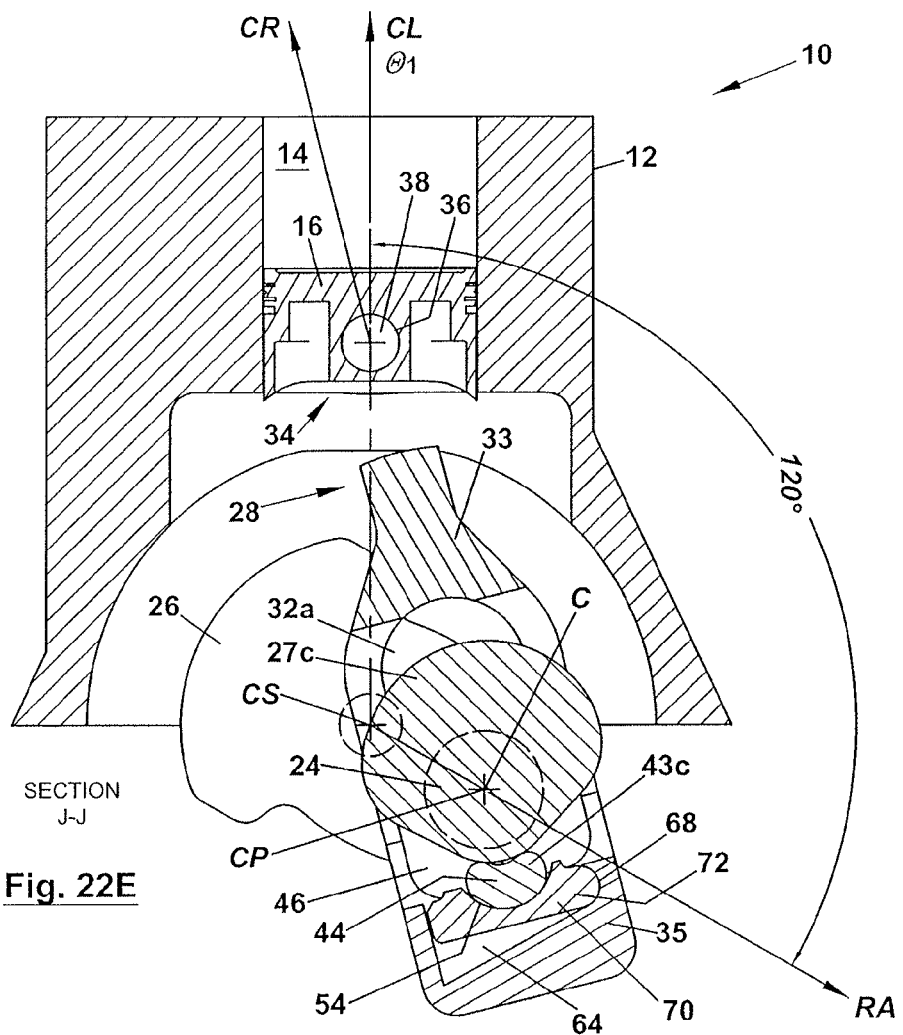
FIG. 22E is a schematic partial end section view taken along line J-J of FIG. 17 with a radial axis angle of the crankshaft shown at 120 degrees.
Figure 22F:
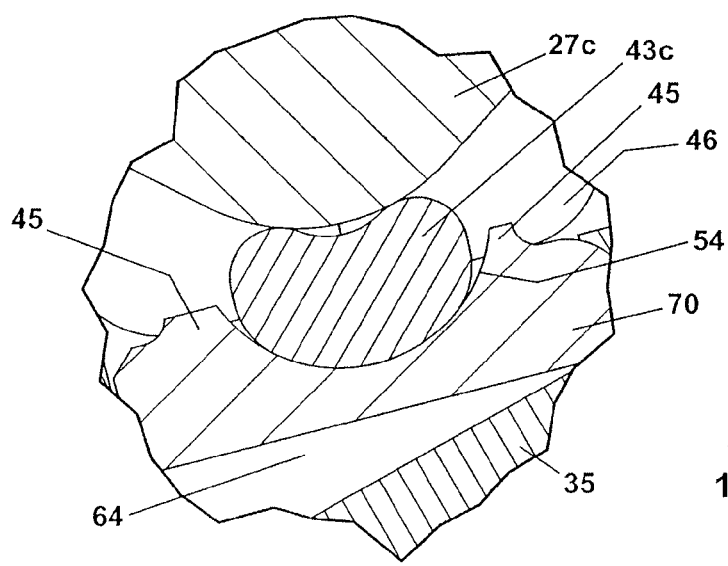
FIG. 22F is a schematic detail view of FIG. 22E.

As shown in FIGS. 22E and 22F, tertiary crankpin cam 27c and tertiary follower 43c remain in contact with one another, and thus, the longitudinal position of crankpin journal 25a in oblong opening 32a is closely controlled by crankpin cam 27, follower 43, secondary crankpin cam 27a, secondary follower 43a, tertiary crankpin cam 27c, and tertiary follower 43c. Biasing member 74 continues to provide a biasing force against rocker member 70, thereby holding tertiary follower 43c in contact with tertiary crankpin cam 43c. In contrast to FIGS. 21E and 21F, as shown in FIGS. 22E and 22F, rocker member 70 returns to being spaced from cap recess 64 of cap portion 35, with biasing member 74 returning to a more extended configuration.

Figure 23A:
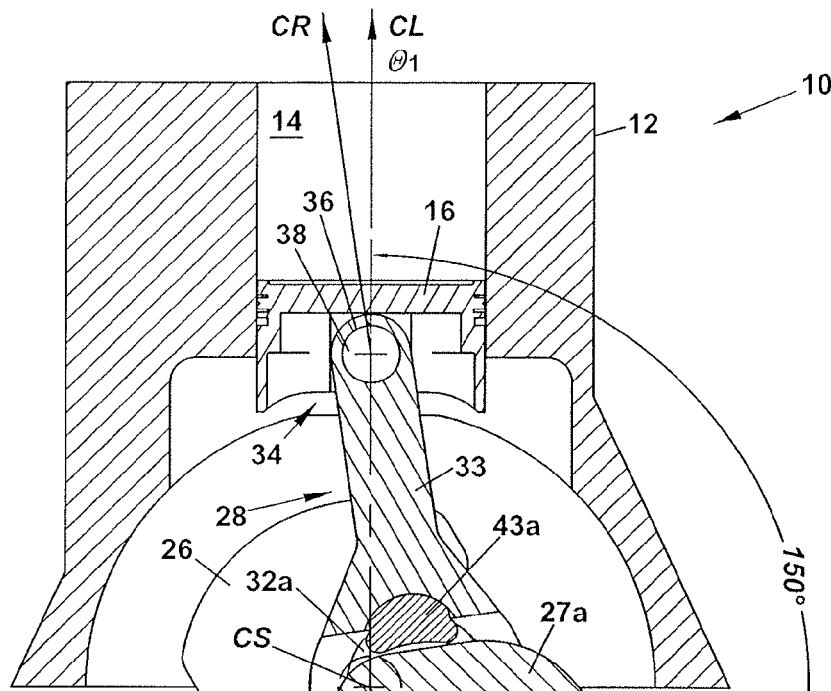
FIG. 23A is a schematic partial end section view taken along line I-I of FIG. 17 with a radial axis angle of the crankshaft shown at 150 degrees.
Figure 23B:
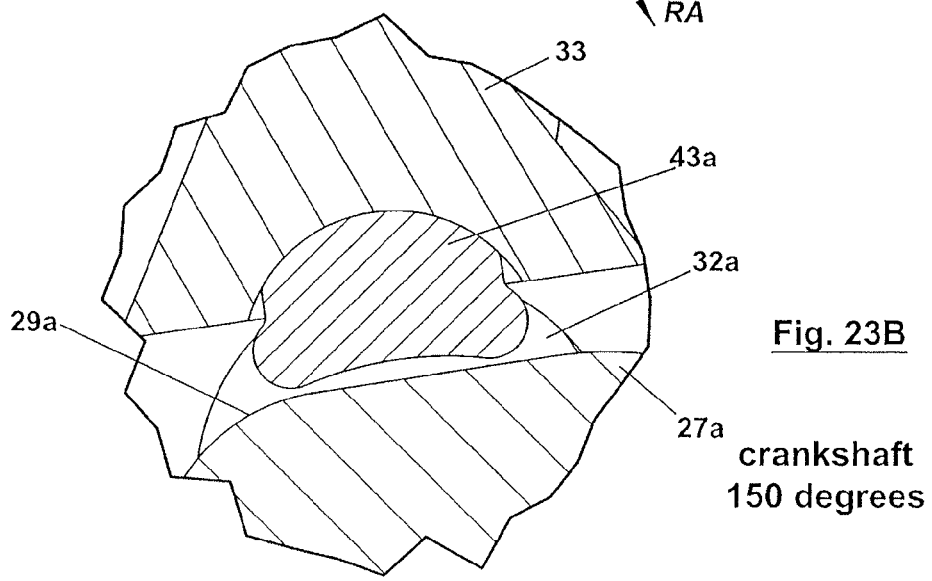
FIG. 23B is a schematic detail view of FIG. 23A.
Figures 23C, 23D:
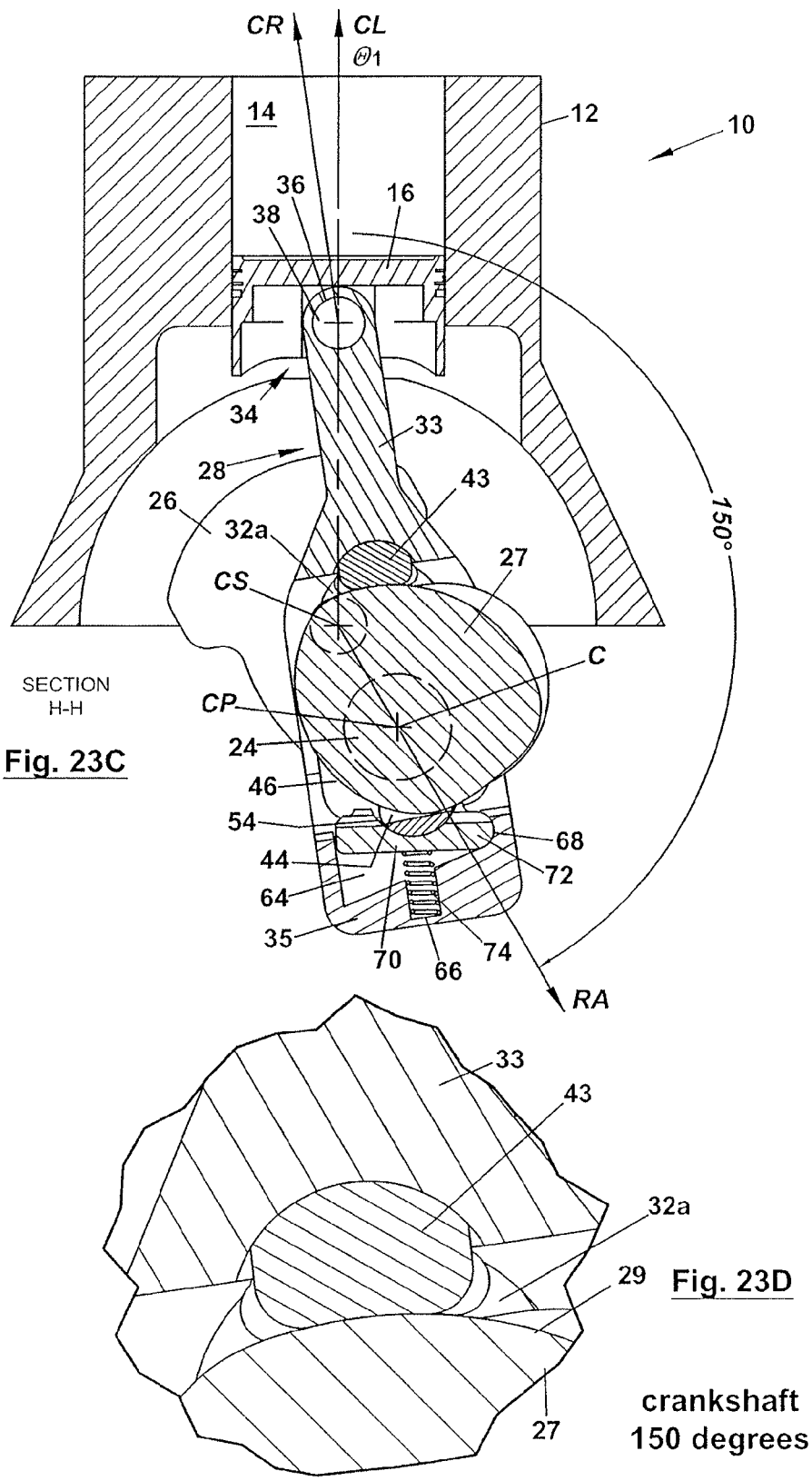
FIG. 23C is a schematic partial end section view taken along line H-H of FIG. 17 with a radial axis angle of the crankshaft shown at 150 degrees.
FIG. 23D is a schematic detail view of FIG. 23C.

As shown in FIGS. 23A-23F, crankshaft 20 has continued to rotate to an orientation where radial axis RA is 150 degrees past first stroke termination angle $\theta_1$. Piston 16 continues to travel down cylinder 14. In the exemplary embodiment shown, secondary crankpin cam 27a and secondary follower 43a separate from one another as radial distance $r_d'$ of secondary crankpin cam 27a decreases, and the radial distance $r_d$ of crankpin cam 27 begins to increase, such that crankpin cam 27 and follower 43 come into contact with one another, as shown in FIGS. 23C and 23D. The radius of the surface of crankpin cam 27 is substantially the same as the radius of the surface of follower 43 at this point of contact, as shown in FIG. 23D. The contact between crankpin cam 27 and follower 43 controls the longitudinal position of crankpin journal 25a (see FIG. 3) in oblong opening 32a. Relative to the position shown in FIGS. 22A-22F, crankpin journal 25a remains in a relatively stationary longitudinal position in oblong opening 32a, such that the effective length of connecting rod 28 remains substantially the same.

Figures 23E, 23F:
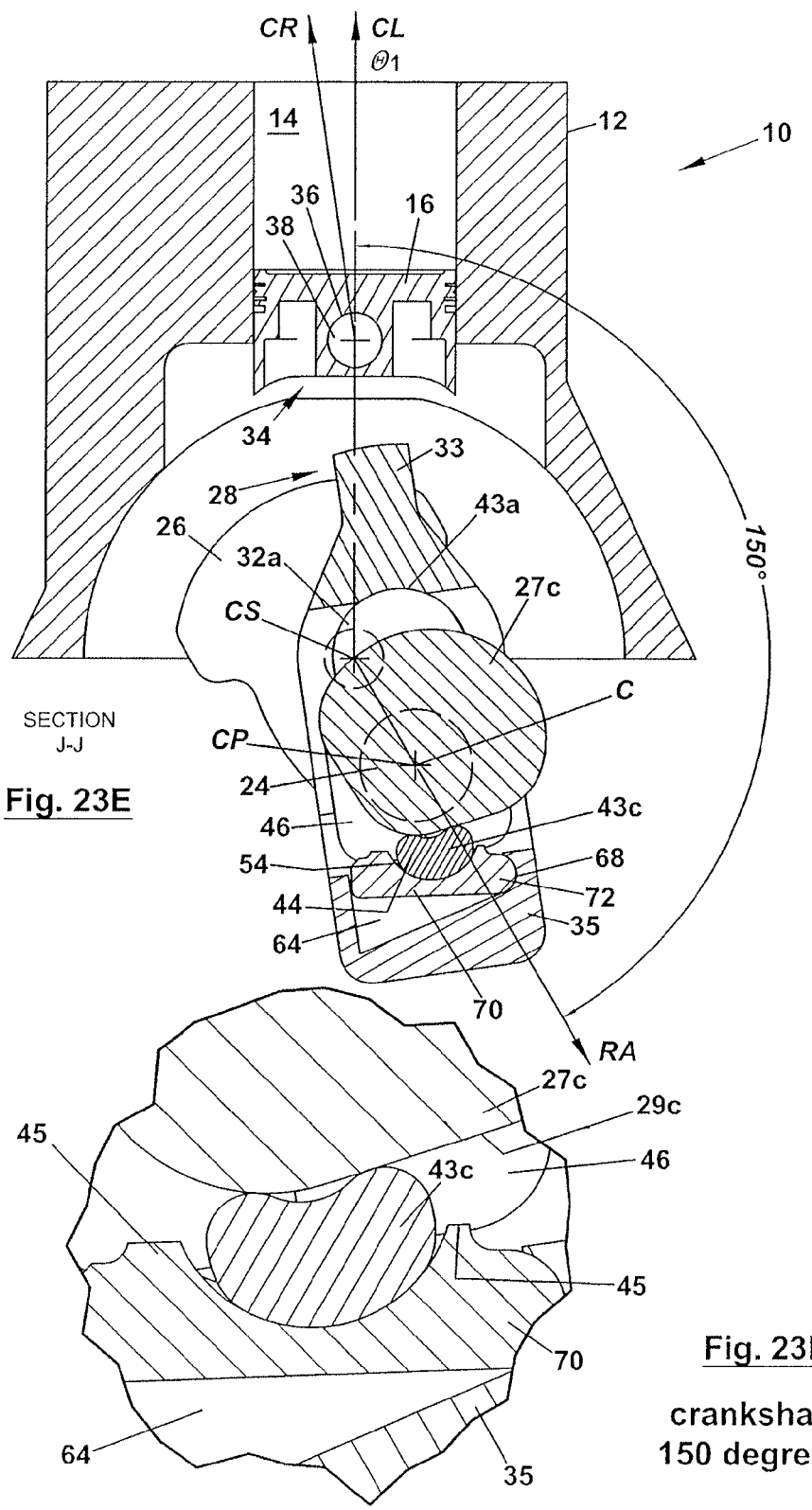
FIG. 23E is a schematic partial end section view taken along line J-J of FIG. 17 with a radial axis angle of the crankshaft shown at 150 degrees.
FIG. 23F is a schematic detail view of FIG. 23E.

As shown in FIGS. 23E and 23F, tertiary crankpin cam 27c and tertiary follower 43c remain in contact with one another, and thus, the longitudinal position of crankpin journal 25a in oblong opening 32a is closely controlled by crankpin cam 27, follower 43, tertiary crankpin cam 27c, and tertiary follower 43c. Biasing member 74 continues to provide a biasing force against rocker member 70, thereby holding tertiary follower 43c in contact with tertiary crankpin cam 43c. Rocker member 70 remains spaced from cap recess 64 of cap portion 35, with biasing member 74 remaining in an extended configuration.

As shown in FIGS. 24A-24F, crankshaft 20 has continued to rotate to an orientation where radial axis RA is 180 degrees past first stroke termination angle $\theta_1$ (i.e., at a second stroke termination angle $\theta_2$, which corresponds generally to the end of the power stroke (or intake stroke)). At this orientation of crankshaft 20, piston 16 ceases its travel down cylinder 14 and begins reversing direction for commencement of the exhaust stroke (or compression stroke). In the exemplary embodiment shown in FIGS. 24A and 24B, secondary crankpin cam 27a and secondary follower 43a remain separated from one another, and crankpin cam 27 and follower 43 remain in contact with one another, as shown in FIGS. 24C and 24D. The radius of the surface of crankpin cam 27 is beginning to decrease, such that at this point of contact, the radius of the surface of follower 43 is larger than the radius of the surface of crankpin cam 27. Contact between crankpin cam 27 and follower 43 controls the longitudinal position of crankpin journal 25a (see FIG. 3) in oblong opening 32a. Relative to the position shown in FIGS. 23A-23F, crankpin journal 25a remains in a relatively stationary longitudinal position in oblong opening 32a, such that the effective length of connecting rod 28 remains substantially the same.

As shown in FIGS. 24E and 24F, tertiary crankpin cam 27c and tertiary follower 43c remain in contact with one another, and thus, the longitudinal position of crankpin journal 25a in oblong opening 32a is closely controlled by crankpin cam 27, follower 43, tertiary crankpin cam 27c, and tertiary follower 43c. Biasing member 74 continues to provide a biasing force against rocker member 70, thereby holding tertiary follower 43c in contact with tertiary crankpin cam 43c. Rocker member 70 remains spaced from cap recess 64 of cap portion 35, with biasing member 74 remaining in an extended configuration.

Figure 25A:
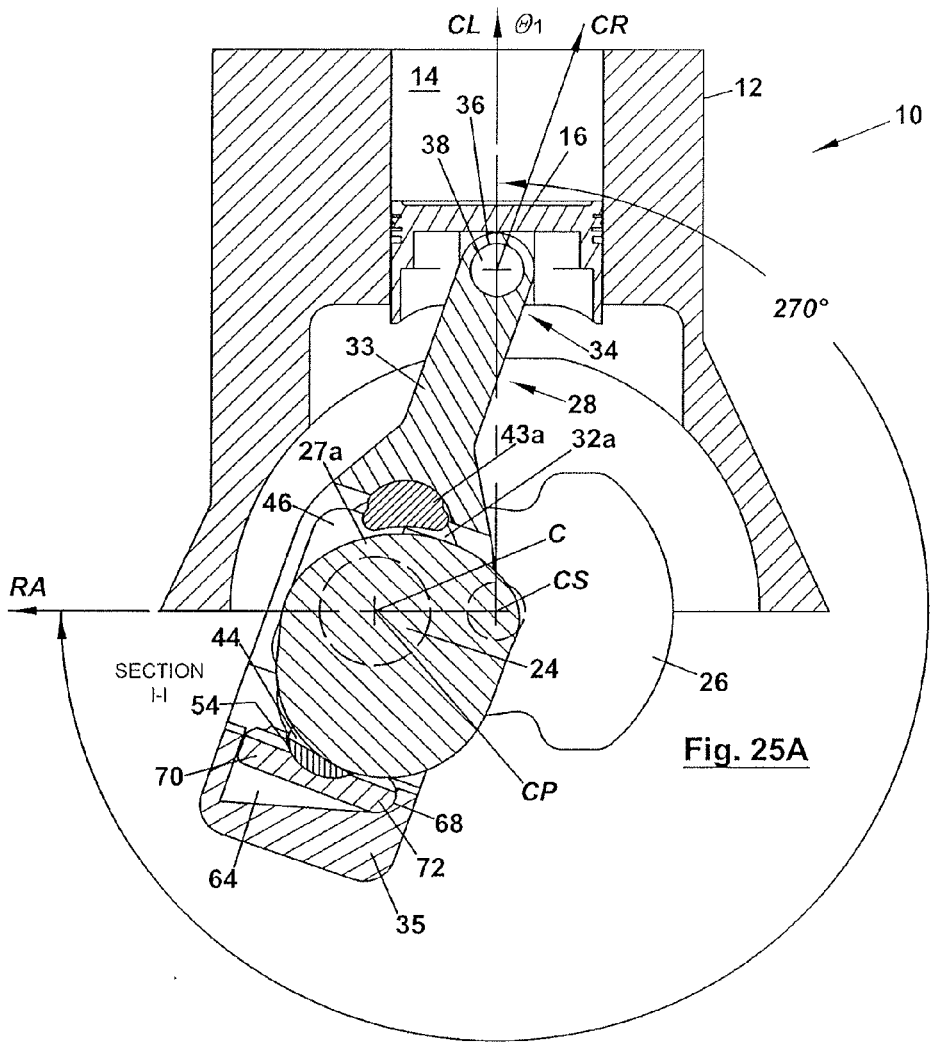
FIG. 25A is a schematic partial end section view taken along line I-I of FIG. 17 with a radial axis angle of the crankshaft shown at 270 degrees.
Figure 25B:
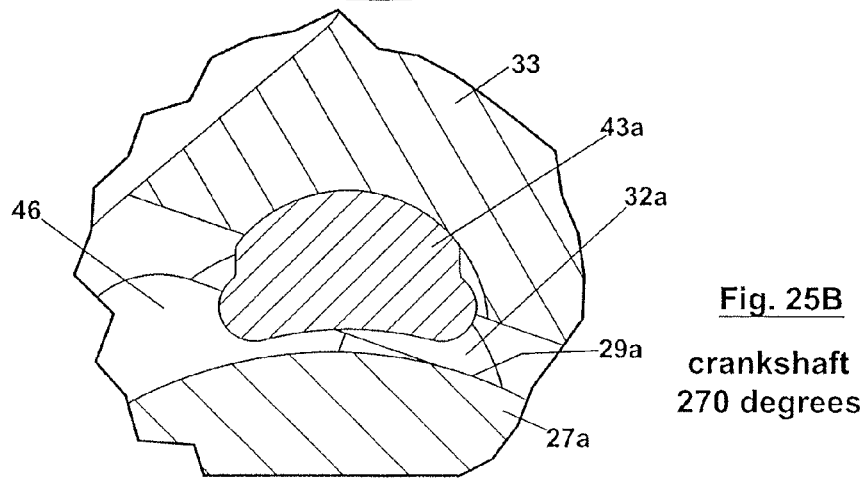
FIG. 25B is a schematic detail view of FIG. 25A.
Figure 25C:
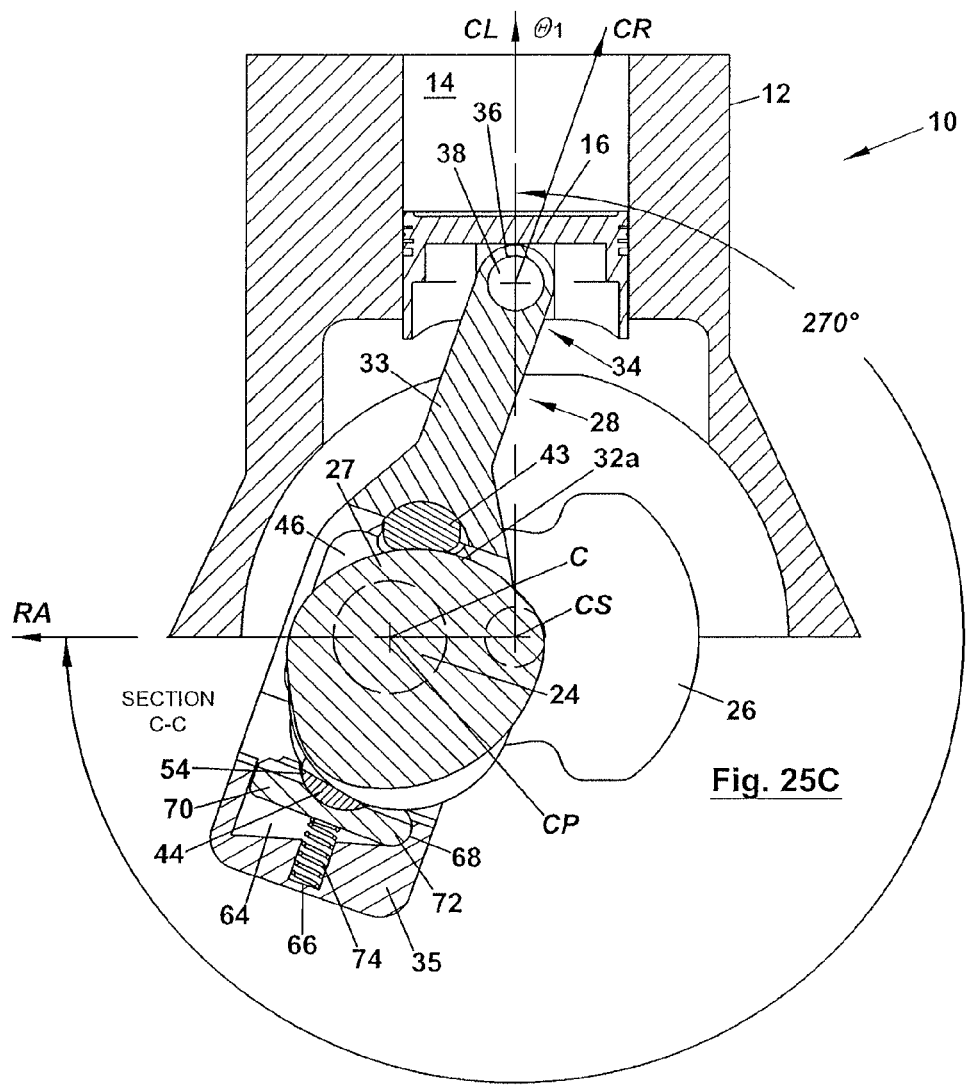
FIG. 25C is a schematic partial end section view taken along line H-H of FIG. 17 with a radial axis angle of the crankshaft shown at 270 degrees.
Figure 25D:
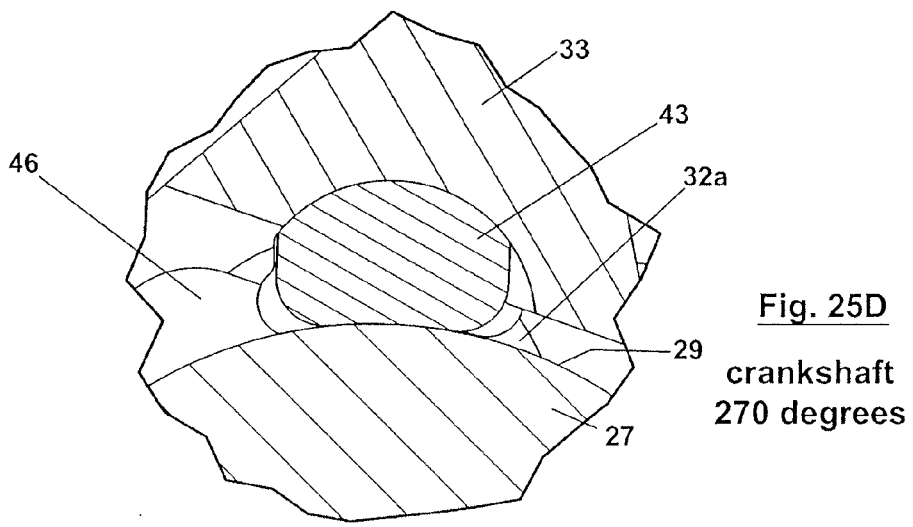
FIG. 25D is a schematic detail view of FIG. 25C.

As shown in FIGS. 25A-25F, crankshaft 20 has continued to rotate to an orientation where radial axis RA is 270 degrees past first stroke termination angle $\theta_1$. At this orientation of crankshaft 20, piston 16 continues to travel up cylinder 14. As shown in FIGS. 25A and 25B, secondary crankpin cam 27a and secondary follower 43a remain separated from one another, and crankpin cam 27 and follower 43 remain in contact with one another, as shown in FIGS. 25C and 25D. The radius of the surface of crankpin cam 27 returns to being substantially the same as the radius of the surface of follower 43 at this point of contact. Contact between crankpin cam 27 and follower 43 controls the longitudinal position of crankpin journal 25a (see FIG. 3) in oblong opening 32a. Relative to the position shown in FIGS. 24A-24F, radial distance $r_d$ of crankpin cam 27 has decreased, and thus, crankpin journal 25a has traveled longitudinally back up oblong opening 32a, such that the effective length of connecting rod 28 begins to shorten as piston 16 approaches the end of its stroke up cylinder 14.

Figure 25E:
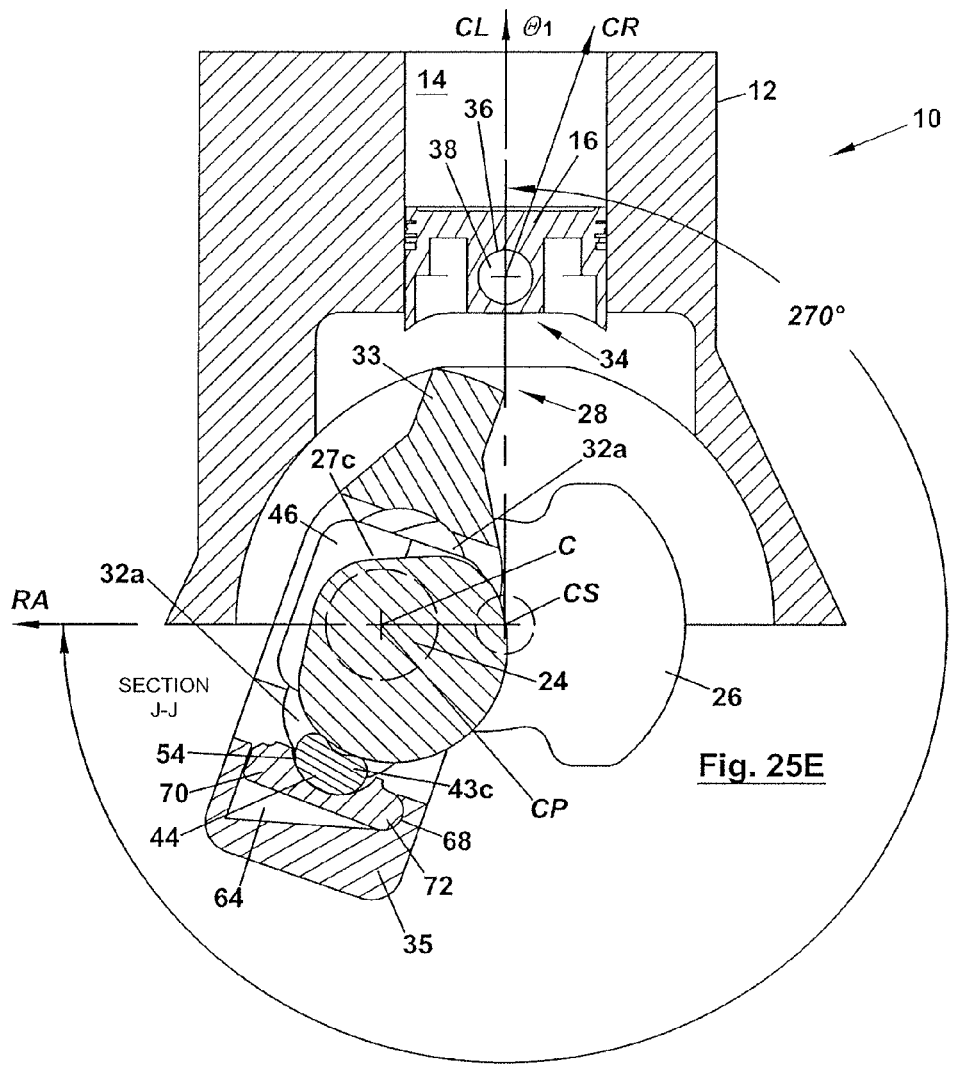
FIG. 25E is a schematic partial end section view taken along line J-J of FIG. 17 with a radial axis angle of the crankshaft shown at 270 degrees.
Figure 25F:
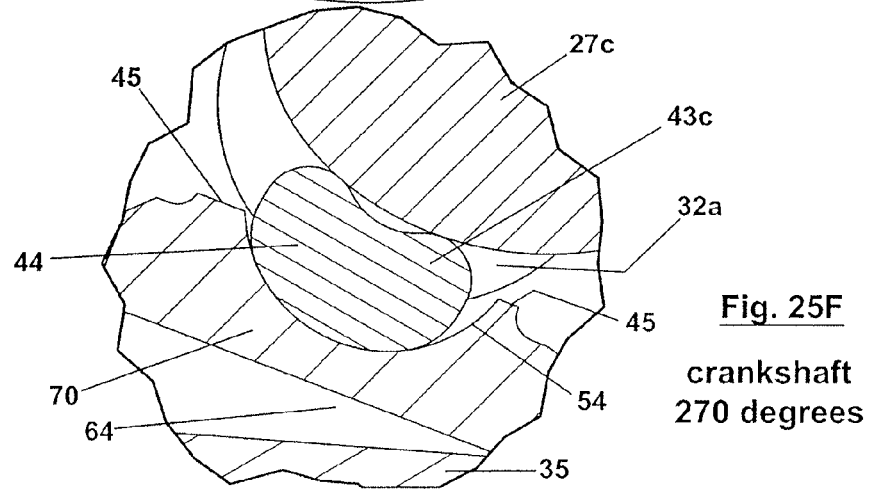
FIG. 25F is a schematic detail view of FIG. 25E.

As shown in FIGS. 25E and 25F, tertiary crankpin cam 27c and tertiary follower 43c remain in contact with one another, and the longitudinal position of crankpin journal 25a in oblong opening 32a is closely controlled by crankpin cam 27, follower 43, tertiary crankpin cam 27c, and tertiary follower 43c. Biasing member 74 continues to provide a biasing force against rocker member 70, thereby holding tertiary follower 43c in contact with tertiary crankpin cam 43c. Rocker member 70 remains spaced from cap recess 64 of cap portion 35, with biasing member 74 remaining in an extended configuration.

Referring back to FIGS. 18A-18F, crankshaft 20 has continued to rotate to an orientation where radial axis RA is 360 degrees past first stroke termination angle $\theta_1$, such that radial axis RA has returned to first stroke termination angle $\theta_1$. At this orientation of crankshaft 20, piston 16 has traveled up cylinder 14 to the end of its stroke. (As mentioned previously herein, according to some embodiments, piston 16 may continue to travel slightly up cylinder 14 as radial axis RA passes 360 degrees past first stroke termination angle $\theta_1$.) As shown in FIGS. 18A and 18B, secondary crankpin cam 27a and secondary follower 43a remain slightly separated from one another, and crankpin cam 27 and follower 43 remain in contact with one another, as shown in FIGS. 18C and 18D. The radius of the surface of crankpin cam 27 is slightly less than the radius of the surface of follower 43 at this point of contact. Contact between crankpin cam 27 and follower 43 controls the longitudinal position of crankpin journal 25a in oblong opening 32a. Relative to the position shown in FIGS. 25A-25F, radial distance $r_d$ of crankpin cam 27 has continued to decrease, and thus, crankpin journal 25a has continued to travel longitudinally up oblong opening 32a to a longitudinal position resulting in the effective length of connecting rod 28 being at a substantial minimum as piston 16 reaches the end of its stroke up cylinder 14.

As shown in FIGS. 18E and 18F, tertiary crankpin cam 27c and tertiary follower 43c remain in contact with one another, and the longitudinal position of crankpin journal 25a in oblong opening 32a is closely controlled by crankpin cam 27, follower 43, tertiary crankpin cam 27c, and tertiary follower 43c. Biasing member 74 continues to provide a biasing force against rocker member 70, thereby holding tertiary follower 43c in contact with tertiary crankpin cam 43c. Rocker member 70 remains spaced from cap recess 64 of cap portion 35, with biasing member 74 remaining in an extended configuration.

According to some embodiments, cam 27 and follower 43 may be in contact with one another, and secondary cam 27a and secondary follower 43a may be in contact with one another, in an alternating fashion. (Actual contact may optionally be limited by, for example, hydrodynamic lubrication that may exist between the respective surfaces.) For example, while cam 27 and follower 43 are in contact with one another, secondary cam 27a and secondary follower 43a are not in contact with one another, and conversely, while secondary cam 27a and secondary follower 43a are in contact with one another, cam 27 and follower 43 are not in contact with one another. According to some embodiments, there may be ranges of the angular position of radial axis RA for which cam 27 and follower 43 are in contact with one another, and secondary cam 27a and follower 43a are in contact with one another.

In the exemplary manner described above with respect to FIGS. 17-25F, the distance between the center C of crankpin 24 and distal end 34 of connecting rod 28 (e.g., the center of pin 38) is variable. More specifically, the distance is variable (see, e.g., FIGS. 18A and 20B), with the variability of the distance being facilitated in the exemplary embodiment by virtue of crankpin 24 and connecting rod 28. As radial axis RA rotates between first stroke termination angle $\theta_1$ and 180 degrees past first stroke termination angle $\theta_1$ (i.e., to second stroke termination angle $\theta_2$), the distance initially increases, thereby delaying initiation of the power stroke until radial axis RA reaches a point, for example, at least about 35-40 degrees past first stroke termination angle $\theta_1$ in the exemplary embodiment shown. Timing of the initiation of combustion may be tailored to take advantage of this delay. The distance between the center C of crankpin 24 and distal end 34 of connecting rod 28 may remain relatively constant as radial axis RA continues to rotate toward an orientation 180 degrees past first stroke termination angle $\theta_1$ (see FIGS. 18A-24A). As the radial axis RA rotates between 180 and 360 degrees past first stroke termination angle $\theta_1$, the distance decreases (see FIGS. 24A and 18A).

According to some embodiments, the exemplary configuration and/or interaction between crankshaft 20 and connecting rod 28 may be tailored to achieve desired performance characteristics of exemplary engine 10, such as, for example, improved efficiency, improved torque, improved power output, and/or improved responsiveness. For example, the profiles of the one or more of the crankpin cams may be configured to improve efficiency and/or power of exemplary engine 10, for example, by changing at least one of the timing and magnitude of the delay of initiation of the power stroke.

According to some embodiments, initiation of the power stroke of exemplary engine 10 may be delayed until radial axis RA has rotated at least about 15 degrees beyond the first stroke termination angle $\theta_1$. In other embodiments, initiation of the power stroke may be delayed until radial axis RA has rotated at least about 30 degrees beyond the first stroke termination angle $\theta_1$ (e.g., at least about 40 or 45 degrees beyond the first stroke termination angle $\theta_1$). In other embodiments, rotation may be set to about 25 or 35 degrees beyond the first stroke termination angle $\theta_1$, for example, to achieve a desired performance characteristic of engine 10.

According to some embodiments, depending on, for example, the profile of one or more of the crankpin cams, piston 16 may continue to travel slightly up into cylinder 14 as radial axis RA rotates between 0 degrees and, for example, about 35-40 degrees past first stroke termination angle $\theta_1$, with the downward travel of piston 16 within cylinder 14 beginning thereafter. In other words, during the delay of the power stroke, piston 16 is not necessarily stationary in cylinder 14, but rather, piston 16 may continue its upward travel in cylinder 14 relative to its position in cylinder 14 as radial axis RA passes 0 degrees relative to first stroke termination angle $\theta_1$.

Cam profiles 29, 29a, 29b, 29c, and/or 29d of respective crankpin cams 27, 27a, 27b, 27c, and/or 27d may be selected to facilitate a desired speed and/or acceleration of the travel of piston 16 within cylinder 14. For example, the cam profile of one or more of the crankpin cams may be configured to provide a relatively faster travel and/or higher acceleration following the end of the delay of the beginning of the power stroke. Such cam profile tailoring may be performed to provide a desired power, torque, and/or efficiency of engine 10.

According to some embodiments, engine 10 may be configured to selectively operate in at least two modes. For example, in a first mode of operation the distance between the between the center C of crankpin 24 (e.g., the longitudinal axis CP of crankpin 24) and distal end 34 of connecting rod 28 may vary in a constant manner as described above. In a second mode of operation, the profiles of one more of the crankpin cams may be variable in a radial manner, such that the delay in the power stroke of piston 16 may be varied according to a desired tailoring. This may be accomplished via, for example, cam phasing, where one or more of crankpin cams 27, 27a, 27b, 27c, and 27d may rotate relative to crankpin journals 25a and 25b, thereby changing the position of radial axis RA at which the power stroke begins. In this exemplary second mode of operation, it may be possible to tailor operation of engine 10 to vary the power output, torque, and/or efficiency of the operation of engine 10 according to certain operating parameters. According to some embodiments, engine 10 may operate according to a combination of the first and second modes.

Exemplary engines 10 shown in FIGS. 1-25F may be incorporated into a power train, for example, including a transmission operably coupled to engine 10 and a drive member configured to perform work, the drive member being operably coupled to the transmission. For example, the drive member may include a propulsion device, such as, for example, a wheel or a propeller. According to some embodiments, such a power train may include a generator configured to convert rotational power into electrical power, the generator being operably coupled to exemplary engine 10. Such a power train may include a power storage device (e.g., a flywheel and/or one or more batteries) operably coupled to the generator and configured to store electrical power. According to some embodiments, the transmission may include one or more electric motors.

Moreover, exemplary engines 10 may be incorporated into a vehicle including a transmission operably coupled to engine 10 and a drive member configured to perform work and being operably coupled to the transmission. For example, the drive member may include a propulsion device, such as, for example, a wheel or a propeller. For example, the vehicle may be a car, van, truck, boat, ship, train, or air vehicle. Such a vehicle may include exemplary engine 10 operably coupled to a generator configured to convert rotational power into electrical power, and a power storage device operably coupled to the generator and configured to store electrical power. The transmission may be, for example, an electric motor.

At least some portions of exemplary embodiments of the systems outlined above may used in association with portions of other exemplary embodiments. Moreover, at least some of the exemplary embodiments disclosed herein may be used independently from one another and/or in combination with one another and may have applications to internal combustion engines not disclosed herein.

It will be apparent to those skilled in the art that various modifications and variations can be made to the structures and methodologies described herein. Thus, it should be understood that the invention is not limited to the subject matter discussed in the description. Rather, the present invention is intended to cover modifications and variations.

What is claimed is:

1. A connecting rod for an internal combustion engine, the connecting rod comprising:
   a rod portion; and
   a cap portion,
   wherein the rod portion and the cap portion define an oblong opening configured to receive a crankpin of an internal combustion engine,
   wherein a first end of the oblong opening is associated with the rod portion, and a second end of the oblong opening is associated with the cap portion, and
   wherein the connecting rod further comprises:
      a first follower associated with the first end of the oblong opening;
      a second follower associated with the first end of the oblong opening; and
      a third follower associated with the second end of the oblong opening,
      wherein the first follower comprises a first follower surface, and the second follower comprises a second follower surface, and
      wherein the first and second follower surfaces differ from one another.

2. The connecting rod of claim 1, wherein the first follower surface comprises a first radius, and the second follower surface comprises a second radius, and wherein the first and second radii differ from one another.

3. The connecting rod of claim 2, wherein the third follower comprises a third follower surface, wherein the third follower surface differs from the first and second follower surfaces.

4. The connecting rod of claim 3, wherein the third follower surface comprises a substantially planar surface.

5. The connecting rod of claim 3, wherein the third follower surface comprises a third radius, and wherein the third radius differs from the first and second radii.

6. The connecting rod of claim 1, wherein the oblong opening has a width configured to correspond to a diameter of a crankpin journal.

7. The connecting rod of claim 1, wherein the rod portion comprises four legs at least partially defining the first end of the oblong opening and a first end of a second oblong opening.

8. The connecting rod of claim 1, wherein the rod portion comprises a first pair of legs at least partially defining the first end of the oblong opening, and a second pair of legs at least partially defining a first end of a second oblong opening, the second pair of legs being spaced from the first pair of legs, thereby providing a clearance between the first pair of legs and the second pair of legs.

9. The connecting rod of claim 8, wherein the first and second followers are associated with the clearance.

10. The connecting rod of claim 8, wherein the cap portion is configured to be coupled to the first and second pairs of legs.

11. The connecting rod of claim 1, wherein the first and second followers are configured to oscillate with respect to the rod portion.

12. The connecting rod of claim 11, wherein the first and second followers are configured to oscillate independently of one another with respect to the rod portion.

13. The connecting rod of claim 1, wherein the first follower surface comprises a first concave radius, and wherein the first concave radius is configured to be substantially the same as a portion of a convex radius of a cam associated with a crankshaft.

14. The connecting rod of claim 1, wherein the second follower surface comprises a second concave radius, and wherein the second concave radius is configured to be substantially the same as a portion of a convex radii of a cam associated with a crankshaft.

15. The connecting rod of claim 1, wherein the first follower surface defines a first surface area, and the second follower surface defines a second surface area, and wherein the first surface area is greater than the second surface area.

16. The connecting rod of claim 1, further comprising a fourth follower associated with the first end of the oblong opening, wherein the fourth follower comprises a fourth follower surface, the fourth follower surface being substantially the same as the second follower surface.

17. The connecting rod of claim 16, wherein the first follower is between the second and fourth followers.

18. The connecting rod of claim 17, wherein the first follower is configured to oscillate independently of the second and fourth followers relative to the rod portion.

19. The connecting rod of claim 18, wherein the second and fourth followers are configured to oscillate together relative to the rod portion.

20. The connecting rod of claim 16, wherein the first, second, and fourth followers are configured to oscillate together relative to the rod portion.

21. The connecting rod of claim 16, further comprising a fifth follower associated with the second end of the oblong opening, wherein the fifth follower comprises a fifth follower surface, the fifth follower surface being substantially the same as the third follower surface.

22. The connecting rod of claim 21, wherein the third and fifth followers are configured to oscillate together relative to the cap portion.

23. The connecting rod of claim 1, further comprising a sleeve received in the oblong opening.

24. The connecting rod of claim 1, wherein the cap portion comprises a recess, wherein the third follower is associated with a rocker member, and the rocker member is received in the recess such that the rocker member pivots with respect to the cap member.

25. The connecting rod of claim 24, further comprising a biasing member configured to provide a biasing force against the rocker member.

* * * * *

UNITED STATES PATENT AND TRADEMARK OFFICE
CERTIFICATE OF CORRECTION

| | | |
|---|---|---|
| PATENT NO. | : 9,080,597 B2 | Page 1 of 1 |
| APPLICATION NO. | : 14/597630 | |
| DATED | : July 14, 2015 | |
| INVENTOR(S) | : Larry C. Wilkins | |

It is certified that error appears in the above-identified patent and that said Letters Patent is hereby corrected as shown below:

In the Claims

Claim 14, column 33, line 27, "a convex radii" should read --a convex radius--.

Signed and Sealed this
Eighth Day of December, 2015

Michelle K. Lee
*Director of the United States Patent and Trademark Office*